(12) United States Patent
Lindenbaum

(10) Patent No.: US 12,504,063 B2
(45) Date of Patent: Dec. 23, 2025

(54) TOOTH GEOMETRY FOR HEADSTOCK GEAR FOR FEED SYSTEM OF A SHEARER LOADER

(71) Applicant: Caterpillar Inc., Peoria, IL (US)

(72) Inventor: Tobias Lindenbaum, Luenen (DE)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/272,823

(22) PCT Filed: Jan. 22, 2021

(86) PCT No.: PCT/IB2021/050491
§ 371 (c)(1),
(2) Date: Jul. 18, 2023

(87) PCT Pub. No.: WO2022/157545
PCT Pub. Date: Jul. 28, 2022

(65) Prior Publication Data
US 2024/0084882 A1 Mar. 14, 2024

(51) Int. Cl.
*F16H 55/08* (2006.01)
(52) U.S. Cl.
CPC .................................... *F16H 55/08* (2013.01)
(58) Field of Classification Search
CPC ....................................................... F16H 55/08
See application file for complete search history.

(56) References Cited

U.S. PATENT DOCUMENTS 3,267,763 A * 8/1966 Merritt .................... F16H 19/04
74/498
4,808,779 A * 2/1989 Cogley .................. H05B 6/405
219/652
(Continued)

FOREIGN PATENT DOCUMENTS

| CN | 108708960 A | 10/2018 |
|----|-------------|---------|
| CN | 110465706 A | 11/2019 |

(Continued)

OTHER PUBLICATIONS

International Search Report related to Application No. PCT/IB2021/050491; reported on Jan. 22, 2021.

*Primary Examiner* — Terence Boes

(57) ABSTRACT

The present disclosure pertains to a headstock gear for a feed system of a shearer loader, comprising a plurality of teeth, each tooth having a tooth geometry. Accordingly, for each tooth, the tooth geometry consists of two symmetric S-shaped tooth profiles which are arranged line symmetrically regarding a radius line, as seen from a view along an axis of rotation. Furthermore, the present disclosure pertains to a system comprising a headstock gear and a gear rack comprising several gear rack segments which are arranged next to each other such that a track is provided. The gear rack comprises two different gear rack pitches. Moreover, the disclosure pertains to a method for dimensioning a tooth geometry of a headstock gear for a shearer loader, comprising a plurality of teeth, the method comprising the step of identifying all relevant engagement conditions during operation of the headstock gear together with the gear rack and selecting a tooth geometry on the basis of the identified relevant engagement conditions by minimizing a tooth root tension.

20 Claims, 10 Drawing Sheets

(56) References Cited

U.S. PATENT DOCUMENTS

| | | | |
|---|---|---|---|
| 6,019,857 A | 2/2000 | Mutagami | |
| 6,059,898 A | 5/2000 | Fisher et al. | |
| 8,944,519 B2 * | 2/2015 | Pietrala | E21C 29/02 |
| | | | 74/462 |
| 9,145,964 B2 | 9/2015 | Potts et al. | |
| 9,273,552 B2 | 3/2016 | Pietrala et al. | |

FOREIGN PATENT DOCUMENTS

| | | |
|---|---|---|
| CN | 210367795 U | 4/2020 |
| DE | 2616765 A1 | 10/1976 |
| DE | 102006032680 B4 | 7/2008 |
| DE | 202009005046 U1 | 12/2010 |
| DE | 202009013326 U1 | 2/2011 |
| EP | 2098757 A2 | 9/2009 |
| GB | 1316584 A | 5/1973 |
| RU | 2703094 C2 | 10/2019 |
| RU | 2739631 C1 | 12/2020 |

* cited by examiner

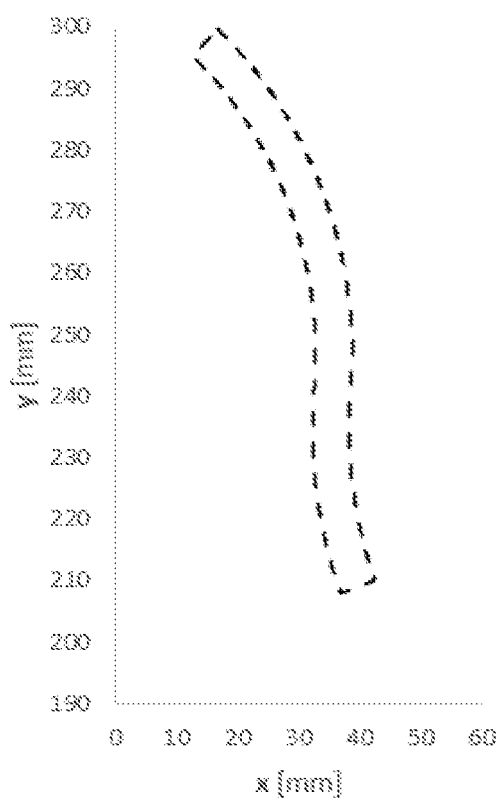 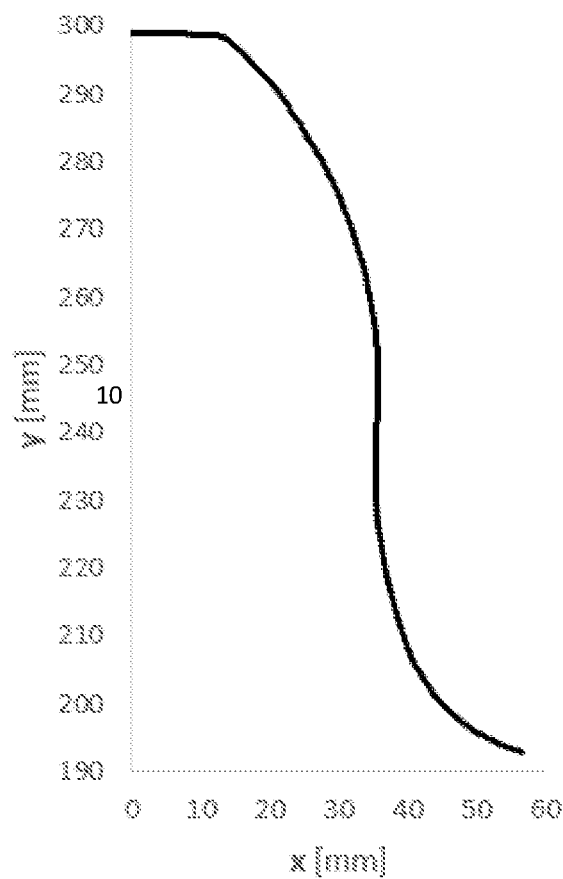
Fig. 9AFig. 9B

US 12,504,063 B2

TOOTH GEOMETRY FOR HEADSTOCK GEAR FOR FEED SYSTEM OF A SHEARER LOADER

CROSS-REFERENCE TO RELATED APPLICATION

This Application is a 35 USC § 371 US National Stage filing of International Application No. PCT/IB2021/050491 filed on Jan. 22, 2021.

TECHNICAL FIELD

The present invention pertains to a headstock gear for a feed system of a shearer loader, comprising a plurality of teeth, wherein each tooth has a tooth geometry. The present invention further pertains to a system comprising such a headstock gear and a gear rack. The present invention further pertains to a method for dimensioning a geometry profile of a headstock gear.

Technological Background

Headstock gears are commonly used in underground feed systems of shearer loaders. In the case of shearer loaders, gear racks are used in the feed system. During operation, the teeth of the headstock gear engage in tooth gaps between the gear rack teeth to convert a rotational movement of the headstock gear into a translational movement of the shearer loader.

The gear rack is usually composed of several individual gear rack segments, the length of which corresponds substantially to the length of a respective pan section of an associated scraper chain conveyor so that the scraper chain conveyor and in this respect also the gear rack can conform to an undulating course of a winning longwall face with synclines, anticlines and curves. Due to the segmental construction of the gear rack on account of the individual gear rack segments, a shearer loader can also follow a curved course of a face conveyor and the horizontal and/or vertical bends without obstruction.

When the headstock gear engages a gear rack segment in a middle section, the gear rack pitch is constant, providing a smooth operation of the feed system without gear jumps and without excessive forces acting on the headstock gear. However, at intersections between individual gear rack segments, the gear rack frequently exhibits mechanically noticeable changes in distance between an end tooth of a first gear rack segment and another, adjacent, end tooth of a second gear rack segment. To this end, a variation in gear rack pitch occurs, causing substantial stresses in the headstock gear travelling over said gear rack pitch variation. Such sudden stress fluctuations can wear off the headstock gear and/or the flanks of the gear rack teeth and/or brake off a tooth of the headstock gear. If the gear rack pitch variation reaches a critical variation, gear jumps occur, leading to further wear and shortened lifespan of the headstock gear.

Therefore, a need exists to prevent load peaks in the headstock gear when travelling over an intersection of two gear rack segments, thus increasing lifespan of the headstock gear.

SUMMARY OF THE INVENTION

Starting from the prior art, it is an objective to provide an improved headstock gear for a feed system of a shearer loader. In particular, it may be an objective to provide a feed system which allows smooth travelling over an intersection of two adjacent gear racks comprising a gear rack pitch variation.

This objective is solved by means of a headstock gear with the features of claim 1, by means of a system according to claim 10 and by a method according to claim 15. Preferred embodiments are set forth in the present specification, the Figures as well as the dependent claims.

Accordingly, a headstock gear for a feed system of a shearer loader is suggested, comprising a plurality of teeth, each tooth having a tooth geometry. Further, for each tooth, the tooth geometry consists of two symmetric S-shaped tooth profiles which are arranged line symmetrically regarding a radius line, as seen from a view along an axis of rotation.

Furthermore, a system is suggested, which comprises such a headstock gear and a gear rack comprising several gear rack segments which are arranged next to each other such that a track is provided. The gear rack comprises two different gear rack pitches.

Further, a method for dimensioning a tooth geometry of a headstock gear for a shearer loader is suggested, comprising a plurality of teeth, the method comprising the steps of identifying all relevant engagement conditions during operation of the headstock gear together with the gear rack; and selecting a tooth geometry on the basis of the identified relevant engagement conditions by minimizing a tooth root tension.

BRIEF DESCRIPTION OF THE DRAWINGS

The present disclosure will be more readily appreciated by reference to the following detailed description when being considered in connection with the accompanying drawings in which:

FIG. 9A illustrates an outer limitation of an envelope fitting for one of the S-shaped profiles in a dimensional representation;

FIG. 9B illustrates an envelope for one of the S-shaped profiles in a dimensional representation.

DETAILED DESCRIPTION OF PREFERRED EMBODIMENTS

Figure 1:
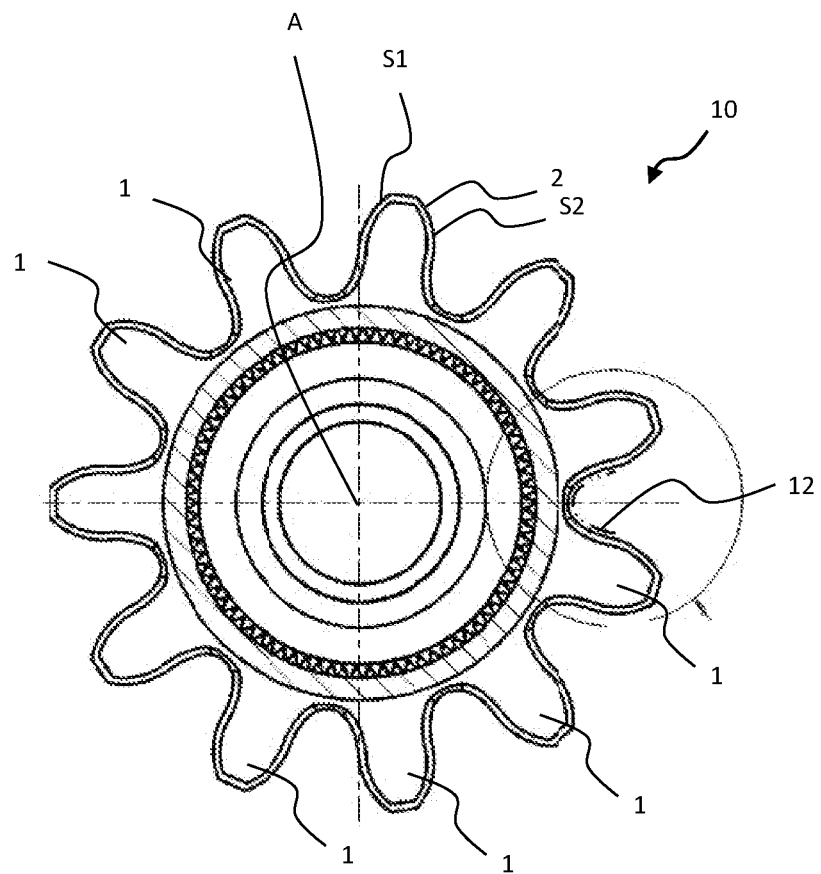
FIG. 1 schematically shows a side view of a headstock gear.

In the following, the invention will be explained in more detail with reference to the accompanying Figures. In the Figures, like elements are denoted by identical reference numerals and repeated description thereof may be omitted in order to avoid redundancies.

In FIG. 1, the headstock gear 10 for a feed system of a shearer loader is depicted in a side view, comprising a plurality of teeth 1, each tooth 1 having a tooth geometry 2. For each tooth 1, the tooth geometry 2 consists of two symmetric S-shaped tooth profiles S1, S2 which are arranged line symmetrically regarding a radius line, as seen from a view along an axis of rotation A.

In the context of the present disclosure, the term tooth geometry 2 refers to the entire outer geometry of a given tooth. Likewise, the term profile, or S-shaped profile, refers to the outline of the tooth geometry as seen from a view along an axis of rotation A of the headstock gear 10.

The tooth geometry is suitable for engaging a gear rack (not shown in FIG. 1). The tooth geometry 2 is designed such that an engagement with at least two different gear rack pitches (not shown in FIG. 1) is enabled.

Enabling the headstock gear 10 to operate at at least two different gear rack pitches is achieved by the specific desing of the tooth geometry 2. Such tooth geometry 2 may deviate from involent tooth geometries as known in the state of the art in that it may not be the optimal geometry for combing either one of the different gear rack pitches alone. However, despite potentially operating at a sub-optimal engagement conditions, a headstock gear having a tooth geometry 2 according to the present disclosure is surprisingly longer lasting compared to a tooth geometry 2 optimized for a single gear rack pitch. That is because the tooth geometry 2 according to the present disclosure leads to less fluctuating stress impacts when operated at varying gear rack pitches.

According to the embodiment shown in FIG. 1, the headstock gear 10 is rotatable around a rotational axis A and comprises eleven teeth 1. Alternatively, the number of teeth may be different. Further, each tooth 1 of the headstock gear 10 has a tooth geometry 2 comprising a flat section at its tooth tip. In addition thereto, as indicated by reference numeral 12, each tooth 1 of the plurality of teeth is hardened the case hardening and/or inductive hardening at the root 12 of each of the teeth 1. Alternatively, hardening may be optional, depending on the expected variation of gear rack pitches. According to the embodiment shown in FIG. 1, hardening is not provided at the tip of each of the teeth 1.

The tooth geometry 2 of the headstock gear 10 is designed such that root stresses of each tooth 1 are minimized. Additionally, the tooth geometry 2 of the headstock gear 10 is designed such that a product of Hertzian stress and a relative slip component is minimized when engaged with the gear rack (not shown). It has been shown by experiment that after taking into consideration all potential gear rack pitch variations, optimizing the tooth geometry by the criterion of minimizing said product may lead to a tooth geometry 2 providing a particularly durable headstock gear 10.

Figure 2:
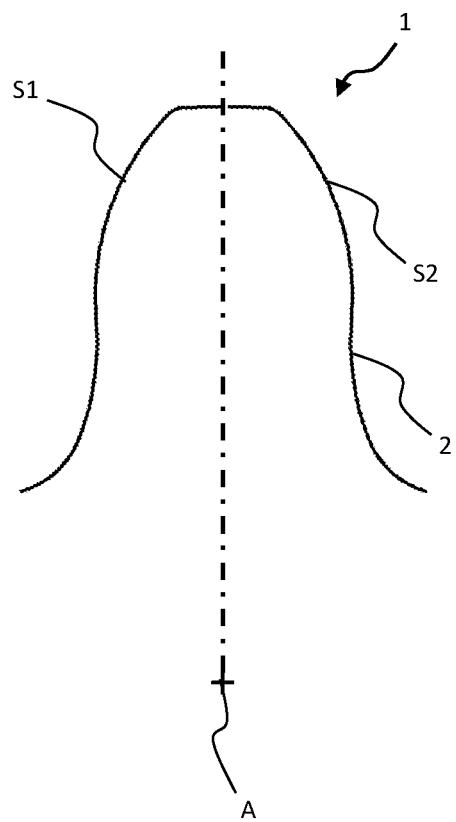
FIG. 2 schematically shows an isolated tooth geometry of a tooth of the headstock gear shown in FIG. 1.

FIG. 2 schematically shows an isolated tooth geometry 2 of a tooth 1 of a headstock gear 10 according to FIG. 1. The tooth geometry 2 consists of two symmetric S-shaped tooth profiles S1, S2 which are arranged line symmetrically regarding a radius line, as seen from a view along an axis of rotation A. The radius line is indicated by the dashed line and travels through the axis of rotation A. The axis of rotation refers to a rotation of the headstock gear 10 during operation.

Figure 3:
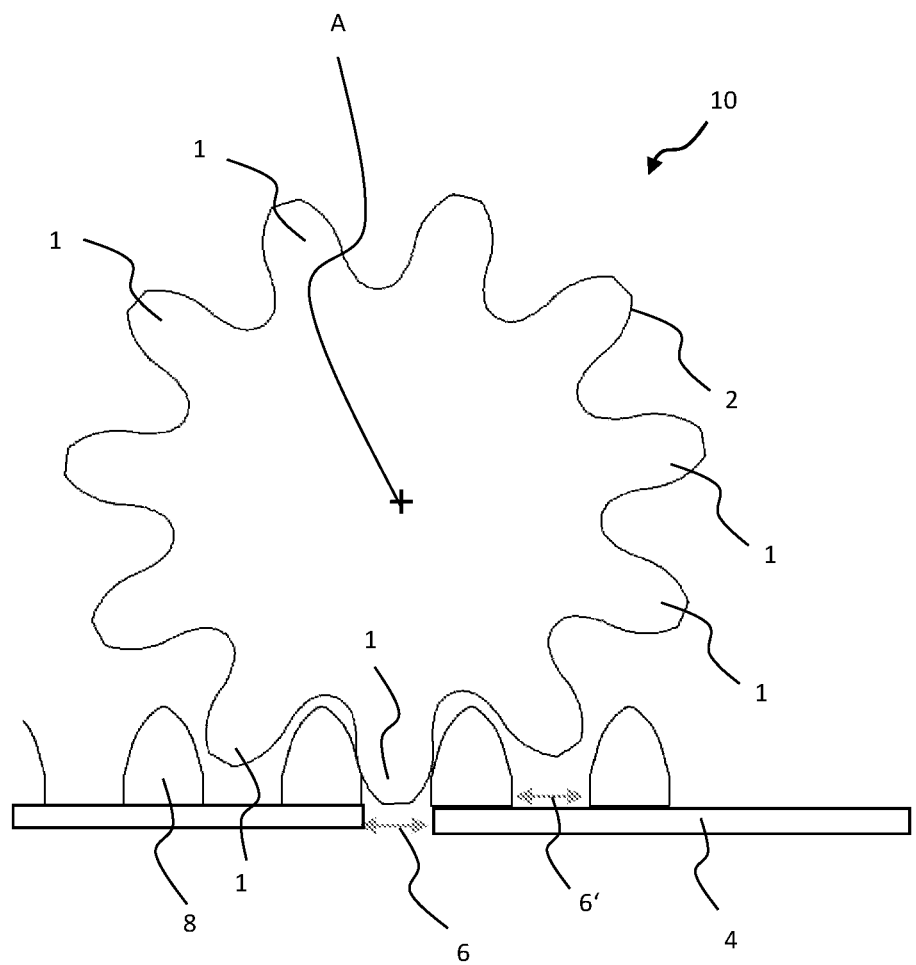
FIG. 3 schematically shows a schematic side view of a headstock gear together with a gear rack.

FIG. 3 shows a schematic side view of a headstock gear 10 together with a gear rack 4 where the teeth 1 of the headstock gear 10 are combing with rack teeth 8 of the gear rack 4. To this end, the tooth geometry 2 is designed such that an engagement with at least two different gear rack pitches 6, 6' is enabled. The headstock gear 10 shown in FIG. 2 can be identical to the headstock gear 10 disclosed in FIG. 1. In this case, the plurality of teeth 1 of the headstock gear 10 comprises eleven teeth.

Alternatively, according to an embodiment not shown in FIG. 2, a different headstock gear 10 may be used, in particular a headstock gear 10 having a different number of teeth 1, in particular ten teeth 1. In the shown embodiment, a system comprising the headstock gear 10 in a gear rack 4 comprising two gear rack segments 4' is shown. The gear rack segments 4' are arranged next to each other such that a track is provided along which the headstock gear 10 may engage during operation.

Each of the two different gear rack segments 4, 4' comprise several rack teeth 8 arranged equidistantly on each gear rack segment 4' such that each of the gear rack segments 4' have the same constant gear rack pitch 6'. However, at the intersection between the two gear rack segments 4 and 4', a change or variation in gear rack pitch 6 occurs. According to the illustration shown in FIG. 2, the headstock gear 10 engages with the gear rack 4 precisely at a location where the gear rack pitch 6 differs from the nominal gear rack pitch 6'. As an example, the nominal gear rack pitch 6' may be 147 mm.

Figure 4:
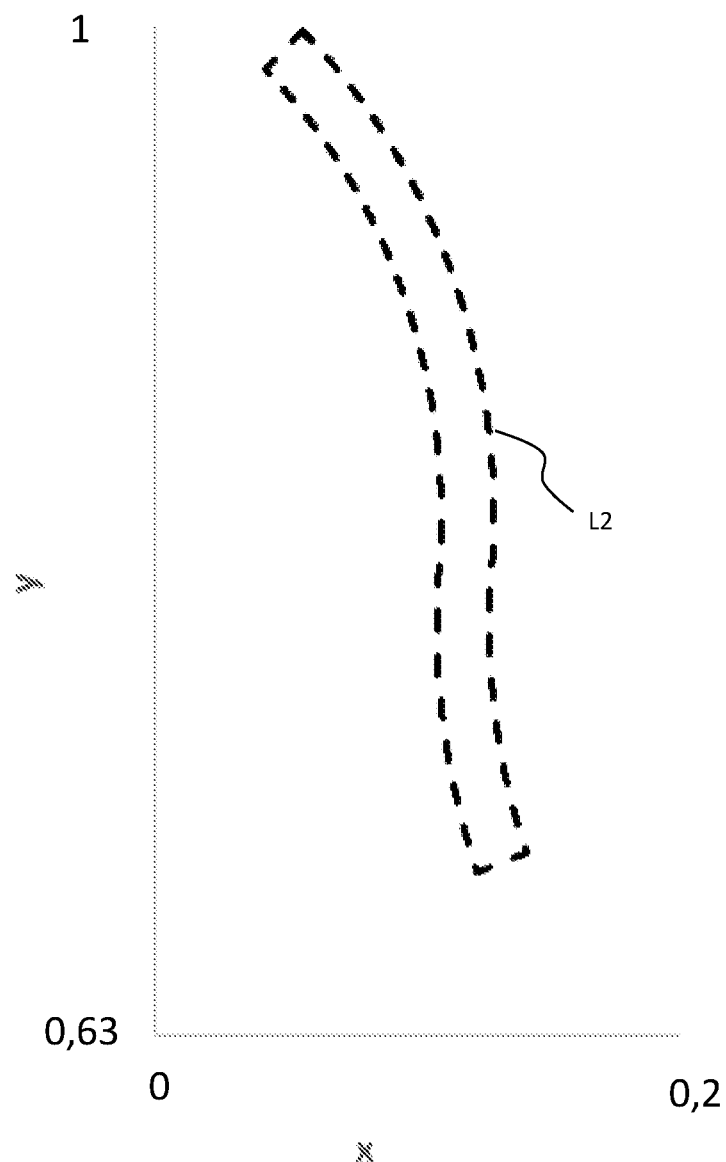
FIG. 4 illustrates an outer limitation of an envelope fitting for one of the S-shaped profiles in a non-dimensional representation.

FIG. 4 illustrates an outer limitation of an envelope fitting for one of the S-shaped profiles S2 in a non-dimensional representation. To this end, one of the S-shaped profiles S2 comprises an envelope fitting into a frame with the non-dimensional outer limitations L2 defined by x-y coordinates set forth in all of the following columns:

| Column 1 | | Column 2 | | Column 3 | | Column 4 | |
| --- | --- | --- | --- | --- | --- | --- | --- |
| x | y | x | y | x | y | x | y |
| 0.0561 | 0.9984 | 0.1172 | 0.8987 | 0.1223 | 0.6948 | 0.0975 | 0.8947 |
| 0.0562 | 0.9983 | 0.1173 | 0.8982 | 0.1220 | 0.6957 | 0.0973 | 0.8951 |
| 0.0565 | 0.9980 | 0.1175 | 0.8977 | 0.1217 | 0.6966 | 0.0972 | 0.8955 |
| 0.0568 | 0.9977 | 0.1176 | 0.8973 | 0.1214 | 0.6974 | 0.0970 | 0.8960 |
| 0.0572 | 0.9974 | 0.1178 | 0.8968 | 0.1211 | 0.6983 | 0.0969 | 0.8964 |
| 0.0575 | 0.9970 | 0.1179 | 0.8963 | 0.1208 | 0.6992 | 0.0968 | 0.8968 |
| 0.0578 | 0.9967 | 0.1181 | 0.8959 | 0.1205 | 0.7001 | 0.0966 | 0.8972 |
| 0.0581 | 0.9964 | 0.1182 | 0.8954 | 0.1202 | 0.7010 | 0.0965 | 0.8976 |
| 0.0584 | 0.9961 | 0.1184 | 0.8950 | 0.1199 | 0.7019 | 0.0963 | 0.8981 |
| 0.0587 | 0.9958 | 0.1185 | 0.8945 | 0.1196 | 0.7027 | 0.0962 | 0.8985 |
| 0.0590 | 0.9955 | 0.1186 | 0.8940 | 0.1194 | 0.7036 | 0.0960 | 0.8989 |
| 0.0594 | 0.9952 | 0.1188 | 0.8936 | 0.1191 | 0.7045 | 0.0959 | 0.8993 |
| 0.0597 | 0.9948 | 0.1189 | 0.8931 | 0.1188 | 0.7054 | 0.0957 | 0.8997 |
| 0.0600 | 0.9945 | 0.1190 | 0.8926 | 0.1186 | 0.7063 | 0.0956 | 0.9001 |
| 0.0603 | 0.9942 | 0.1192 | 0.8922 | 0.1183 | 0.7072 | 0.0954 | 0.9006 |

-continued

| Column 1 | | Column 2 | | Column 3 | | Column 4 | |
|---|---|---|---|---|---|---|---|
| x | y | x | y | x | y | x | y |
| 0.0606 | 0.9939 | 0.1193 | 0.8917 | 0.1180 | 0.7081 | 0.0953 | 0.9010 |
| 0.0609 | 0.9935 | 0.1194 | 0.8912 | 0.1178 | 0.7090 | 0.0951 | 0.9014 |
| 0.0612 | 0.9932 | 0.1196 | 0.8908 | 0.1175 | 0.7099 | 0.0950 | 0.9018 |
| 0.0615 | 0.9929 | 0.1197 | 0.8903 | 0.1173 | 0.7108 | 0.0948 | 0.9022 |
| 0.0619 | 0.9926 | 0.1198 | 0.8898 | 0.1170 | 0.7116 | 0.0947 | 0.9026 |
| 0.0622 | 0.9923 | 0.1200 | 0.8894 | 0.1168 | 0.7125 | 0.0945 | 0.9031 |
| 0.0625 | 0.9919 | 0.1201 | 0.8889 | 0.1165 | 0.7134 | 0.0944 | 0.9035 |
| 0.0628 | 0.9916 | 0.1202 | 0.8884 | 0.1163 | 0.7143 | 0.0942 | 0.9039 |
| 0.0631 | 0.9913 | 0.1204 | 0.8879 | 0.1161 | 0.7152 | 0.0941 | 0.9043 |
| 0.0634 | 0.9910 | 0.1205 | 0.8875 | 0.1158 | 0.7161 | 0.0939 | 0.9047 |
| 0.0637 | 0.9906 | 0.1206 | 0.8870 | 0.1156 | 0.7170 | 0.0937 | 0.9051 |
| 0.0640 | 0.9903 | 0.1207 | 0.8865 | 0.1154 | 0.7179 | 0.0936 | 0.9055 |
| 0.0643 | 0.9900 | 0.1209 | 0.8861 | 0.1152 | 0.7188 | 0.0934 | 0.9059 |
| 0.0646 | 0.9896 | 0.1210 | 0.8856 | 0.1149 | 0.7197 | 0.0933 | 0.9063 |
| 0.0649 | 0.9893 | 0.1211 | 0.8851 | 0.1147 | 0.7206 | 0.0931 | 0.9068 |
| 0.0652 | 0.9890 | 0.1212 | 0.8846 | 0.1145 | 0.7215 | 0.0929 | 0.9072 |
| 0.0655 | 0.9886 | 0.1214 | 0.8842 | 0.1143 | 0.7225 | 0.0928 | 0.9076 |
| 0.0658 | 0.9883 | 0.1215 | 0.8837 | 0.1141 | 0.7234 | 0.0926 | 0.9080 |
| 0.0661 | 0.9880 | 0.1216 | 0.8832 | 0.1139 | 0.7243 | 0.0925 | 0.9084 |
| 0.0664 | 0.9876 | 0.1217 | 0.8827 | 0.1137 | 0.7252 | 0.0923 | 0.9088 |
| 0.0667 | 0.9873 | 0.1218 | 0.8823 | 0.1135 | 0.7261 | 0.0921 | 0.9092 |
| 0.0670 | 0.9870 | 0.1220 | 0.8818 | 0.1133 | 0.7270 | 0.0920 | 0.9096 |
| 0.0673 | 0.9866 | 0.1221 | 0.8813 | 0.1131 | 0.7279 | 0.0918 | 0.9100 |
| 0.0676 | 0.9863 | 0.1222 | 0.8808 | 0.1129 | 0.7288 | 0.0916 | 0.9104 |
| 0.0679 | 0.9860 | 0.1223 | 0.8804 | 0.1127 | 0.7297 | 0.0915 | 0.9108 |
| 0.0682 | 0.9856 | 0.1224 | 0.8799 | 0.1125 | 0.7306 | 0.0913 | 0.9112 |
| 0.0685 | 0.9853 | 0.1225 | 0.8794 | 0.1124 | 0.7315 | 0.0911 | 0.9116 |
| 0.0688 | 0.9849 | 0.1226 | 0.8789 | 0.1122 | 0.7324 | 0.0909 | 0.9120 |
| 0.0691 | 0.9846 | 0.1227 | 0.8785 | 0.1120 | 0.7334 | 0.0908 | 0.9125 |
| 0.0694 | 0.9843 | 0.1229 | 0.8780 | 0.1119 | 0.7343 | 0.0906 | 0.9129 |
| 0.0697 | 0.9839 | 0.1230 | 0.8775 | 0.1117 | 0.7352 | 0.0904 | 0.9133 |
| 0.0700 | 0.9836 | 0.1231 | 0.8770 | 0.1115 | 0.7361 | 0.0903 | 0.9137 |
| 0.0703 | 0.9832 | 0.1232 | 0.8765 | 0.1114 | 0.7370 | 0.0901 | 0.9141 |
| 0.0706 | 0.9829 | 0.1233 | 0.8761 | 0.1112 | 0.7379 | 0.0899 | 0.9145 |
| 0.0709 | 0.9825 | 0.1234 | 0.8756 | 0.1111 | 0.7388 | 0.0897 | 0.9149 |
| 0.0712 | 0.9822 | 0.1235 | 0.8751 | 0.1109 | 0.7398 | 0.0896 | 0.9153 |
| 0.0715 | 0.9819 | 0.1236 | 0.8746 | 0.1108 | 0.7407 | 0.0894 | 0.9157 |
| 0.0718 | 0.9815 | 0.1237 | 0.8741 | 0.1106 | 0.7416 | 0.0892 | 0.9161 |
| 0.0721 | 0.9812 | 0.1238 | 0.8737 | 0.1105 | 0.7425 | 0.0890 | 0.9165 |
| 0.0723 | 0.9808 | 0.1239 | 0.8732 | 0.1103 | 0.7434 | 0.0889 | 0.9169 |
| 0.0726 | 0.9805 | 0.1241 | 0.8725 | 0.1102 | 0.7444 | 0.0887 | 0.9173 |
| 0.0729 | 0.9801 | 0.1242 | 0.8716 | 0.1101 | 0.7453 | 0.0885 | 0.9177 |
| 0.0732 | 0.9798 | 0.1244 | 0.8708 | 0.1099 | 0.7462 | 0.0883 | 0.9181 |
| 0.0735 | 0.9794 | 0.1246 | 0.8699 | 0.1098 | 0.7471 | 0.0881 | 0.9184 |
| 0.0738 | 0.9791 | 0.1247 | 0.8690 | 0.1097 | 0.7480 | 0.0879 | 0.9188 |
| 0.0741 | 0.9787 | 0.1249 | 0.8680 | 0.1096 | 0.7490 | 0.0878 | 0.9192 |
| 0.0744 | 0.9784 | 0.1251 | 0.8671 | 0.1095 | 0.7499 | 0.0876 | 0.9196 |
| 0.0746 | 0.9780 | 0.1253 | 0.8662 | 0.1093 | 0.7508 | 0.0874 | 0.9200 |
| 0.0749 | 0.9776 | 0.1254 | 0.8653 | 0.1092 | 0.7517 | 0.0872 | 0.9204 |
| 0.0752 | 0.9773 | 0.1256 | 0.8644 | 0.1091 | 0.7526 | 0.0870 | 0.9208 |
| 0.0755 | 0.9769 | 0.1257 | 0.8634 | 0.1090 | 0.7536 | 0.0868 | 0.9212 |
| 0.0758 | 0.9766 | 0.1259 | 0.8625 | 0.1089 | 0.7545 | 0.0867 | 0.9216 |
| 0.0761 | 0.9762 | 0.1260 | 0.8616 | 0.1088 | 0.7554 | 0.0865 | 0.9220 |
| 0.0763 | 0.9759 | 0.1262 | 0.8607 | 0.1087 | 0.7563 | 0.0863 | 0.9224 |
| 0.0766 | 0.9755 | 0.1263 | 0.8598 | 0.1087 | 0.7573 | 0.0861 | 0.9228 |
| 0.0769 | 0.9752 | 0.1265 | 0.8588 | 0.1086 | 0.7582 | 0.0859 | 0.9232 |
| 0.0772 | 0.9748 | 0.1266 | 0.8579 | 0.1085 | 0.7591 | 0.0857 | 0.9236 |
| 0.0775 | 0.9744 | 0.1267 | 0.8570 | 0.1084 | 0.7600 | 0.0855 | 0.9239 |
| 0.0778 | 0.9741 | 0.1269 | 0.8561 | 0.1083 | 0.7610 | 0.0853 | 0.9243 |
| 0.0780 | 0.9737 | 0.1270 | 0.8551 | 0.1083 | 0.7619 | 0.0851 | 0.9247 |
| 0.0783 | 0.9733 | 0.1271 | 0.8542 | 0.1082 | 0.7628 | 0.0849 | 0.9251 |
| 0.0786 | 0.9730 | 0.1272 | 0.8533 | 0.1081 | 0.7637 | 0.0847 | 0.9255 |
| 0.0789 | 0.9726 | 0.1273 | 0.8523 | 0.1081 | 0.7647 | 0.0846 | 0.9259 |
| 0.0791 | 0.9723 | 0.1274 | 0.8514 | 0.1080 | 0.7656 | 0.0844 | 0.9263 |
| 0.0794 | 0.9719 | 0.1275 | 0.8505 | 0.1079 | 0.7665 | 0.0842 | 0.9267 |
| 0.0797 | 0.9715 | 0.1277 | 0.8496 | 0.1079 | 0.7674 | 0.0840 | 0.9270 |
| 0.0800 | 0.9712 | 0.1278 | 0.8486 | 0.1078 | 0.7684 | 0.0838 | 0.9274 |
| 0.0802 | 0.9708 | 0.1278 | 0.8477 | 0.1078 | 0.7693 | 0.0836 | 0.9278 |
| 0.0805 | 0.9704 | 0.1279 | 0.8468 | 0.1077 | 0.7702 | 0.0834 | 0.9282 |
| 0.0808 | 0.9701 | 0.1280 | 0.8458 | 0.1077 | 0.7712 | 0.0832 | 0.9286 |
| 0.0811 | 0.9697 | 0.1281 | 0.8449 | 0.1077 | 0.7721 | 0.0830 | 0.9290 |
| 0.0813 | 0.9693 | 0.1282 | 0.8440 | 0.1076 | 0.7730 | 0.0828 | 0.9293 |
| 0.0816 | 0.9690 | 0.1283 | 0.8431 | 0.1076 | 0.7739 | 0.0826 | 0.9297 |
| 0.0819 | 0.9686 | 0.1283 | 0.8421 | 0.1076 | 0.7749 | 0.0824 | 0.9301 |
| 0.0821 | 0.9682 | 0.1284 | 0.8412 | 0.1075 | 0.7758 | 0.0822 | 0.9305 |

-continued

| Column 1 | | Column 2 | | Column 3 | | Column 4 | |
|---|---|---|---|---|---|---|---|
| x | y | x | y | x | y | x | y |
| 0.0824 | 0.9678 | 0.1285 | 0.8403 | 0.1075 | 0.7767 | 0.0820 | 0.9309 |
| 0.0827 | 0.9675 | 0.1286 | 0.8393 | 0.1075 | 0.7777 | 0.0818 | 0.9313 |
| 0.0829 | 0.9671 | 0.1286 | 0.8384 | 0.1075 | 0.7786 | 0.0816 | 0.9316 |
| 0.0832 | 0.9667 | 0.1287 | 0.8375 | 0.1075 | 0.7795 | 0.0814 | 0.9320 |
| 0.0835 | 0.9664 | 0.1287 | 0.8365 | 0.1075 | 0.7804 | 0.0811 | 0.9324 |
| 0.0837 | 0.9660 | 0.1288 | 0.8356 | 0.1074 | 0.7814 | 0.0809 | 0.9328 |
| 0.0840 | 0.9656 | 0.1288 | 0.8347 | 0.1074 | 0.7823 | 0.0807 | 0.9331 |
| 0.0843 | 0.9652 | 0.1289 | 0.8337 | 0.1074 | 0.7832 | 0.0805 | 0.9335 |
| 0.0845 | 0.9648 | 0.1289 | 0.8328 | 0.1074 | 0.7842 | 0.0803 | 0.9339 |
| 0.0848 | 0.9645 | 0.1289 | 0.8319 | 0.1075 | 0.7851 | 0.0801 | 0.9343 |
| 0.0851 | 0.9641 | 0.1290 | 0.8309 | 0.1075 | 0.7860 | 0.0799 | 0.9346 |
| 0.0853 | 0.9637 | 0.1290 | 0.8300 | 0.1075 | 0.7869 | 0.0797 | 0.9350 |
| 0.0856 | 0.9633 | 0.1290 | 0.8291 | 0.1075 | 0.7879 | 0.0795 | 0.9354 |
| 0.0858 | 0.9630 | 0.1290 | 0.8281 | 0.1075 | 0.7888 | 0.0793 | 0.9358 |
| 0.0861 | 0.9626 | 0.1291 | 0.8272 | 0.1075 | 0.7897 | 0.0791 | 0.9361 |
| 0.0864 | 0.9622 | 0.1291 | 0.8263 | 0.1076 | 0.7907 | 0.0788 | 0.9365 |
| 0.0866 | 0.9618 | 0.1291 | 0.8253 | 0.1076 | 0.7916 | 0.0786 | 0.9369 |
| 0.0869 | 0.9614 | 0.1291 | 0.8244 | 0.1076 | 0.7925 | 0.0784 | 0.9373 |
| 0.0871 | 0.9610 | 0.1291 | 0.8235 | 0.1077 | 0.7934 | 0.0782 | 0.9376 |
| 0.0874 | 0.9607 | 0.1291 | 0.8225 | 0.1077 | 0.7944 | 0.0780 | 0.9380 |
| 0.0877 | 0.9603 | 0.1291 | 0.8216 | 0.1077 | 0.7953 | 0.0778 | 0.9384 |
| 0.0879 | 0.9599 | 0.1291 | 0.8207 | 0.1078 | 0.7962 | 0.0776 | 0.9387 |
| 0.0882 | 0.9595 | 0.1291 | 0.8197 | 0.1078 | 0.7971 | 0.0773 | 0.9391 |
| 0.0884 | 0.9591 | 0.1291 | 0.8188 | 0.1079 | 0.7981 | 0.0771 | 0.9395 |
| 0.0887 | 0.9587 | 0.1290 | 0.8179 | 0.1079 | 0.7990 | 0.0769 | 0.9398 |
| 0.0889 | 0.9584 | 0.1290 | 0.8169 | 0.1080 | 0.7999 | 0.0767 | 0.9402 |
| 0.0892 | 0.9580 | 0.1290 | 0.8160 | 0.1081 | 0.8009 | 0.0765 | 0.9406 |
| 0.0894 | 0.9576 | 0.1290 | 0.8151 | 0.1081 | 0.8018 | 0.0762 | 0.9409 |
| 0.0897 | 0.9572 | 0.1289 | 0.8141 | 0.1082 | 0.8027 | 0.0760 | 0.9413 |
| 0.0899 | 0.9568 | 0.1289 | 0.8132 | 0.1083 | 0.8036 | 0.0758 | 0.9417 |
| 0.0902 | 0.9564 | 0.1289 | 0.8122 | 0.1083 | 0.8045 | 0.0756 | 0.9420 |
| 0.0904 | 0.9560 | 0.1288 | 0.8113 | 0.1084 | 0.8054 | 0.0754 | 0.9424 |
| 0.0907 | 0.9556 | 0.1288 | 0.8104 | 0.1085 | 0.8063 | 0.0751 | 0.9428 |
| 0.0909 | 0.9552 | 0.1287 | 0.8095 | 0.1085 | 0.8071 | 0.0749 | 0.9431 |
| 0.0912 | 0.9548 | 0.1287 | 0.8085 | 0.1086 | 0.8080 | 0.0747 | 0.9435 |
| 0.0914 | 0.9544 | 0.1286 | 0.8076 | 0.1087 | 0.8088 | 0.0745 | 0.9438 |
| 0.0917 | 0.9541 | 0.1286 | 0.8067 | 0.1087 | 0.8097 | 0.0742 | 0.9442 |
| 0.0919 | 0.9537 | 0.1285 | 0.8057 | 0.1088 | 0.8106 | 0.0740 | 0.9446 |
| 0.0921 | 0.9533 | 0.1284 | 0.8048 | 0.1088 | 0.8114 | 0.0738 | 0.9449 |
| 0.0924 | 0.9529 | 0.1283 | 0.8039 | 0.1088 | 0.8123 | 0.0735 | 0.9453 |
| 0.0926 | 0.9525 | 0.1283 | 0.8029 | 0.1089 | 0.8131 | 0.0733 | 0.9456 |
| 0.0929 | 0.9521 | 0.1282 | 0.8021 | 0.1089 | 0.8140 | 0.0731 | 0.9460 |
| 0.0931 | 0.9517 | 0.1281 | 0.8012 | 0.1089 | 0.8148 | 0.0729 | 0.9464 |
| 0.0934 | 0.9513 | 0.1281 | 0.8004 | 0.1090 | 0.8157 | 0.0726 | 0.9467 |
| 0.0936 | 0.9509 | 0.1280 | 0.7995 | 0.1090 | 0.8166 | 0.0724 | 0.9471 |
| 0.0938 | 0.9505 | 0.1280 | 0.7986 | 0.1090 | 0.8174 | 0.0722 | 0.9474 |
| 0.0941 | 0.9501 | 0.1279 | 0.7978 | 0.1090 | 0.8183 | 0.0719 | 0.9478 |
| 0.0943 | 0.9497 | 0.1279 | 0.7969 | 0.1091 | 0.8191 | 0.0717 | 0.9481 |
| 0.0946 | 0.9493 | 0.1278 | 0.7961 | 0.1091 | 0.8200 | 0.0715 | 0.9485 |
| 0.0948 | 0.9489 | 0.1278 | 0.7952 | 0.1091 | 0.8208 | 0.0712 | 0.9488 |
| 0.0950 | 0.9485 | 0.1277 | 0.7944 | 0.1091 | 0.8217 | 0.0710 | 0.9492 |
| 0.0953 | 0.9481 | 0.1277 | 0.7935 | 0.1091 | 0.8226 | 0.0708 | 0.9496 |
| 0.0955 | 0.9477 | 0.1276 | 0.7926 | 0.1091 | 0.8234 | 0.0705 | 0.9499 |
| 0.0957 | 0.9473 | 0.1276 | 0.7918 | 0.1091 | 0.8243 | 0.0703 | 0.9503 |
| 0.0960 | 0.9469 | 0.1276 | 0.7909 | 0.1091 | 0.8251 | 0.0701 | 0.9506 |
| 0.0962 | 0.9465 | 0.1276 | 0.7901 | 0.1091 | 0.8260 | 0.0698 | 0.9510 |
| 0.0964 | 0.9460 | 0.1275 | 0.7892 | 0.1091 | 0.8268 | 0.0696 | 0.9513 |
| 0.0967 | 0.9456 | 0.1275 | 0.7883 | 0.1090 | 0.8277 | 0.0693 | 0.9517 |
| 0.0969 | 0.9452 | 0.1275 | 0.7875 | 0.1090 | 0.8286 | 0.0691 | 0.9520 |
| 0.0971 | 0.9448 | 0.1275 | 0.7866 | 0.1090 | 0.8294 | 0.0689 | 0.9523 |
| 0.0973 | 0.9444 | 0.1275 | 0.7858 | 0.1090 | 0.8303 | 0.0686 | 0.9527 |
| 0.0976 | 0.9440 | 0.1275 | 0.7849 | 0.1089 | 0.8311 | 0.0684 | 0.9530 |
| 0.0978 | 0.9436 | 0.1274 | 0.7840 | 0.1089 | 0.8320 | 0.0681 | 0.9534 |
| 0.0980 | 0.9432 | 0.1274 | 0.7832 | 0.1089 | 0.8329 | 0.0679 | 0.9537 |
| 0.0983 | 0.9428 | 0.1274 | 0.7823 | 0.1088 | 0.8337 | 0.0677 | 0.9541 |
| 0.0985 | 0.9424 | 0.1274 | 0.7815 | 0.1088 | 0.8346 | 0.0674 | 0.9544 |
| 0.0987 | 0.9420 | 0.1275 | 0.7806 | 0.1088 | 0.8354 | 0.0672 | 0.9548 |
| 0.0989 | 0.9415 | 0.1275 | 0.7797 | 0.1087 | 0.8363 | 0.0669 | 0.9551 |
| 0.0992 | 0.9411 | 0.1275 | 0.7789 | 0.1087 | 0.8371 | 0.0667 | 0.9555 |
| 0.0994 | 0.9407 | 0.1275 | 0.7780 | 0.1086 | 0.8380 | 0.0664 | 0.9558 |
| 0.0996 | 0.9403 | 0.1275 | 0.7772 | 0.1085 | 0.8388 | 0.0662 | 0.9561 |
| 0.0998 | 0.9399 | 0.1275 | 0.7763 | 0.1085 | 0.8397 | 0.0659 | 0.9565 |
| 0.1000 | 0.9395 | 0.1276 | 0.7755 | 0.1084 | 0.8406 | 0.0657 | 0.9568 |
| 0.1003 | 0.9391 | 0.1276 | 0.7746 | 0.1083 | 0.8414 | 0.0655 | 0.9572 |
| 0.1005 | 0.9387 | 0.1276 | 0.7737 | 0.1083 | 0.8423 | 0.0652 | 0.9575 |

-continued

| Column 1 | | Column 2 | | Column 3 | | Column 4 | |
|---|---|---|---|---|---|---|---|
| x | y | x | y | x | y | x | y |
| 0.1007 | 0.9382 | 0.1276 | 0.7729 | 0.1082 | 0.8431 | 0.0650 | 0.9578 |
| 0.1009 | 0.9378 | 0.1277 | 0.7720 | 0.1081 | 0.8440 | 0.0647 | 0.9582 |
| 0.1011 | 0.9374 | 0.1277 | 0.7712 | 0.1080 | 0.8448 | 0.0645 | 0.9585 |
| 0.1013 | 0.9370 | 0.1278 | 0.7703 | 0.1079 | 0.8457 | 0.0642 | 0.9588 |
| 0.1016 | 0.9366 | 0.1278 | 0.7694 | 0.1079 | 0.8465 | 0.0640 | 0.9592 |
| 0.1018 | 0.9361 | 0.1278 | 0.7686 | 0.1078 | 0.8474 | 0.0637 | 0.9595 |
| 0.1020 | 0.9357 | 0.1279 | 0.7677 | 0.1077 | 0.8482 | 0.0635 | 0.9598 |
| 0.1022 | 0.9353 | 0.1279 | 0.7669 | 0.1076 | 0.8491 | 0.0632 | 0.9602 |
| 0.1024 | 0.9349 | 0.1280 | 0.7660 | 0.1075 | 0.8500 | 0.0629 | 0.9605 |
| 0.1026 | 0.9345 | 0.1281 | 0.7652 | 0.1074 | 0.8508 | 0.0627 | 0.9608 |
| 0.1028 | 0.9340 | 0.1281 | 0.7643 | 0.1073 | 0.8517 | 0.0624 | 0.9612 |
| 0.1030 | 0.9336 | 0.1282 | 0.7634 | 0.1072 | 0.8525 | 0.0622 | 0.9615 |
| 0.1033 | 0.9332 | 0.1283 | 0.7626 | 0.1070 | 0.8534 | 0.0619 | 0.9618 |
| 0.1035 | 0.9328 | 0.1283 | 0.7617 | 0.1069 | 0.8542 | 0.0617 | 0.9622 |
| 0.1037 | 0.9323 | 0.1284 | 0.7609 | 0.1068 | 0.8551 | 0.0614 | 0.9625 |
| 0.1039 | 0.9319 | 0.1285 | 0.7600 | 0.1067 | 0.8559 | 0.0612 | 0.9628 |
| 0.1041 | 0.9315 | 0.1286 | 0.7592 | 0.1066 | 0.8568 | 0.0609 | 0.9632 |
| 0.1043 | 0.9311 | 0.1286 | 0.7583 | 0.1064 | 0.8576 | 0.0606 | 0.9635 |
| 0.1045 | 0.9306 | 0.1287 | 0.7574 | 0.1063 | 0.8585 | 0.0604 | 0.9638 |
| 0.1047 | 0.9302 | 0.1288 | 0.7566 | 0.1062 | 0.8593 | 0.0601 | 0.9641 |
| 0.1049 | 0.9298 | 0.1289 | 0.7557 | 0.1060 | 0.8601 | 0.0599 | 0.9645 |
| 0.1051 | 0.9294 | 0.1290 | 0.7549 | 0.1059 | 0.8610 | 0.0596 | 0.9648 |
| 0.1053 | 0.9289 | 0.1291 | 0.7540 | 0.1057 | 0.8618 | 0.0593 | 0.9651 |
| 0.1055 | 0.9285 | 0.1292 | 0.7532 | 0.1056 | 0.8627 | 0.0591 | 0.9654 |
| 0.1057 | 0.9281 | 0.1293 | 0.7523 | 0.1054 | 0.8635 | 0.0588 | 0.9658 |
| 0.1059 | 0.9276 | 0.1294 | 0.7515 | 0.1053 | 0.8644 | 0.0586 | 0.9661 |
| 0.1061 | 0.9272 | 0.1295 | 0.7506 | 0.1051 | 0.8652 | 0.0583 | 0.9664 |
| 0.1063 | 0.9268 | 0.1296 | 0.7498 | 0.1049 | 0.8661 | 0.0580 | 0.9667 |
| 0.1065 | 0.9264 | 0.1298 | 0.7489 | 0.1048 | 0.8669 | 0.0578 | 0.9670 |
| 0.1067 | 0.9259 | 0.1299 | 0.7481 | 0.1046 | 0.8677 | 0.0575 | 0.9674 |
| 0.1069 | 0.9255 | 0.1300 | 0.7472 | 0.1045 | 0.8684 | 0.0572 | 0.9677 |
| 0.1071 | 0.9251 | 0.1301 | 0.7464 | 0.1043 | 0.8691 | 0.0570 | 0.9680 |
| 0.1073 | 0.9246 | 0.1302 | 0.7455 | 0.1042 | 0.8695 | 0.0567 | 0.9683 |
| 0.1075 | 0.9242 | 0.1304 | 0.7447 | 0.1041 | 0.8700 | 0.0564 | 0.9686 |
| 0.1077 | 0.9238 | 0.1305 | 0.7438 | 0.1040 | 0.8704 | 0.0562 | 0.9690 |
| 0.1079 | 0.9233 | 0.1306 | 0.7430 | 0.1039 | 0.8709 | 0.0559 | 0.9693 |
| 0.1081 | 0.9229 | 0.1308 | 0.7421 | 0.1039 | 0.8713 | 0.0556 | 0.9696 |
| 0.1082 | 0.9225 | 0.1309 | 0.7413 | 0.1038 | 0.8718 | 0.0554 | 0.9699 |
| 0.1084 | 0.9220 | 0.1311 | 0.7404 | 0.1037 | 0.8722 | 0.0551 | 0.9702 |
| 0.1086 | 0.9216 | 0.1312 | 0.7396 | 0.1036 | 0.8726 | 0.0548 | 0.9705 |
| 0.1088 | 0.9211 | 0.1314 | 0.7387 | 0.1035 | 0.8731 | 0.0546 | 0.9709 |
| 0.1090 | 0.9207 | 0.1315 | 0.7379 | 0.1034 | 0.8735 | 0.0543 | 0.9712 |
| 0.1092 | 0.9203 | 0.1317 | 0.7370 | 0.1033 | 0.8740 | 0.0540 | 0.9715 |
| 0.1094 | 0.9198 | 0.1318 | 0.7362 | 0.1032 | 0.8744 | 0.0538 | 0.9718 |
| 0.1096 | 0.9194 | 0.1320 | 0.7354 | 0.1031 | 0.8748 | 0.0535 | 0.9721 |
| 0.1097 | 0.9189 | 0.1322 | 0.7345 | 0.1029 | 0.8753 | 0.0532 | 0.9724 |
| 0.1099 | 0.9185 | 0.1323 | 0.7337 | 0.1028 | 0.8757 | 0.0529 | 0.9727 |
| 0.1101 | 0.9181 | 0.1325 | 0.7328 | 0.1027 | 0.8762 | 0.0527 | 0.9730 |
| 0.1103 | 0.9176 | 0.1327 | 0.7320 | 0.1026 | 0.8766 | 0.0524 | 0.9733 |
| 0.1105 | 0.9172 | 0.1329 | 0.7311 | 0.1025 | 0.8770 | 0.0521 | 0.9736 |
| 0.1107 | 0.9167 | 0.1330 | 0.7303 | 0.1024 | 0.8775 | 0.0518 | 0.9740 |
| 0.1108 | 0.9163 | 0.1332 | 0.7295 | 0.1023 | 0.8779 | 0.0516 | 0.9743 |
| 0.1110 | 0.9159 | 0.1334 | 0.7286 | 0.1022 | 0.8784 | 0.0513 | 0.9746 |
| 0.1112 | 0.9154 | 0.1336 | 0.7278 | 0.1021 | 0.8788 | 0.0510 | 0.9749 |
| 0.1114 | 0.9150 | 0.1338 | 0.7269 | 0.1020 | 0.8792 | 0.0507 | 0.9752 |
| 0.1115 | 0.9145 | 0.1340 | 0.7261 | 0.1019 | 0.8797 | 0.0505 | 0.9755 |
| 0.1117 | 0.9141 | 0.1342 | 0.7253 | 0.1018 | 0.8801 | 0.0502 | 0.9758 |
| 0.1119 | 0.9136 | 0.1344 | 0.7244 | 0.1016 | 0.8805 | 0.0499 | 0.9761 |
| 0.1121 | 0.9132 | 0.1346 | 0.7236 | 0.1015 | 0.8810 | 0.0496 | 0.9764 |
| 0.1122 | 0.9127 | 0.1348 | 0.7228 | 0.1014 | 0.8814 | 0.0493 | 0.9767 |
| 0.1124 | 0.9123 | 0.1350 | 0.7219 | 0.1013 | 0.8818 | 0.0491 | 0.9770 |
| 0.1126 | 0.9118 | 0.1352 | 0.7211 | 0.1012 | 0.8823 | 0.0488 | 0.9773 |
| 0.1128 | 0.9114 | 0.1354 | 0.7203 | 0.1011 | 0.8827 | 0.0485 | 0.9776 |
| 0.1129 | 0.9109 | 0.1356 | 0.7194 | 0.1009 | 0.8831 | 0.0482 | 0.9779 |
| 0.1131 | 0.9105 | 0.1359 | 0.7186 | 0.1008 | 0.8836 | 0.0479 | 0.9782 |
| 0.1133 | 0.9100 | 0.1361 | 0.7178 | 0.1007 | 0.8840 | 0.0477 | 0.9785 |
| 0.1134 | 0.9096 | 0.1363 | 0.7169 | 0.1006 | 0.8844 | 0.0474 | 0.9788 |
| 0.1136 | 0.9091 | 0.1365 | 0.7161 | 0.1005 | 0.8849 | 0.0471 | 0.9791 |
| 0.1138 | 0.9087 | 0.1368 | 0.7153 | 0.1003 | 0.8853 | 0.0468 | 0.9794 |
| 0.1139 | 0.9082 | 0.1370 | 0.7145 | 0.1002 | 0.8857 | 0.0465 | 0.9797 |
| 0.1141 | 0.9078 | 0.1372 | 0.7136 | 0.1001 | 0.8862 | 0.0462 | 0.9800 |
| 0.1143 | 0.9073 | 0.1375 | 0.7128 | 0.1000 | 0.8866 | 0.0460 | 0.9803 |
| 0.1144 | 0.9069 | 0.1377 | 0.7120 | 0.0998 | 0.8870 | 0.0457 | 0.9805 |
| 0.1146 | 0.9064 | 0.1380 | 0.7112 | 0.0997 | 0.8875 | 0.0454 | 0.9808 |
| 0.1147 | 0.9060 | 0.1382 | 0.7103 | 0.0996 | 0.8879 | 0.0451 | 0.9811 |

-continued

| Column 1 | | Column 2 | | Column 3 | | Column 4 | |
|---|---|---|---|---|---|---|---|
| x | y | x | y | x | y | x | y |
| 0.1149 | 0.9055 | 0.1385 | 0.7095 | 0.0995 | 0.8883 | 0.0448 | 0.9814 |
| 0.1151 | 0.9051 | 0.1387 | 0.7087 | 0.0993 | 0.8887 | 0.0445 | 0.9817 |
| 0.1152 | 0.9046 | 0.1390 | 0.7079 | 0.0992 | 0.8892 | 0.0442 | 0.9820 |
| 0.1154 | 0.9042 | 0.1393 | 0.7071 | 0.0991 | 0.8896 | 0.0440 | 0.9823 |
| 0.1155 | 0.9037 | 0.1395 | 0.7062 | 0.0989 | 0.8900 | 0.0437 | 0.9826 |
| 0.1157 | 0.9032 | 0.1398 | 0.7054 | 0.0988 | 0.8904 | 0.0434 | 0.9829 |
| 0.1158 | 0.9028 | 0.1401 | 0.7046 | 0.0987 | 0.8909 | 0.0431 | 0.9831 |
| 0.1160 | 0.9023 | 0.1403 | 0.7038 | 0.0986 | 0.8913 | 0.0428 | 0.9834 |
| 0.1161 | 0.9019 | 0.1406 | 0.7030 | 0.0984 | 0.8917 | 0.0425 | 0.9837 |
| 0.1163 | 0.9014 | 0.1409 | 0.7022 | 0.0983 | 0.8921 | 0.0422 | 0.9840 |
| 0.1165 | 0.9010 | 0.1412 | 0.7014 | 0.0981 | 0.8926 | 0.0422 | 0.9841 |
| 0.1166 | 0.9005 | 0.1414 | 0.7005 | 0.0980 | 0.8930 | 0.0561 | 0.9984 |
| 0.1168 | 0.9000 | 0.1417 | 0.6997 | 0.0979 | 0.8934 | | |
| 0.1169 | 0.8996 | 0.1229 | 0.6930 | 0.0977 | 0.8938 | | |
| 0.1171 | 0.8991 | 0.1226 | 0.6939 | 0.0976 | 0.8943 | | |

Figure 5:
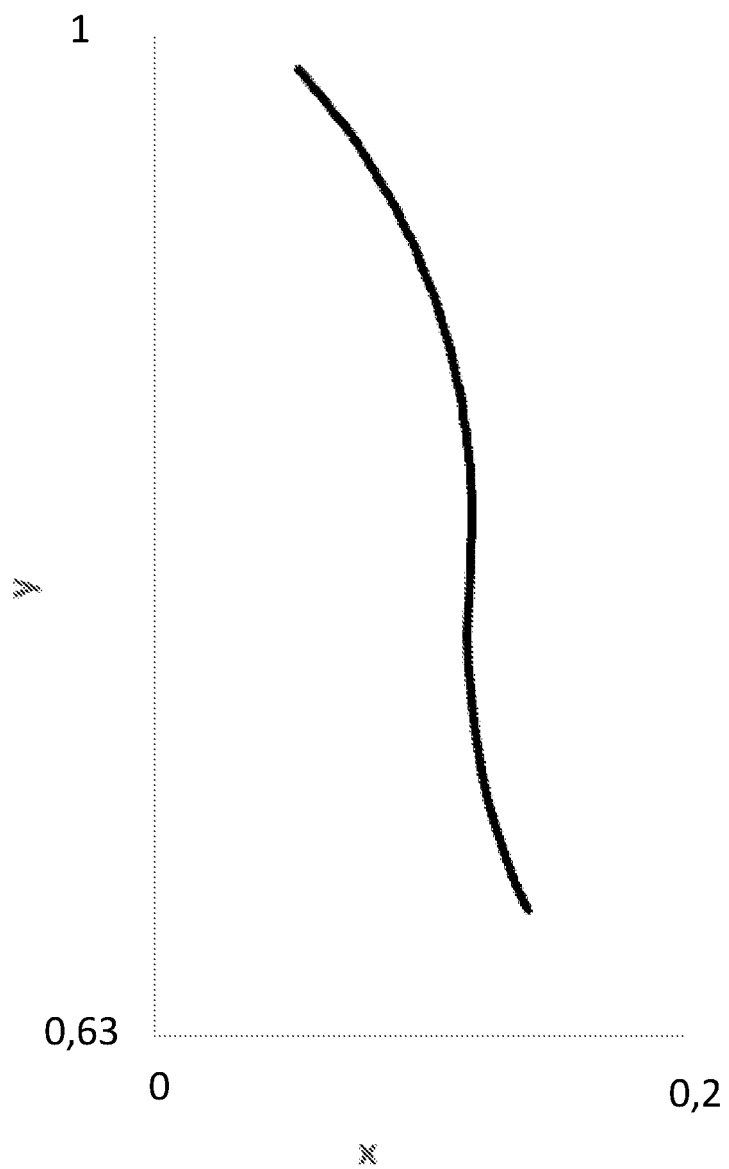
FIG. 5 illustrates an envelope for one of the S-shaped profiles in a non-dimensional representation.

FIG. 5 illustrates an envelope for one of the S-shaped profiles S2 in a non-dimensional representation. The envelope of the S-shaped profile shown in FIG. 5 represents only a part of the envelope of the total S-shaped profile S2. The term envelope refers to the section of the S-shaped profile that is actually designed or covered by the disclosed data. Hence, FIG. 5 shows an envelope of the S-shaped profile S2. The part shown in FIG. 5 covers the same range covered by the envelope fitting into a frame with the non-dimensional outer limitations L2 as disclosed in FIG. 4 and the columns below. To this end, one of the S-shaped profiles S2 (not shown in FIG. 5) has an envelope including all of the non-dimensional x-y-coordinates in all following columns:

| Column 1 | | Column 2 | | Column 3 | | Column 4 | |
|---|---|---|---|---|---|---|---|
| x | y | x | y | x | y | x | y |
| 0.1404 | 0.6794 | 0.1190 | 0.8288 | 0.1144 | 0.8696 | 0.1070 | 0.8978 |
| 0.1361 | 0.6873 | 0.1189 | 0.8315 | 0.1144 | 0.8696 | 0.1048 | 0.9039 |
| 0.1326 | 0.6955 | 0.1188 | 0.8351 | 0.1144 | 0.8696 | 0.1024 | 0.9104 |
| 0.1287 | 0.7074 | 0.1186 | 0.8378 | 0.1144 | 0.8696 | 0.0998 | 0.9168 |
| 0.1255 | 0.7186 | 0.1184 | 0.8413 | 0.1144 | 0.8696 | 0.0972 | 0.9226 |
| 0.1227 | 0.7308 | 0.1182 | 0.8440 | 0.1143 | 0.8705 | 0.0943 | 0.9288 |
| 0.1205 | 0.7431 | 0.1178 | 0.8476 | 0.1143 | 0.8705 | 0.0912 | 0.9348 |
| 0.1190 | 0.7547 | 0.1175 | 0.8503 | 0.1143 | 0.8705 | 0.0882 | 0.9403 |
| 0.1179 | 0.7671 | 0.1171 | 0.8538 | 0.1143 | 0.8705 | 0.0848 | 0.9461 |
| 0.1175 | 0.7796 | 0.1167 | 0.8565 | 0.1143 | 0.8705 | 0.0813 | 0.9518 |
| 0.1176 | 0.7912 | 0.1162 | 0.8600 | 0.1143 | 0.8705 | 0.0778 | 0.9569 |
| 0.1183 | 0.8037 | 0.1157 | 0.8627 | 0.1143 | 0.8705 | 0.0740 | 0.9623 |
| 0.1185 | 0.8064 | 0.1151 | 0.8662 | 0.1141 | 0.8711 | 0.0701 | 0.9676 |
| 0.1187 | 0.8100 | 0.1146 | 0.8688 | 0.1141 | 0.8711 | 0.0663 | 0.9724 |
| 0.1189 | 0.8127 | 0.1146 | 0.8688 | 0.1141 | 0.8711 | 0.0621 | 0.9774 |
| 0.1190 | 0.8163 | 0.1146 | 0.8688 | 0.1141 | 0.8711 | 0.0578 | 0.9822 |
| 0.1191 | 0.8190 | 0.1146 | 0.8688 | 0.1126 | 0.8780 | 0.0537 | 0.9866 |
| 0.1191 | 0.8225 | 0.1144 | 0.8696 | 0.1110 | 0.8844 | | |
| 0.1191 | 0.8252 | 0.1144 | 0.8696 | 0.1090 | 0.8912 | | |

Figure 6:
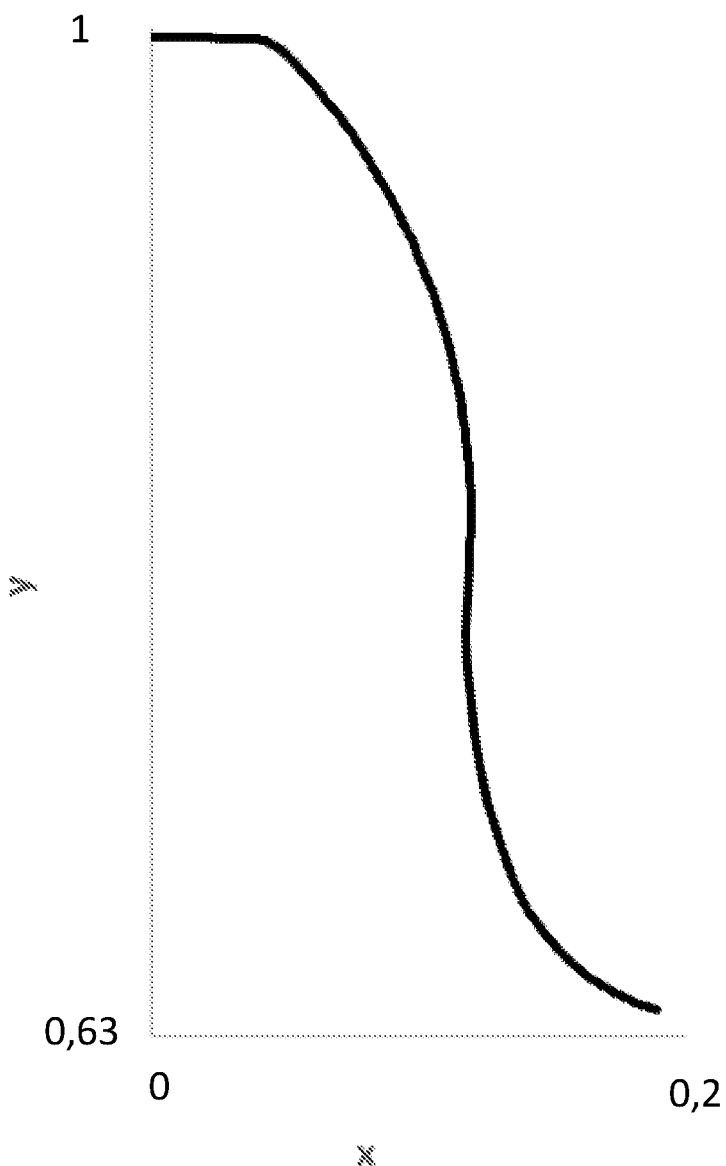
FIG. 6 illustrates an envelope for one of the S-shaped profiles in a non-dimensional representation.

FIG. 6 illustrates an envelope for one of the S-shaped profiles S2 in a non-dimensional representation. The envelope of the S-shaped profile shown in FIG. 6 represents the entire envelope of the total S-shaped profile S2. To this end, one of the S-shaped profiles S2 has an envelope comprising all of the non-dimensional x-y-coordinates in all of the following columns:

| Column 1 | | Column 2 | | Column 3 | | Column 4 | |
|---|---|---|---|---|---|---|---|
| x | y | x | y | x | y | x | y |
| 0.1887 | 0.6427 | 0.1191 | 0.8252 | 0.1143 | 0.8705 | 0.0740 | 0.9623 |
| 0.1802 | 0.6456 | 0.1190 | 0.8288 | 0.1143 | 0.8705 | 0.0701 | 0.9676 |
| 0.1721 | 0.6495 | 0.1189 | 0.8315 | 0.1143 | 0.8705 | 0.0663 | 0.9724 |
| 0.1645 | 0.6542 | 0.1188 | 0.8351 | 0.1143 | 0.8705 | 0.0621 | 0.9774 |
| 0.1573 | 0.6597 | 0.1186 | 0.8378 | 0.1143 | 0.8705 | 0.0578 | 0.9822 |
| 0.1514 | 0.6652 | 0.1184 | 0.8413 | 0.1143 | 0.8705 | 0.0537 | 0.9866 |
| 0.1456 | 0.6720 | 0.1182 | 0.8440 | 0.1143 | 0.8705 | 0.0492 | 0.9912 |
| 0.1404 | 0.6794 | 0.1178 | 0.8476 | 0.1141 | 0.8711 | 0.0482 | 0.9921 |
| 0.1361 | 0.6873 | 0.1175 | 0.8503 | 0.1141 | 0.8711 | 0.0471 | 0.9929 |
| 0.1326 | 0.6955 | 0.1171 | 0.8538 | 0.1141 | 0.8711 | 0.0459 | 0.9937 |
| 0.1287 | 0.7074 | 0.1167 | 0.8565 | 0.1141 | 0.8711 | 0.0447 | 0.9943 |
| 0.1255 | 0.7186 | 0.1162 | 0.8600 | 0.1126 | 0.8780 | 0.0435 | 0.9948 |
| 0.1227 | 0.7308 | 0.1157 | 0.8627 | 0.1110 | 0.8844 | 0.0422 | 0.9953 |
| 0.1205 | 0.7431 | 0.1151 | 0.8662 | 0.1090 | 0.8912 | 0.0409 | 0.9956 |
| 0.1190 | 0.7547 | 0.1146 | 0.8688 | 0.1070 | 0.8978 | 0.0395 | 0.9958 |
| 0.1179 | 0.7671 | 0.1146 | 0.8688 | 0.1048 | 0.9039 | 0.0382 | 0.9959 |
| 0.1175 | 0.7796 | 0.1146 | 0.8688 | 0.1024 | 0.9104 | 0.0340 | 0.9961 |
| 0.1176 | 0.7912 | 0.1146 | 0.8688 | 0.0998 | 0.9168 | 0.0296 | 0.9962 |
| 0.1183 | 0.8037 | 0.1144 | 0.8696 | 0.0972 | 0.9226 | 0.0254 | 0.9963 |
| 0.1185 | 0.8064 | 0.1144 | 0.8696 | 0.0943 | 0.9288 | 0.0213 | 0.9964 |
| 0.1187 | 0.8100 | 0.1144 | 0.8696 | 0.0912 | 0.9348 | 0.0169 | 0.9965 |
| 0.1189 | 0.8127 | 0.1144 | 0.8696 | 0.0882 | 0.9403 | 0.0127 | 0.9966 |
| 0.1190 | 0.8163 | 0.1144 | 0.8696 | 0.0848 | 0.9461 | 0.0086 | 0.9966 |
| 0.1191 | 0.8190 | 0.1144 | 0.8696 | 0.0813 | 0.9518 | 0.0042 | 0.9967 |
| 0.1191 | 0.8225 | 0.1144 | 0.8696 | 0.0778 | 0.9569 | 0.0000 | 0.9967 |

Figure 7:
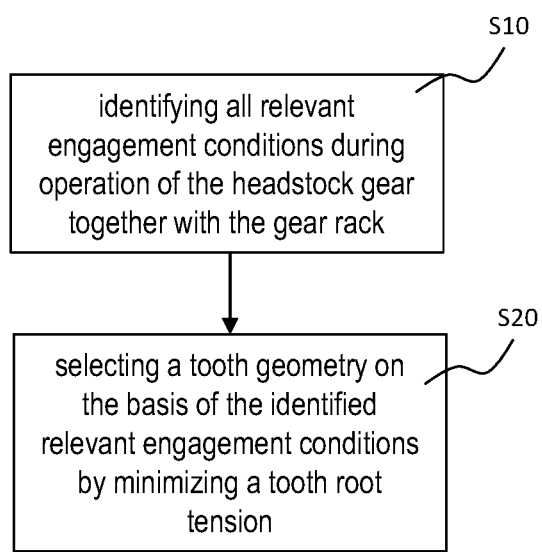
FIG. 7 is a flow chart of a method for dimensioning a tooth geometry according to a first embodiment.

FIG. 7 shows a flow chart of a method for dimensioning a tooth geometry according to a first embodiment. Thereto, FIG. 7 discloses a method for dimensioning a tooth geometry 2 of a headstock gear 10 for a shearer loader, comprising a plurality of teeth 1, the method comprising the steps of identifying S10 all relevant engagement conditions during operation of the headstock gear 10 together with the gear rack 4 and selecting S20 a tooth geometry 2 on the basis of the identified relevant engagement conditions by minimizing a tooth root tension.

Instead of optimizing a headstock gear 10 for a given gear rack pitch, which would usually result in a tooth geometry of the involent shape as only normal forces are acting on engaging tooth flanks, the method according to the present disclosure may deliberately deviate therefrom. Quite the contrary, a non-optimal engagement between tooth flanks is accepted. It was found that adverse effects resulting from a non-optimal engagement are outweighed by the benefits from avoiding sudden stress fluctuations due to sudden gear rack pitch variations.

Figure 8:
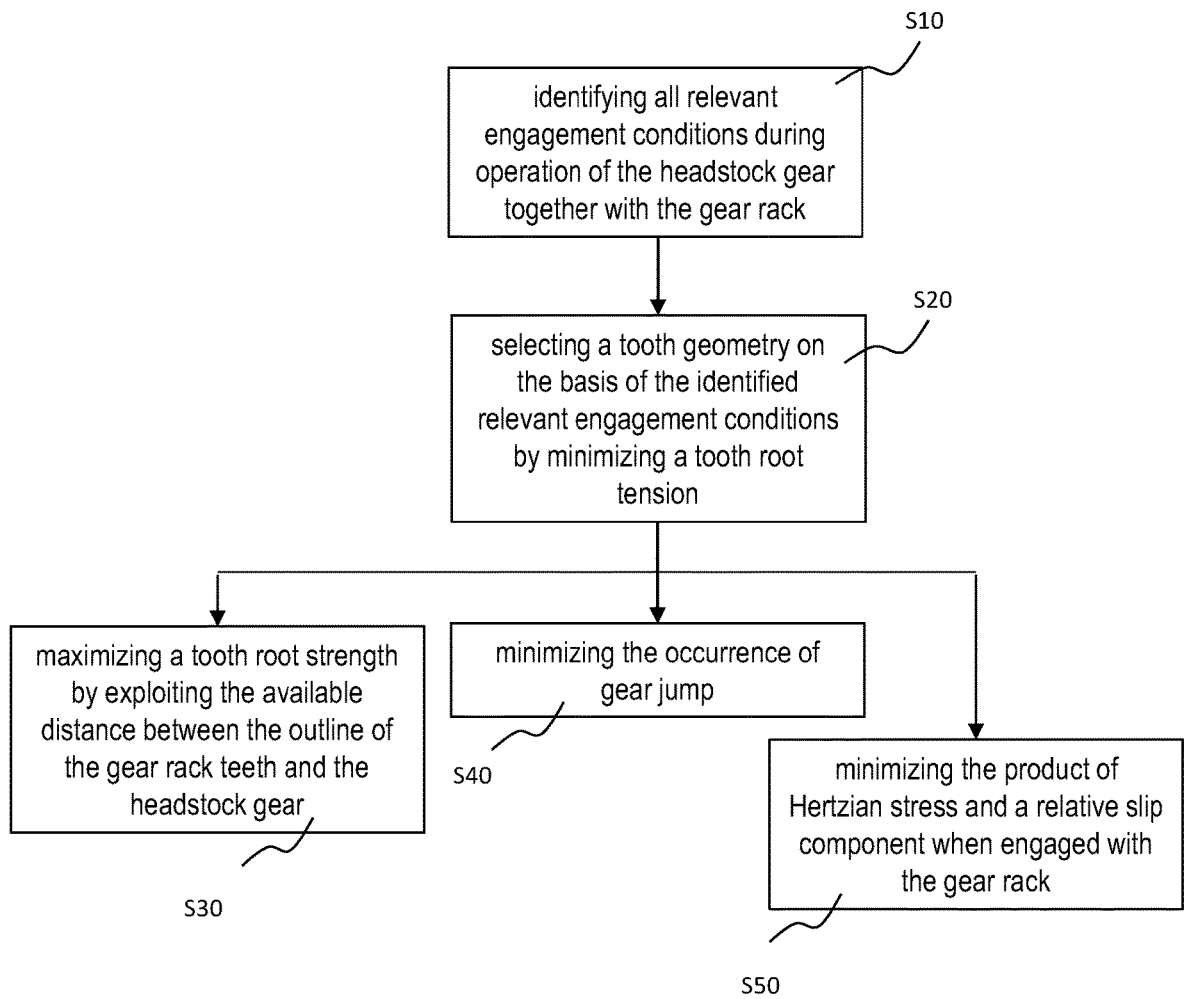
FIG. 8 shows a flow chart of a method for dimensioning a tooth geometry according to a second embodiment.

FIG. 8 shows a flow chart of a method for dimensioning a tooth geometry according to a first embodiment. Thereto, FIG. 8 discloses a further development of the method for dimension a tooth geometry as disclosed in FIG. 7. Accordingly, further optimization strategies may be considered in order to select a suitable tooth geometry among a range of possible tooth geometries. The steps S30, S40 and S50 may be applied exclusively or in any combination thereof. To this end, the method according to FIG. 8 comprises the step of maximizing S30 a tooth root strength by exploiting the available distance between the outline of the gear rack teeth 8 and the headstock gear 10.

Additionally, the method optionally comprises the step of minimizing S40 the occurrence of a gear jump. According to the present disclosure, a gear jump refers to an incident where an engagement between a headstock gear tooth and a gear rack tooth fails and a roll-over occurs. Alternatively or additionally, the method comprises the step of minimizing S50 the product of Hertzian stress and a relative slip component when engaged with the gear rack 4.

FIG. 9A illustrates an outer limitation of an envelope fitting for one of the S-shaped profiles S2 in a dimensional representation. To this end, one of the S-shaped profiles S2 comprises an envelope fitting into a frame with the non-dimensional outer limitations L2 defined by x-y coordinates. According to the example shown in FIG. 9A, the coordinates disclosed in the context of FIG. 4 above are multiplied by a dimension of 300 mm, in order to obtain a dimensional tooth geometry. The x-y-coordinates comprise all of the following columns:

| Column 1 | | Column 2 | | Column 3 | | Column 4 | |
|---|---|---|---|---|---|---|---|
| x | y | x | y | x | y | x | y |
| 16.830 | 299.520 | 35.160 | 269.598 | 36.680 | 208.440 | 29.238 | 268.407 |
| 16.860 | 299.492 | 35.204 | 269.459 | 36.589 | 208.703 | 29.197 | 268.533 |
| 16.957 | 299.396 | 35.248 | 269.321 | 36.499 | 208.967 | 29.154 | 268.660 |

-continued

| Column 1 | | Column 2 | | Column 3 | | Column 4 | |
|---|---|---|---|---|---|---|---|
| x | y | x | y | x | y | x | y |
| 17.052 | 299.303 | 35.292 | 269.182 | 36.410 | 209.231 | 29.112 | 268.786 |
| 17.147 | 299.209 | 35.335 | 269.043 | 36.321 | 209.495 | 29.069 | 268.913 |
| 17.242 | 299.115 | 35.378 | 268.905 | 36.234 | 209.760 | 29.027 | 269.039 |
| 17.337 | 299.020 | 35.421 | 268.766 | 36.148 | 210.024 | 28.983 | 269.165 |
| 17.431 | 298.926 | 35.463 | 268.626 | 36.062 | 210.290 | 28.940 | 269.291 |
| 17.526 | 298.831 | 35.506 | 268.487 | 35.978 | 210.555 | 28.897 | 269.416 |
| 17.620 | 298.736 | 35.548 | 268.348 | 35.894 | 210.821 | 28.853 | 269.542 |
| 17.714 | 298.641 | 35.589 | 268.208 | 35.812 | 211.087 | 28.809 | 269.668 |
| 17.808 | 298.545 | 35.631 | 268.069 | 35.730 | 211.353 | 28.765 | 269.793 |
| 17.902 | 298.449 | 35.672 | 267.929 | 35.649 | 211.620 | 28.720 | 269.918 |
| 17.996 | 298.354 | 35.713 | 267.789 | 35.569 | 211.887 | 28.676 | 270.043 |
| 18.090 | 298.257 | 35.754 | 267.649 | 35.490 | 212.154 | 28.631 | 270.168 |
| 18.183 | 298.161 | 35.794 | 267.509 | 35.412 | 212.421 | 28.586 | 270.293 |
| 18.276 | 298.065 | 35.835 | 267.369 | 35.335 | 212.689 | 28.540 | 270.418 |
| 18.369 | 297.968 | 35.875 | 267.229 | 35.259 | 212.957 | 28.495 | 270.543 |
| 18.462 | 297.871 | 35.914 | 267.088 | 35.184 | 213.225 | 28.449 | 270.667 |
| 18.555 | 297.774 | 35.954 | 266.948 | 35.109 | 213.494 | 28.403 | 270.791 |
| 18.648 | 297.677 | 35.993 | 266.807 | 35.036 | 213.763 | 28.357 | 270.916 |
| 18.740 | 297.579 | 36.032 | 266.666 | 34.963 | 214.032 | 28.310 | 271.040 |
| 18.833 | 297.481 | 36.071 | 266.525 | 34.892 | 214.301 | 28.264 | 271.164 |
| 18.925 | 297.383 | 36.109 | 266.384 | 34.821 | 214.570 | 28.217 | 271.288 |
| 19.017 | 297.285 | 36.147 | 266.243 | 34.752 | 214.840 | 28.170 | 271.411 |
| 19.109 | 297.187 | 36.185 | 266.102 | 34.683 | 215.110 | 28.122 | 271.535 |
| 19.200 | 297.088 | 36.223 | 265.960 | 34.615 | 215.380 | 28.075 | 271.658 |
| 19.292 | 296.989 | 36.260 | 265.819 | 34.548 | 215.651 | 28.027 | 271.781 |
| 19.383 | 296.890 | 36.297 | 265.677 | 34.482 | 215.922 | 27.979 | 271.905 |
| 19.475 | 296.791 | 36.334 | 265.535 | 34.417 | 216.193 | 27.931 | 272.028 |
| 19.566 | 296.692 | 36.371 | 265.393 | 34.353 | 216.464 | 27.882 | 272.151 |
| 19.657 | 296.592 | 36.407 | 265.252 | 34.290 | 216.735 | 27.834 | 272.273 |
| 19.747 | 296.492 | 36.443 | 265.109 | 34.228 | 217.007 | 27.785 | 272.396 |
| 19.838 | 296.392 | 36.479 | 264.967 | 34.167 | 217.279 | 27.736 | 272.518 |
| 19.929 | 296.292 | 36.515 | 264.825 | 34.107 | 217.551 | 27.687 | 272.641 |
| 20.019 | 296.191 | 36.550 | 264.682 | 34.047 | 217.823 | 27.637 | 272.763 |
| 20.109 | 296.090 | 36.585 | 264.540 | 33.989 | 218.095 | 27.587 | 272.885 |
| 20.199 | 295.990 | 36.620 | 264.397 | 33.931 | 218.368 | 27.537 | 273.007 |
| 20.289 | 295.888 | 36.654 | 264.255 | 33.875 | 218.641 | 27.487 | 273.129 |
| 20.378 | 295.787 | 36.689 | 264.112 | 33.819 | 218.914 | 27.437 | 273.250 |
| 20.468 | 295.686 | 36.723 | 263.969 | 33.765 | 219.187 | 27.386 | 273.372 |
| 20.557 | 295.584 | 36.757 | 263.826 | 33.711 | 219.460 | 27.335 | 273.493 |
| 20.646 | 295.482 | 36.790 | 263.682 | 33.658 | 219.734 | 27.284 | 273.615 |
| 20.735 | 295.380 | 36.823 | 263.539 | 33.607 | 220.008 | 27.233 | 273.736 |
| 20.824 | 295.278 | 36.856 | 263.396 | 33.556 | 220.281 | 27.182 | 273.857 |
| 20.913 | 295.175 | 36.889 | 263.252 | 33.506 | 220.556 | 27.130 | 273.977 |
| 21.001 | 295.072 | 36.921 | 263.108 | 33.457 | 220.830 | 27.078 | 274.098 |
| 21.089 | 294.969 | 36.953 | 262.965 | 33.409 | 221.104 | 27.026 | 274.219 |
| 21.178 | 294.866 | 36.985 | 262.821 | 33.362 | 221.379 | 26.974 | 274.339 |
| 21.266 | 294.763 | 37.017 | 262.677 | 33.316 | 221.654 | 26.921 | 274.459 |
| 21.353 | 294.659 | 37.048 | 262.533 | 33.271 | 221.929 | 26.869 | 274.579 |
| 21.441 | 294.555 | 37.079 | 262.389 | 33.227 | 222.204 | 26.816 | 274.699 |
| 21.528 | 294.451 | 37.110 | 262.244 | 33.184 | 222.479 | 26.762 | 274.819 |
| 21.616 | 294.347 | 37.141 | 262.100 | 33.142 | 222.754 | 26.709 | 274.939 |
| 21.703 | 294.243 | 37.171 | 261.956 | 33.100 | 223.030 | 26.656 | 275.058 |
| 21.790 | 294.138 | 37.215 | 261.742 | 33.060 | 223.306 | 26.602 | 275.178 |
| 21.877 | 294.034 | 37.267 | 261.490 | 33.021 | 223.581 | 26.548 | 275.297 |
| 21.963 | 293.929 | 37.318 | 261.238 | 32.982 | 223.857 | 26.494 | 275.416 |
| 22.050 | 293.823 | 37.372 | 260.963 | 32.945 | 224.133 | 26.439 | 275.535 |
| 22.136 | 293.718 | 37.425 | 260.688 | 32.908 | 224.410 | 26.384 | 275.654 |
| 22.222 | 293.612 | 37.477 | 260.413 | 32.873 | 224.686 | 26.330 | 275.772 |
| 22.308 | 293.507 | 37.528 | 260.137 | 32.838 | 224.962 | 26.275 | 275.891 |
| 22.394 | 293.401 | 37.578 | 259.861 | 32.804 | 225.239 | 26.219 | 276.009 |
| 22.479 | 293.295 | 37.626 | 259.585 | 32.772 | 225.516 | 26.164 | 276.128 |
| 22.565 | 293.188 | 37.674 | 259.309 | 32.740 | 225.792 | 26.108 | 276.246 |
| 22.650 | 293.082 | 37.721 | 259.033 | 32.709 | 226.069 | 26.052 | 276.364 |
| 22.735 | 292.975 | 37.767 | 258.756 | 32.680 | 226.346 | 25.996 | 276.481 |
| 22.820 | 292.868 | 37.811 | 258.479 | 32.651 | 226.624 | 25.940 | 276.599 |
| 22.904 | 292.761 | 37.855 | 258.203 | 32.623 | 226.901 | 25.884 | 276.716 |
| 22.989 | 292.653 | 37.897 | 257.926 | 32.596 | 227.178 | 25.827 | 276.834 |
| 23.073 | 292.546 | 37.939 | 257.648 | 32.570 | 227.455 | 25.770 | 276.951 |
| 23.157 | 292.438 | 37.979 | 257.371 | 32.545 | 227.733 | 25.713 | 277.068 |
| 23.241 | 292.330 | 38.019 | 257.094 | 32.521 | 228.011 | 25.656 | 277.185 |
| 23.325 | 292.222 | 38.057 | 256.816 | 32.498 | 228.288 | 25.598 | 277.301 |
| 23.409 | 292.113 | 38.094 | 256.538 | 32.476 | 228.566 | 25.540 | 277.418 |
| 23.492 | 292.005 | 38.130 | 256.260 | 32.455 | 228.844 | 25.482 | 277.534 |
| 23.575 | 291.896 | 38.166 | 255.982 | 32.435 | 229.122 | 25.424 | 277.651 |
| 23.658 | 291.787 | 38.200 | 255.704 | 32.415 | 229.400 | 25.366 | 277.767 |

-continued

| Column 1 | | Column 2 | | Column 3 | | Column 4 | |
|---|---|---|---|---|---|---|---|
| x | y | x | y | x | y | x | y |
| 23.741 | 291.678 | 38.233 | 255.426 | 32.397 | 229.678 | 25.307 | 277.883 |
| 23.824 | 291.569 | 38.265 | 255.147 | 32.380 | 229.956 | 25.249 | 277.999 |
| 23.907 | 291.459 | 38.295 | 254.869 | 32.364 | 230.234 | 25.190 | 278.114 |
| 23.989 | 291.349 | 38.325 | 254.590 | 32.348 | 230.512 | 25.131 | 278.230 |
| 24.071 | 291.240 | 38.354 | 254.311 | 32.334 | 230.790 | 25.071 | 278.345 |
| 24.153 | 291.129 | 38.382 | 254.032 | 32.320 | 231.068 | 25.012 | 278.460 |
| 24.235 | 291.019 | 38.408 | 253.753 | 32.308 | 231.347 | 24.952 | 278.575 |
| 24.316 | 290.909 | 38.434 | 253.474 | 32.296 | 231.625 | 24.892 | 278.690 |
| 24.398 | 290.798 | 38.459 | 253.195 | 32.286 | 231.904 | 24.832 | 278.805 |
| 24.479 | 290.687 | 38.482 | 252.916 | 32.276 | 232.182 | 24.772 | 278.919 |
| 24.560 | 290.576 | 38.504 | 252.636 | 32.268 | 232.460 | 24.711 | 279.034 |
| 24.641 | 290.465 | 38.526 | 252.357 | 32.260 | 232.739 | 24.650 | 279.148 |
| 24.722 | 290.353 | 38.546 | 252.077 | 32.254 | 233.018 | 24.590 | 279.262 |
| 24.802 | 290.242 | 38.565 | 251.798 | 32.248 | 233.296 | 24.528 | 279.376 |
| 24.883 | 290.130 | 38.583 | 251.518 | 32.243 | 233.575 | 24.467 | 279.490 |
| 24.963 | 290.018 | 38.600 | 251.238 | 32.239 | 233.853 | 24.406 | 279.604 |
| 25.043 | 289.905 | 38.616 | 250.959 | 32.237 | 234.132 | 24.344 | 279.717 |
| 25.122 | 289.793 | 38.631 | 250.679 | 32.235 | 234.410 | 24.282 | 279.830 |
| 25.202 | 289.680 | 38.645 | 250.399 | 32.234 | 234.689 | 24.220 | 279.944 |
| 25.281 | 289.568 | 38.658 | 250.119 | 32.234 | 234.968 | 24.158 | 280.057 |
| 25.360 | 289.455 | 38.670 | 249.839 | 32.235 | 235.246 | 24.095 | 280.169 |
| 25.439 | 289.341 | 38.681 | 249.559 | 32.237 | 235.525 | 24.032 | 280.282 |
| 25.518 | 289.228 | 38.690 | 249.279 | 32.240 | 235.803 | 23.970 | 280.395 |
| 25.597 | 289.115 | 38.699 | 248.999 | 32.244 | 236.082 | 23.907 | 280.507 |
| 25.675 | 289.001 | 38.706 | 248.718 | 32.249 | 236.361 | 23.843 | 280.619 |
| 25.753 | 288.887 | 38.713 | 248.438 | 32.255 | 236.639 | 23.780 | 280.731 |
| 25.831 | 288.773 | 38.718 | 248.158 | 32.262 | 236.918 | 23.716 | 280.843 |
| 25.909 | 288.658 | 38.722 | 247.878 | 32.269 | 237.196 | 23.652 | 280.955 |
| 25.987 | 288.544 | 38.725 | 247.598 | 32.278 | 237.475 | 23.588 | 281.066 |
| 26.064 | 288.429 | 38.728 | 247.317 | 32.288 | 237.753 | 23.524 | 281.178 |
| 26.142 | 288.314 | 38.729 | 247.037 | 32.299 | 238.031 | 23.460 | 281.289 |
| 26.219 | 288.199 | 38.729 | 246.757 | 32.310 | 238.310 | 23.395 | 281.400 |
| 26.295 | 288.084 | 38.728 | 246.476 | 32.323 | 238.588 | 23.330 | 281.511 |
| 26.372 | 287.969 | 38.725 | 246.196 | 32.337 | 238.866 | 23.265 | 281.621 |
| 26.449 | 287.853 | 38.722 | 245.916 | 32.351 | 239.145 | 23.200 | 281.732 |
| 26.525 | 287.737 | 38.718 | 245.636 | 32.367 | 239.423 | 23.135 | 281.842 |
| 26.601 | 287.621 | 38.713 | 245.356 | 32.383 | 239.701 | 23.069 | 281.953 |
| 26.677 | 287.505 | 38.706 | 245.075 | 32.401 | 239.979 | 23.004 | 282.063 |
| 26.752 | 287.389 | 38.699 | 244.795 | 32.419 | 240.257 | 22.938 | 282.173 |
| 26.828 | 287.272 | 38.690 | 244.515 | 32.439 | 240.535 | 22.872 | 282.282 |
| 26.903 | 287.156 | 38.681 | 244.235 | 32.459 | 240.813 | 22.805 | 282.392 |
| 26.978 | 287.039 | 38.670 | 243.955 | 32.480 | 241.091 | 22.739 | 282.501 |
| 27.053 | 286.922 | 38.658 | 243.675 | 32.502 | 241.363 | 22.672 | 282.611 |
| 27.128 | 286.804 | 38.646 | 243.395 | 32.523 | 241.625 | 22.605 | 282.720 |
| 27.202 | 286.687 | 38.632 | 243.115 | 32.543 | 241.882 | 22.538 | 282.829 |
| 27.277 | 286.569 | 38.617 | 242.835 | 32.561 | 242.138 | 22.471 | 282.937 |
| 27.351 | 286.451 | 38.601 | 242.555 | 32.579 | 242.395 | 22.404 | 283.046 |
| 27.425 | 286.334 | 38.584 | 242.276 | 32.596 | 242.652 | 22.336 | 283.154 |
| 27.498 | 286.215 | 38.566 | 241.996 | 32.611 | 242.909 | 22.268 | 283.262 |
| 27.572 | 286.097 | 38.546 | 241.716 | 32.626 | 243.166 | 22.200 | 283.371 |
| 27.645 | 285.978 | 38.526 | 241.437 | 32.640 | 243.423 | 22.132 | 283.478 |
| 27.718 | 285.860 | 38.505 | 241.157 | 32.652 | 243.680 | 22.064 | 283.586 |
| 27.791 | 285.741 | 38.483 | 240.883 | 32.664 | 243.937 | 21.995 | 283.694 |
| 27.863 | 285.622 | 38.462 | 240.621 | 32.675 | 244.194 | 21.927 | 283.801 |
| 27.936 | 285.503 | 38.442 | 240.364 | 32.685 | 244.452 | 21.858 | 283.908 |
| 28.008 | 285.383 | 38.423 | 240.107 | 32.693 | 244.709 | 21.789 | 284.015 |
| 28.080 | 285.264 | 38.405 | 239.850 | 32.701 | 244.966 | 21.720 | 284.122 |
| 28.152 | 285.144 | 38.388 | 239.592 | 32.708 | 245.224 | 21.650 | 284.229 |
| 28.224 | 285.024 | 38.372 | 239.335 | 32.714 | 245.481 | 21.581 | 284.335 |
| 28.295 | 284.904 | 38.357 | 239.078 | 32.719 | 245.738 | 21.511 | 284.442 |
| 28.366 | 284.783 | 38.342 | 238.820 | 32.723 | 245.996 | 21.441 | 284.548 |
| 28.437 | 284.663 | 38.329 | 238.563 | 32.726 | 246.253 | 21.371 | 284.654 |
| 28.508 | 284.542 | 38.316 | 238.305 | 32.728 | 246.511 | 21.301 | 284.760 |
| 28.579 | 284.422 | 38.305 | 238.048 | 32.729 | 246.768 | 21.230 | 284.865 |
| 28.649 | 284.301 | 38.294 | 237.790 | 32.729 | 247.025 | 21.159 | 284.971 |
| 28.719 | 284.179 | 38.284 | 237.533 | 32.728 | 247.283 | 21.089 | 285.076 |
| 28.789 | 284.058 | 38.275 | 237.275 | 32.726 | 247.540 | 21.018 | 285.181 |
| 28.859 | 283.937 | 38.267 | 237.017 | 32.723 | 247.798 | 20.946 | 285.286 |
| 28.928 | 283.815 | 38.260 | 236.760 | 32.719 | 248.055 | 20.875 | 285.391 |
| 28.998 | 283.693 | 38.253 | 236.502 | 32.714 | 248.312 | 20.804 | 285.496 |
| 29.067 | 283.571 | 38.248 | 236.244 | 32.708 | 248.570 | 20.732 | 285.600 |
| 29.136 | 283.449 | 38.243 | 235.986 | 32.701 | 248.827 | 20.660 | 285.705 |
| 29.205 | 283.326 | 38.240 | 235.729 | 32.693 | 249.084 | 20.588 | 285.809 |
| 29.273 | 283.204 | 38.237 | 235.471 | 32.684 | 249.342 | 20.516 | 285.913 |
| 29.341 | 283.081 | 38.235 | 235.213 | 32.675 | 249.599 | 20.443 | 286.016 |

-continued

| Column 1 | | Column 2 | | Column 3 | | Column 4 | |
|---|---|---|---|---|---|---|---|
| x | y | x | y | x | y | x | y |
| 29.409 | 282.958 | 38.234 | 234.955 | 32.664 | 249.856 | 20.371 | 286.120 |
| 29.477 | 282.835 | 38.234 | 234.697 | 32.652 | 250.113 | 20.298 | 286.223 |
| 29.545 | 282.712 | 38.235 | 234.439 | 32.639 | 250.370 | 20.225 | 286.326 |
| 29.612 | 282.588 | 38.236 | 234.182 | 32.626 | 250.627 | 20.152 | 286.430 |
| 29.679 | 282.465 | 38.239 | 233.924 | 32.611 | 250.884 | 20.079 | 286.532 |
| 29.746 | 282.341 | 38.242 | 233.666 | 32.595 | 251.141 | 20.005 | 286.635 |
| 29.813 | 282.217 | 38.247 | 233.408 | 32.579 | 251.398 | 19.932 | 286.738 |
| 29.880 | 282.093 | 38.252 | 233.151 | 32.561 | 251.655 | 19.858 | 286.840 |
| 29.946 | 281.969 | 38.258 | 232.893 | 32.542 | 251.912 | 19.784 | 286.942 |
| 30.012 | 281.845 | 38.265 | 232.635 | 32.523 | 252.168 | 19.710 | 287.044 |
| 30.078 | 281.720 | 38.273 | 232.377 | 32.502 | 252.425 | 19.636 | 287.146 |
| 30.144 | 281.595 | 38.282 | 232.120 | 32.481 | 252.681 | 19.561 | 287.247 |
| 30.209 | 281.470 | 38.292 | 231.862 | 32.458 | 252.938 | 19.487 | 287.349 |
| 30.274 | 281.345 | 38.302 | 231.605 | 32.435 | 253.194 | 19.412 | 287.450 |
| 30.339 | 281.220 | 38.314 | 231.347 | 32.410 | 253.451 | 19.337 | 287.551 |
| 30.404 | 281.095 | 38.326 | 231.089 | 32.385 | 253.707 | 19.262 | 287.652 |
| 30.469 | 280.969 | 38.340 | 230.832 | 32.358 | 253.963 | 19.186 | 287.753 |
| 30.533 | 280.843 | 38.354 | 230.575 | 32.331 | 254.219 | 19.111 | 287.853 |
| 30.597 | 280.717 | 38.369 | 230.317 | 32.302 | 254.475 | 19.035 | 287.954 |
| 30.661 | 280.591 | 38.385 | 230.060 | 32.273 | 254.730 | 18.960 | 288.054 |
| 30.725 | 280.465 | 38.402 | 229.803 | 32.243 | 254.986 | 18.884 | 288.154 |
| 30.789 | 280.339 | 38.420 | 229.545 | 32.211 | 255.241 | 18.808 | 288.254 |
| 30.852 | 280.212 | 38.438 | 229.288 | 32.179 | 255.497 | 18.731 | 288.353 |
| 30.915 | 280.085 | 38.458 | 229.031 | 32.146 | 255.752 | 18.655 | 288.453 |
| 30.978 | 279.958 | 38.478 | 228.774 | 32.112 | 256.007 | 18.578 | 288.552 |
| 31.040 | 279.831 | 38.500 | 228.517 | 32.077 | 256.262 | 18.502 | 288.651 |
| 31.103 | 279.704 | 38.522 | 228.261 | 32.040 | 256.517 | 18.425 | 288.750 |
| 31.165 | 279.577 | 38.545 | 228.004 | 32.003 | 256.772 | 18.348 | 288.848 |
| 31.227 | 279.449 | 38.569 | 227.747 | 31.965 | 257.026 | 18.270 | 288.947 |
| 31.288 | 279.322 | 38.594 | 227.490 | 31.926 | 257.281 | 18.193 | 289.045 |
| 31.350 | 279.194 | 38.620 | 227.234 | 31.886 | 257.535 | 18.115 | 289.143 |
| 31.411 | 279.066 | 38.646 | 226.977 | 31.845 | 257.789 | 18.038 | 289.241 |
| 31.472 | 278.938 | 38.674 | 226.721 | 31.803 | 258.043 | 17.960 | 289.339 |
| 31.533 | 278.809 | 38.702 | 226.465 | 31.760 | 258.297 | 17.882 | 289.437 |
| 31.593 | 278.681 | 38.732 | 226.209 | 31.716 | 258.551 | 17.804 | 289.534 |
| 31.654 | 278.552 | 38.762 | 225.953 | 31.671 | 258.804 | 17.725 | 289.631 |
| 31.714 | 278.424 | 38.793 | 225.697 | 31.626 | 259.057 | 17.647 | 289.728 |
| 31.774 | 278.295 | 38.825 | 225.441 | 31.579 | 259.311 | 17.568 | 289.825 |
| 31.833 | 278.165 | 38.858 | 225.185 | 31.531 | 259.564 | 17.489 | 289.922 |
| 31.893 | 278.036 | 38.892 | 224.930 | 31.482 | 259.816 | 17.410 | 290.018 |
| 31.952 | 277.907 | 38.926 | 224.674 | 31.433 | 260.066 | 17.331 | 290.115 |
| 32.011 | 277.777 | 38.962 | 224.419 | 31.387 | 260.297 | 17.252 | 290.211 |
| 32.070 | 277.648 | 38.998 | 224.164 | 31.339 | 260.531 | 17.173 | 290.307 |
| 32.128 | 277.518 | 39.036 | 223.909 | 31.298 | 260.730 | 17.093 | 290.403 |
| 32.187 | 277.388 | 39.074 | 223.654 | 31.270 | 260.863 | 17.013 | 290.498 |
| 32.245 | 277.257 | 39.113 | 223.399 | 31.241 | 260.997 | 16.933 | 290.593 |
| 32.302 | 277.127 | 39.153 | 223.144 | 31.213 | 261.130 | 16.853 | 290.689 |
| 32.360 | 276.997 | 39.194 | 222.890 | 31.184 | 261.263 | 16.773 | 290.784 |
| 32.417 | 276.866 | 39.235 | 222.635 | 31.155 | 261.395 | 16.693 | 290.878 |
| 32.475 | 276.735 | 39.278 | 222.381 | 31.126 | 261.528 | 16.612 | 290.973 |
| 32.531 | 276.604 | 39.321 | 222.127 | 31.097 | 261.661 | 16.531 | 291.067 |
| 32.588 | 276.473 | 39.366 | 221.873 | 31.067 | 261.793 | 16.451 | 291.162 |
| 32.644 | 276.342 | 39.411 | 221.619 | 31.037 | 261.926 | 16.370 | 291.256 |
| 32.701 | 276.211 | 39.457 | 221.365 | 31.007 | 262.058 | 16.289 | 291.349 |
| 32.757 | 276.079 | 39.504 | 221.112 | 30.977 | 262.190 | 16.207 | 291.443 |
| 32.812 | 275.947 | 39.552 | 220.859 | 30.946 | 262.322 | 16.126 | 291.537 |
| 32.868 | 275.815 | 39.601 | 220.605 | 30.915 | 262.454 | 16.044 | 291.630 |
| 32.923 | 275.683 | 39.651 | 220.352 | 30.884 | 262.586 | 15.963 | 291.723 |
| 32.978 | 275.551 | 39.701 | 220.100 | 30.853 | 262.718 | 15.881 | 291.816 |
| 33.033 | 275.419 | 39.752 | 219.847 | 30.821 | 262.850 | 15.799 | 291.908 |
| 33.087 | 275.287 | 39.805 | 219.594 | 30.789 | 262.981 | 15.717 | 292.001 |
| 33.142 | 275.154 | 39.858 | 219.342 | 30.757 | 263.113 | 15.634 | 292.093 |
| 33.196 | 275.021 | 39.912 | 219.090 | 30.725 | 263.244 | 15.552 | 292.185 |
| 33.250 | 274.888 | 39.967 | 218.838 | 30.693 | 263.375 | 15.469 | 292.277 |
| 33.303 | 274.755 | 40.023 | 218.587 | 30.660 | 263.506 | 15.387 | 292.369 |
| 33.357 | 274.622 | 40.079 | 218.335 | 30.627 | 263.637 | 15.304 | 292.461 |
| 33.410 | 274.489 | 40.137 | 218.084 | 30.593 | 263.768 | 15.221 | 292.552 |
| 33.463 | 274.356 | 40.195 | 217.833 | 30.560 | 263.899 | 15.137 | 292.643 |
| 33.515 | 274.222 | 40.254 | 217.582 | 30.526 | 264.030 | 15.054 | 292.734 |
| 33.568 | 274.088 | 40.314 | 217.331 | 30.492 | 264.161 | 14.971 | 292.825 |
| 33.620 | 273.954 | 40.375 | 217.080 | 30.458 | 264.291 | 14.887 | 292.915 |
| 33.672 | 273.820 | 40.437 | 216.830 | 30.424 | 264.421 | 14.803 | 293.006 |
| 33.723 | 273.686 | 40.500 | 216.580 | 30.389 | 264.552 | 14.719 | 293.096 |
| 33.775 | 273.552 | 40.564 | 216.330 | 30.354 | 264.682 | 14.635 | 293.186 |
| 33.826 | 273.417 | 40.628 | 216.081 | 30.319 | 264.812 | 14.551 | 293.276 |

-continued

| Column 1 | | Column 2 | | Column 3 | | Column 4 | |
| --- | --- | --- | --- | --- | --- | --- | --- |
| x | y | x | y | x | y | x | y |
| 33.877 | 273.283 | 40.693 | 215.831 | 30.283 | 264.942 | 14.467 | 293.365 |
| 33.928 | 273.148 | 40.760 | 215.582 | 30.248 | 265.072 | 14.382 | 293.455 |
| 33.978 | 273.013 | 40.827 | 215.333 | 30.212 | 265.201 | 14.298 | 293.544 |
| 34.028 | 272.878 | 40.895 | 215.084 | 30.176 | 265.331 | 14.213 | 293.633 |
| 34.078 | 272.743 | 40.963 | 214.836 | 30.139 | 265.461 | 14.128 | 293.722 |
| 34.128 | 272.608 | 41.033 | 214.588 | 30.103 | 265.590 | 14.043 | 293.810 |
| 34.178 | 272.472 | 41.103 | 214.340 | 30.066 | 265.719 | 13.958 | 293.899 |
| 34.227 | 272.337 | 41.175 | 214.092 | 30.029 | 265.848 | 13.873 | 293.987 |
| 34.276 | 272.201 | 41.247 | 213.845 | 29.991 | 265.977 | 13.787 | 294.075 |
| 34.325 | 272.065 | 41.320 | 213.597 | 29.954 | 266.106 | 13.702 | 294.163 |
| 34.373 | 271.929 | 41.394 | 213.350 | 29.916 | 266.235 | 13.616 | 294.251 |
| 34.421 | 271.793 | 41.469 | 213.104 | 29.878 | 266.364 | 13.530 | 294.338 |
| 34.469 | 271.657 | 41.544 | 212.857 | 29.840 | 266.492 | 13.444 | 294.425 |
| 34.517 | 271.521 | 41.621 | 212.611 | 29.801 | 266.621 | 13.358 | 294.512 |
| 34.565 | 271.384 | 41.698 | 212.365 | 29.763 | 266.749 | 13.272 | 294.599 |
| 34.612 | 271.248 | 41.776 | 212.119 | 29.724 | 266.877 | 13.186 | 294.686 |
| 34.659 | 271.111 | 41.856 | 211.874 | 29.685 | 267.006 | 13.099 | 294.772 |
| 34.706 | 270.974 | 41.935 | 211.629 | 29.645 | 267.134 | 13.013 | 294.859 |
| 34.752 | 270.837 | 42.016 | 211.384 | 29.606 | 267.261 | 12.926 | 294.945 |
| 34.799 | 270.700 | 42.098 | 211.139 | 29.566 | 267.389 | 12.839 | 295.031 |
| 34.845 | 270.562 | 42.180 | 210.895 | 29.526 | 267.517 | 12.752 | 295.116 |
| 34.891 | 270.425 | 42.264 | 210.651 | 29.485 | 267.644 | 12.666 | 295.200 |
| 34.936 | 270.287 | 42.348 | 210.408 | 29.445 | 267.772 | 12.649 | 295.217 |
| 34.981 | 270.150 | 42.433 | 210.164 | 29.404 | 267.899 | 16.830 | 299.520 |
| 35.027 | 270.012 | 42.518 | 209.921 | 29.363 | 268.026 | | |
| 35.071 | 269.874 | 36.864 | 207.914 | 29.322 | 268.153 | | |
| 35.116 | 269.736 | 36.771 | 208.177 | 29.280 | 268.280 | | |

FIG. 9B illustrates an envelope L2 for one of the S-shaped profiles S2 in a dimensional representation. According to the example shown in FIG. 9B, the coordinates disclosed in the context of FIG. 6 above are multiplied by a dimension of 300 mm, in order to obtain a dimensional tooth geometry. The envelope of the S-shaped profile shown in FIG. 9B represents the entire envelope of the S-shaped profile S2. To this end, one of the S-shaped profiles S2 (represented in FIG. 9B as envelope of S2) has an envelope including all of the dimensional x-y-coordinates in all following columns:

| Column 1 | | Column 2 | | Column 3 | | Column 4 | |
| --- | --- | --- | --- | --- | --- | --- | --- |
| x | y | x | y | x | y | x | y |
| 56.6110 | 192.7995 | 35.7255 | 247.5689 | 34.2771 | 261.1364 | 22.2125 | 288.7033 |
| 54.0681 | 193.6945 | 35.7071 | 248.6441 | 34.2771 | 261.1364 | 21.0318 | 290.2830 |
| 51.6338 | 194.8529 | 35.6825 | 249.4502 | 34.2771 | 261.1364 | 19.8951 | 291.7189 |
| 49.3353 | 196.2615 | 35.6354 | 250.5245 | 34.2771 | 261.1364 | 18.6412 | 293.2153 |
| 47.1982 | 197.9048 | 35.5893 | 251.3297 | 34.2771 | 261.1364 | 17.3516 | 294.6673 |
| 45.4326 | 199.5693 | 35.5136 | 252.4024 | 34.2771 | 261.1364 | 16.1172 | 295.9818 |
| 43.6663 | 201.6058 | 35.4461 | 253.2061 | 34.2771 | 261.1364 | 14.7629 | 297.3458 |
| 42.1246 | 203.8173 | 35.3418 | 254.2764 | 34.2342 | 261.3430 | 14.4530 | 297.6266 |
| 40.8248 | 206.1791 | 35.2529 | 255.0780 | 34.2342 | 261.3430 | 14.1211 | 297.8803 |
| 39.7814 | 208.6648 | 35.1201 | 256.1451 | 34.2342 | 261.3430 | 13.7832 | 298.0972 |
| 38.5993 | 212.2284 | 35.0099 | 256.9441 | 34.2342 | 261.3430 | 13.4144 | 298.2934 |
| 37.6576 | 215.5853 | 34.8487 | 258.0073 | 33.7708 | 263.4148 | 13.0455 | 298.4523 |
| 36.8137 | 219.2438 | 34.7172 | 258.8030 | 33.2870 | 265.3267 | 12.6497 | 298.5856 |
| 36.1483 | 222.9389 | 34.5278 | 259.8616 | 32.7146 | 267.3504 | 12.2599 | 298.6822 |
| 35.6916 | 226.3953 | 34.3754 | 260.6522 | 32.0873 | 269.3470 | 11.8476 | 298.7491 |
| 35.3744 | 230.1364 | 34.3754 | 260.6522 | 31.4533 | 271.1848 | 11.4472 | 298.7808 |
| 35.2391 | 233.8885 | 34.3754 | 260.6522 | 30.7231 | 273.1248 | 10.1978 | 298.8260 |
| 35.2766 | 237.3748 | 34.3754 | 260.6522 | 29.9412 | 275.0336 | 8.8823 | 298.8680 |
| 35.4926 | 241.1231 | 34.3268 | 260.8934 | 29.1660 | 276.7856 | 7.6325 | 298.9026 |
| 35.5539 | 241.9273 | 34.3268 | 260.8934 | 28.2878 | 278.6300 | 6.3826 | 298.9319 |
| 35.6214 | 243.0005 | 34.3268 | 260.8934 | 27.3617 | 280.4392 | 5.0667 | 298.9571 |
| 35.6612 | 243.8061 | 34.3268 | 260.8934 | 26.4551 | 282.0950 | 3.8166 | 298.9756 |
| 35.7001 | 244.8807 | 34.3268 | 260.8934 | 25.4399 | 283.8328 | 2.5664 | 298.9890 |
| 35.7185 | 245.6870 | 34.3268 | 260.8934 | 24.3805 | 285.5319 | 1.2503 | 298.9974 |
| 35.7286 | 246.7623 | 34.3268 | 260.8934 | 23.3532 | 287.0820 | 0.0000 | 299.0000 |

Figure 10:
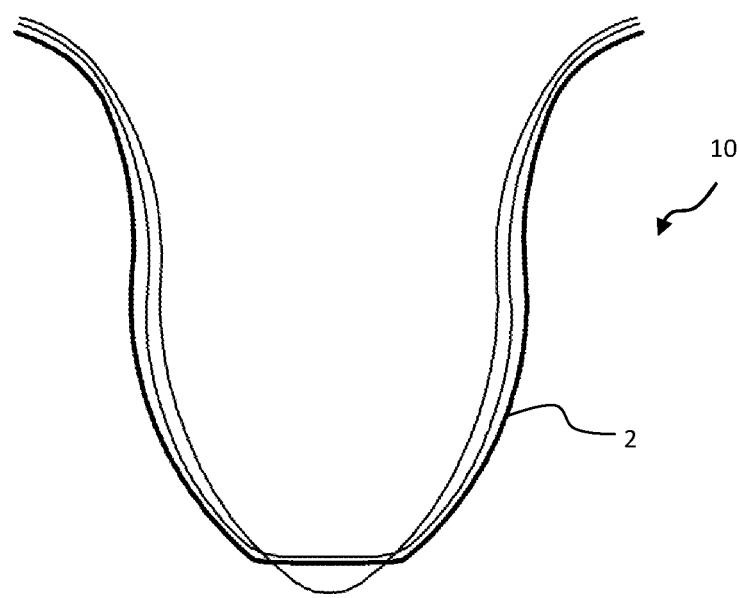
FIG. 10 depicts a tooth geometry of a headstock gear as an output of the method for dimensioning a tooth geometry.

FIG. 10 shows one example of a tooth geometry 2 as a result of the method for dimensioning a headstock root geometry 2. The fine lines indicate tooth geometries of headstock gear teeth known from the state of the art.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and/or features mentioned before in any technically feasible combination.

A headstock gear for a feed system of a shearer loader may be provided.

The headstock gear for feed system of a shearer loader may comprise a plurality of teeth, each tooth having a tooth geometry. Furthermore, for each tooth, the tooth geometry may consist of two symmetric S-shaped tooth profiles which are arranged line symmetrically regarding a radius line, as seen from a view along an axis of rotation.

The tooth geometry may be suitable for engaging a gear rack. Furthermore, the tooth geometry may be designed such that an engagement with at least two different gear rack pitches is enabled.

Instead of designing the tooth geometry such that the tooth geometry has a classic involute shape, the tooth geometry is adjusted such that an engagement with at least two different gear rack pitches is enabled. This increases service life of the tooth root as well as the service life of the tools flanks as breakage to gear jumps or improper engagement between headstock gear rack segments may be prevented.

The plurality of teeth may comprise 11 teeth.

The tooth geometry may consist, for each tooth, of two symmetric S-shaped tooth profiles which are arranged line symmetrically regarding a radius line, as seen from a view along the axis of rotation of the headstock gear.

One of the S-shaped profiles may comprise an envelope fitting into a frame with the non-dimensional outer limitations defined by the x-y coordinates set forth in all of the columns disclosed above in description of FIG. 4.

One of the S-shaped profiles may have an envelope including all or at least some of the non-dimensional x-y-coordinates set forth in all of the columns disclosed above in description of FIG. 5. The envelope of the S-shaped profile shown represents only a part of the envelope of the total S-shaped profile S2. Said part covers about the same range covered by the envelope fitting into a frame with the non-dimensional outer limitations as disclosed in FIG. 4 above.

One of the S-shaped profiles may have an envelope comprising all of the non-dimensional x-y-coordinates set forth above in the description of FIG. 6.

The coordinates may be multiplied by a dimension, for example 100 mm to 300 mm, in order to obtain a dimensioned tooth geometry, preferably wherein the headstock gear extends over the entire height of a tooth, preferably wherein the S-shaped profile has the length of about 70 mm.

Alternatively, the S-shaped profiles may be expressed by a single continuous polynomic function or by several polynomic functions.

Each tooth of the plurality of teeth may be hardened, preferably case hardened and/or inductive hardened.

The hardening may be provided at the root of each of the teeth, preferably wherein the hardening is not provided at the tip of the teeth.

A system may be provided comprising a headstock gear according to the present disclosure and a gear rack comprising several gear rack segments which are arranged next to each other such that a track is provided. The gear rack may comprise two different gear rack pitches.

Different gear rack pitches may be present for example due to relative displacement of individual gear rack segments. In this case, two gear rack segments may comprise a different gear pitch at their intersection compared to the nominal gear rack pitch. In the case when a headstock gear travels over a gear rack and inconsistent gear rack pitch, the headstock gear may be damaged for example due to gear jumps which may lead to failure or breakage of the headstock gear.

Each of the gear rack segments may comprise several rack teeth, preferably wherein the gear rack teeth have a substantially trapezoid cross-section.

The headstock you may comprise eleven teeth, wherein the gear rack may comprise a nominal gear rack pitch of 147 mm.

The headstock tooth geometry may be designed such that root stresses of each tooth are minimized. Thereby, the resilience of the tooth against wear and gear jumps may be increased.

The headstock gear tooth geometry may be designed such that a product of Hertzian stress and a relative slip component is minimized when engaged with the gear rack.

A method of dimensioning a tooth geometry of a headstock gear for a shearer loader, comprising a plurality of teeth, may comprise the steps of identifying all relevant engagement conditions during operation of the headstock gear together with the gear rack and selecting a tooth geometry on the basis of the identified relevant engagement conditions by minimizing a tooth root tension.

Ideal gear racks have a constant pitch due to equidistant gear rack teeth. However, different gear rack pitches may be present for example due to relative displacement of individual gear rack segments. In this case, the outermost of two gear rack segments may comprise a different gear pitch compared to the nominal gear rack pitch. In the case when a headstock gear travels over a gear rack and inconsistent gear rack pitch, the headstock gear may be damaged for example due to gear jumps which may lead to failure or breakage of the headstock gear.

The method may for example include starting from an ideal tooth geometry, corresponding to a geometry that is optimized for a constant gear rack pitch. On the basis of such an ideal tooth geometry, under consideration of all relevant engagement conditions during operation of the headstock gear together with the gear rack, the tooth geometry can be further optimized according to the present disclosure.

However, deviating from a geometry that is ideal for a constant gear rack pitch for the sake of optimizing the headstock gear for at least two gear rack pitches has the consequence, that the engagement of the headstock gear is not ideal for either of the at least two gear rack pitches. This means that additional stresses are inflicted to the headstock gear throughout operation. Therefore, selecting a tooth geometry on the basis of the identified relevant engagement conditions by minimizing a tooth root tension allows safe dimensioning of the tooth geometry.

The method may further comprise the step of maximizing a tooth root strength by exploiting the available distance between the outline of the gear rack teeth and the headstock gear. As a tooth geometry according to the present disclosure may have a non-ideal engagement for any gear rack pitch, exploiting the available distance between the outline of the gear rack teeth and the headstock gear may increase service lifetime to a reduced tooth root tension.

The method may further comprise the step of minimizing the occurrence of gear jump.

Furthermore, the method may further comprise the step of minimizing the product of Hertzian stress and a relative slip component when engaged with the gear rack.

According to a preferred embodiment, one or more steps of the method for dimensioning a tooth geometry may be calculated by an algorithm. The algorithm may be provided on a non-transient computer readable storage medium.

In general, the result of one or more of method steps may comprise a data range or threshold within which the technical effect of the above-mentioned discloser may be observed. However, although solved according to the present closer may have in common, that the yielded resolved deviates from optimization results focusing on one gear rack pitch.

INDUSTRIAL APPLICABILITY

With reference to the Figures, a headstock gear for a feed system of a shearer loader is suggested. The suggested headstock gear as mentioned above is applicable in any gear rack application. The tooth geometry being designed such that an engagement with at least two different gear rack pitches is enabled provides that, despite potentially operating at a sub-optimal engagement, a headstock gear having such a tooth geometry is longer lasting compare to a tooth geometry optimized for one gear rack pitch.

LIST OF REFERENCE NUMERALS

A Axis of rotation
L2 Outer limitation for an envelope fitting
S1, S2 S-shaped tooth profiles
S10 Identifying step
S20 Selecting step
S30 Maximizing tooth root strength step
S40 Minimizing gear jump step
S50 Minimizing product Hertzian stress and a relative slip component step
1 Headstock tooth
2 Tooth geometry
4 Gear rack
4' Gear rack segment
6 Gear rack pitch
6' Gear rack pitch (nominal)
8 Gear rack teeth
10 Headstock gear
12 Tooth root

What is claimed is:

1. A Headstock gear for a feed system of a shearer loader, comprising a plurality of teeth, each tooth having a tooth geometry characterized in that for each tooth, the tooth geometry consists of two symmetric S-shaped tooth profiles which are arranged line symmetrically regarding a radius line, as seen from a view along an axis of rotation; and wherein the tooth geometry is configured to engage with at least two different gear rack pitches, and the teeth are selectively hardened at the root while remaining unhardened at the tip to accommodate variations in the at least two different gear rack pitches during engagement; and characterized in that one of the S-shaped profiles comprises an envelope fitting into a frame with the non-dimensional outer limitations defined by x-y coordinates set forth in all of the following columns:

| Column 1 | | Column 2 | |
|---|---|---|---|
| x | y | x | y |
| 0.0561 | 0.9984 | 0.1172 | 0.8987 |
| 0.0562 | 0.9983 | 0.1173 | 0.8982 |
| 0.0565 | 0.9980 | 0.1175 | 0.8977 |
| 0.0568 | 0.9977 | 0.1176 | 0.8973 |
| 0.0572 | 0.9974 | 0.1178 | 0.8968 |
| 0.0575 | 0.9970 | 0.1179 | 0.8963 |
| 0.0578 | 0.9967 | 0.1181 | 0.8959 |
| 0.0581 | 0.9964 | 0.1182 | 0.8954 |
| 0.0584 | 0.9961 | 0.1184 | 0.8950 |
| 0.0587 | 0.9958 | 0.1185 | 0.8945 |
| 0.0590 | 0.9955 | 0.1186 | 0.8940 |
| 0.0594 | 0.9952 | 0.1188 | 0.8936 |
| 0.0597 | 0.9948 | 0.1189 | 0.8931 |
| 0.0600 | 0.9945 | 0.1190 | 0.8926 |
| 0.0603 | 0.9942 | 0.1192 | 0.8922 |
| 0.0606 | 0.9939 | 0.1193 | 0.8917 |
| 0.0609 | 0.9935 | 0.1194 | 0.8912 |
| 0.0612 | 0.9932 | 0.1196 | 0.8908 |
| 0.0615 | 0.9929 | 0.1197 | 0.8903 |
| 0.0619 | 0.9926 | 0.1198 | 0.8898 |
| 0.0622 | 0.9923 | 0.1200 | 0.8894 |
| 0.0625 | 0.9919 | 0.1201 | 0.8889 |
| 0.0628 | 0.9916 | 0.1202 | 0.8884 |
| 0.0631 | 0.9913 | 0.1204 | 0.8879 |
| 0.0634 | 0.9910 | 0.1205 | 0.8875 |
| 0.0637 | 0.9906 | 0.1206 | 0.8870 |
| 0.0640 | 0.9903 | 0.1207 | 0.8865 |
| 0.0643 | 0.9900 | 0.1209 | 0.8861 |
| 0.0646 | 0.9896 | 0.1210 | 0.8856 |
| 0.0649 | 0.9893 | 0.1211 | 0.8851 |
| 0.0652 | 0.9890 | 0.1212 | 0.8846 |
| 0.0655 | 0.9886 | 0.1214 | 0.8842 |
| 0.0658 | 0.9883 | 0.1215 | 0.8837 |
| 0.0661 | 0.9880 | 0.1216 | 0.8832 |
| 0.0664 | 0.9876 | 0.1217 | 0.8827 |
| 0.0667 | 0.9873 | 0.1218 | 0.8823 |
| 0.0670 | 0.9870 | 0.1220 | 0.8818 |
| 0.0673 | 0.9866 | 0.1221 | 0.8813 |
| 0.0676 | 0.9863 | 0.1222 | 0.8808 |
| 0.0679 | 0.9860 | 0.1223 | 0.8804 |
| 0.0682 | 0.9856 | 0.1224 | 0.8799 |
| 0.0685 | 0.9853 | 0.1225 | 0.8794 |
| 0.0688 | 0.9849 | 0.1226 | 0.8789 |
| 0.0691 | 0.9846 | 0.1227 | 0.8785 |
| 0.0694 | 0.9843 | 0.1229 | 0.8780 |
| 0.0697 | 0.9839 | 0.1230 | 0.8775 |
| 0.0700 | 0.9836 | 0.1231 | 0.8770 |
| 0.0703 | 0.9832 | 0.1232 | 0.8765 |
| 0.0706 | 0.9829 | 0.1233 | 0.8761 |
| 0.0709 | 0.9825 | 0.1234 | 0.8756 |
| 0.0712 | 0.9822 | 0.1235 | 0.8751 |
| 0.0715 | 0.9819 | 0.1236 | 0.8746 |
| 0.0718 | 0.9815 | 0.1237 | 0.8741 |
| 0.0721 | 0.9812 | 0.1238 | 0.8737 |
| 0.0723 | 0.9808 | 0.1239 | 0.8732 |
| 0.0726 | 0.9805 | 0.1241 | 0.8725 |
| 0.0729 | 0.9801 | 0.1242 | 0.8716 |
| 0.0732 | 0.9798 | 0.1244 | 0.8708 |
| 0.0735 | 0.9794 | 0.1246 | 0.8699 |
| 0.0738 | 0.9791 | 0.1247 | 0.8690 |
| 0.0741 | 0.9787 | 0.1249 | 0.8680 |
| 0.0744 | 0.9784 | 0.1251 | 0.8671 |
| 0.0746 | 0.9780 | 0.1253 | 0.8662 |
| 0.0749 | 0.9776 | 0.1254 | 0.8653 |
| 0.0752 | 0.9773 | 0.1256 | 0.8644 |
| 0.0755 | 0.9769 | 0.1257 | 0.8634 |
| 0.0758 | 0.9766 | 0.1259 | 0.8625 |

| | | | | | | | |
|---|---|---|---|---|---|---|---|
| 0.0761 | 0.9762 | 0.1260 | 0.8616 | 0.0964 | 0.9460 | 0.1275 | 0.7892 |
| 0.0763 | 0.9759 | 0.1262 | 0.8607 | 0.0967 | 0.9456 | 0.1275 | 0.7883 |
| 0.0766 | 0.9755 | 0.1263 | 0.8598 | 0.0969 | 0.9452 | 0.1275 | 0.7875 |
| 0.0769 | 0.9752 | 0.1265 | 0.8588 | 0.0971 | 0.9448 | 0.1275 | 0.7866 |
| 0.0772 | 0.9748 | 0.1266 | 0.8579 | 0.0973 | 0.9444 | 0.1275 | 0.7858 |
| 0.0775 | 0.9744 | 0.1267 | 0.8570 | 0.0976 | 0.9440 | 0.1275 | 0.7849 |
| 0.0778 | 0.9741 | 0.1269 | 0.8561 | 0.0978 | 0.9436 | 0.1274 | 0.7840 |
| 0.0780 | 0.9737 | 0.1270 | 0.8551 | 0.0980 | 0.9432 | 0.1274 | 0.7832 |
| 0.0783 | 0.9733 | 0.1271 | 0.8542 | 0.0983 | 0.9428 | 0.1274 | 0.7823 |
| 0.0786 | 0.9730 | 0.1272 | 0.8533 | 0.0985 | 0.9424 | 0.1274 | 0.7815 |
| 0.0789 | 0.9726 | 0.1273 | 0.8523 | 0.0987 | 0.9420 | 0.1275 | 0.7806 |
| 0.0791 | 0.9723 | 0.1274 | 0.8514 | 0.0989 | 0.9415 | 0.1275 | 0.7797 |
| 0.0794 | 0.9719 | 0.1275 | 0.8505 | 0.0992 | 0.9411 | 0.1275 | 0.7789 |
| 0.0797 | 0.9715 | 0.1277 | 0.8496 | 0.0994 | 0.9407 | 0.1275 | 0.7780 |
| 0.0800 | 0.9712 | 0.1278 | 0.8486 | 0.0996 | 0.9403 | 0.1275 | 0.7772 |
| 0.0802 | 0.9708 | 0.1278 | 0.8477 | 0.0998 | 0.9399 | 0.1275 | 0.7763 |
| 0.0805 | 0.9704 | 0.1279 | 0.8468 | 0.1000 | 0.9395 | 0.1276 | 0.7755 |
| 0.0808 | 0.9701 | 0.1280 | 0.8458 | 0.1003 | 0.9391 | 0.1276 | 0.7746 |
| 0.0811 | 0.9697 | 0.1281 | 0.8449 | 0.1005 | 0.9387 | 0.1276 | 0.7737 |
| 0.0813 | 0.9693 | 0.1282 | 0.8440 | 0.1007 | 0.9382 | 0.1276 | 0.7729 |
| 0.0816 | 0.9690 | 0.1283 | 0.8431 | 0.1009 | 0.9378 | 0.1277 | 0.7720 |
| 0.0819 | 0.9686 | 0.1283 | 0.8421 | 0.1011 | 0.9374 | 0.1277 | 0.7712 |
| 0.0821 | 0.9682 | 0.1284 | 0.8412 | 0.1013 | 0.9370 | 0.1278 | 0.7703 |
| 0.0824 | 0.9678 | 0.1285 | 0.8403 | 0.1016 | 0.9366 | 0.1278 | 0.7694 |
| 0.0827 | 0.9675 | 0.1286 | 0.8393 | 0.1018 | 0.9361 | 0.1278 | 0.7686 |
| 0.0829 | 0.9671 | 0.1286 | 0.8384 | 0.1020 | 0.9357 | 0.1279 | 0.7677 |
| 0.0832 | 0.9667 | 0.1287 | 0.8375 | 0.1022 | 0.9353 | 0.1279 | 0.7669 |
| 0.0835 | 0.9664 | 0.1287 | 0.8365 | 0.1024 | 0.9349 | 0.1280 | 0.7660 |
| 0.0837 | 0.9660 | 0.1288 | 0.8356 | 0.1026 | 0.9345 | 0.1281 | 0.7652 |
| 0.0840 | 0.9656 | 0.1288 | 0.8347 | 0.1028 | 0.9340 | 0.1281 | 0.7643 |
| 0.0843 | 0.9652 | 0.1289 | 0.8337 | 0.1030 | 0.9336 | 0.1282 | 0.7634 |
| 0.0845 | 0.9648 | 0.1289 | 0.8328 | 0.1033 | 0.9332 | 0.1283 | 0.7626 |
| 0.0848 | 0.9645 | 0.1289 | 0.8319 | 0.1035 | 0.9328 | 0.1283 | 0.7617 |
| 0.0851 | 0.9641 | 0.1290 | 0.8309 | 0.1037 | 0.9323 | 0.1284 | 0.7609 |
| 0.0853 | 0.9637 | 0.1290 | 0.8300 | 0.1039 | 0.9319 | 0.1285 | 0.7600 |
| 0.0856 | 0.9633 | 0.1290 | 0.8291 | 0.1041 | 0.9315 | 0.1286 | 0.7592 |
| 0.0858 | 0.9630 | 0.1290 | 0.8281 | 0.1043 | 0.9311 | 0.1286 | 0.7583 |
| 0.0861 | 0.9626 | 0.1291 | 0.8272 | 0.1045 | 0.9306 | 0.1287 | 0.7574 |
| 0.0864 | 0.9622 | 0.1291 | 0.8263 | 0.1047 | 0.9302 | 0.1288 | 0.7566 |
| 0.0866 | 0.9618 | 0.1291 | 0.8253 | 0.1049 | 0.9298 | 0.1289 | 0.7557 |
| 0.0869 | 0.9614 | 0.1291 | 0.8244 | 0.1051 | 0.9294 | 0.1290 | 0.7549 |
| 0.0871 | 0.9610 | 0.1291 | 0.8235 | 0.1053 | 0.9289 | 0.1291 | 0.7540 |
| 0.0874 | 0.9607 | 0.1291 | 0.8225 | 0.1055 | 0.9285 | 0.1292 | 0.7532 |
| 0.0877 | 0.9603 | 0.1291 | 0.8216 | 0.1057 | 0.9281 | 0.1293 | 0.7523 |
| 0.0879 | 0.9599 | 0.1291 | 0.8207 | 0.1059 | 0.9276 | 0.1294 | 0.7515 |
| 0.0882 | 0.9595 | 0.1291 | 0.8197 | 0.1061 | 0.9272 | 0.1295 | 0.7506 |
| 0.0884 | 0.9591 | 0.1291 | 0.8188 | 0.1063 | 0.9268 | 0.1296 | 0.7498 |
| 0.0887 | 0.9587 | 0.1290 | 0.8179 | 0.1065 | 0.9264 | 0.1298 | 0.7489 |
| 0.0889 | 0.9584 | 0.1290 | 0.8169 | 0.1067 | 0.9259 | 0.1299 | 0.7481 |
| 0.0892 | 0.9580 | 0.1290 | 0.8160 | 0.1069 | 0.9255 | 0.1300 | 0.7472 |
| 0.0894 | 0.9576 | 0.1290 | 0.8151 | 0.1071 | 0.9251 | 0.1301 | 0.7464 |
| 0.0897 | 0.9572 | 0.1289 | 0.8141 | 0.1073 | 0.9246 | 0.1302 | 0.7455 |
| 0.0899 | 0.9568 | 0.1289 | 0.8132 | 0.1075 | 0.9242 | 0.1304 | 0.7447 |
| 0.0902 | 0.9564 | 0.1289 | 0.8122 | 0.1077 | 0.9238 | 0.1305 | 0.7438 |
| 0.0904 | 0.9560 | 0.1288 | 0.8113 | 0.1079 | 0.9233 | 0.1306 | 0.7430 |
| 0.0907 | 0.9556 | 0.1288 | 0.8104 | 0.1081 | 0.9229 | 0.1308 | 0.7421 |
| 0.0909 | 0.9552 | 0.1287 | 0.8095 | 0.1082 | 0.9225 | 0.1309 | 0.7413 |
| 0.0912 | 0.9548 | 0.1287 | 0.8085 | 0.1084 | 0.9220 | 0.1311 | 0.7404 |
| 0.0914 | 0.9544 | 0.1286 | 0.8076 | 0.1086 | 0.9216 | 0.1312 | 0.7396 |
| 0.0917 | 0.9541 | 0.1286 | 0.8067 | 0.1088 | 0.9211 | 0.1314 | 0.7387 |
| 0.0919 | 0.9537 | 0.1285 | 0.8057 | 0.1090 | 0.9207 | 0.1315 | 0.7379 |
| 0.0921 | 0.9533 | 0.1284 | 0.8048 | 0.1092 | 0.9203 | 0.1317 | 0.7370 |
| 0.0924 | 0.9529 | 0.1283 | 0.8039 | 0.1094 | 0.9198 | 0.1318 | 0.7362 |
| 0.0926 | 0.9525 | 0.1283 | 0.8029 | 0.1096 | 0.9194 | 0.1320 | 0.7354 |
| 0.0929 | 0.9521 | 0.1282 | 0.8021 | 0.1097 | 0.9189 | 0.1322 | 0.7345 |
| 0.0931 | 0.9517 | 0.1281 | 0.8012 | 0.1099 | 0.9185 | 0.1323 | 0.7337 |
| 0.0934 | 0.9513 | 0.1281 | 0.8004 | 0.1101 | 0.9181 | 0.1325 | 0.7328 |
| 0.0936 | 0.9509 | 0.1280 | 0.7995 | 0.1103 | 0.9176 | 0.1327 | 0.7320 |
| 0.0938 | 0.9505 | 0.1280 | 0.7986 | 0.1105 | 0.9172 | 0.1329 | 0.7311 |
| 0.0941 | 0.9501 | 0.1279 | 0.7978 | 0.1107 | 0.9167 | 0.1330 | 0.7303 |
| 0.0943 | 0.9497 | 0.1279 | 0.7969 | 0.1108 | 0.9163 | 0.1332 | 0.7295 |
| 0.0946 | 0.9493 | 0.1278 | 0.7961 | 0.1110 | 0.9159 | 0.1334 | 0.7286 |
| 0.0948 | 0.9489 | 0.1278 | 0.7952 | 0.1112 | 0.9154 | 0.1336 | 0.7278 |
| 0.0950 | 0.9485 | 0.1277 | 0.7944 | 0.1114 | 0.9150 | 0.1338 | 0.7269 |
| 0.0953 | 0.9481 | 0.1277 | 0.7935 | 0.1115 | 0.9145 | 0.1340 | 0.7261 |
| 0.0955 | 0.9477 | 0.1276 | 0.7926 | 0.1117 | 0.9141 | 0.1342 | 0.7253 |
| 0.0957 | 0.9473 | 0.1276 | 0.7918 | 0.1119 | 0.9136 | 0.1344 | 0.7244 |
| 0.0960 | 0.9469 | 0.1276 | 0.7909 | 0.1121 | 0.9132 | 0.1346 | 0.7236 |
| 0.0962 | 0.9465 | 0.1276 | 0.7901 | 0.1122 | 0.9127 | 0.1348 | 0.7228 |

-continued

| x | y | x | y |
|---|---|---|---|
| 0.1124 | 0.9123 | 0.1350 | 0.7219 |
| 0.1126 | 0.9118 | 0.1352 | 0.7211 |
| 0.1128 | 0.9114 | 0.1354 | 0.7203 |
| 0.1129 | 0.9109 | 0.1356 | 0.7194 |
| 0.1131 | 0.9105 | 0.1359 | 0.7186 |
| 0.1133 | 0.9100 | 0.1361 | 0.7178 |
| 0.1134 | 0.9096 | 0.1363 | 0.7169 |
| 0.1136 | 0.9091 | 0.1365 | 0.7161 |
| 0.1138 | 0.9087 | 0.1368 | 0.7153 |
| 0.1139 | 0.9082 | 0.1370 | 0.7145 |
| 0.1141 | 0.9078 | 0.1372 | 0.7136 |
| 0.1143 | 0.9073 | 0.1375 | 0.7128 |
| 0.1144 | 0.9069 | 0.1377 | 0.7120 |
| 0.1146 | 0.9064 | 0.1380 | 0.7112 |
| 0.1147 | 0.9060 | 0.1382 | 0.7103 |
| 0.1149 | 0.9055 | 0.1385 | 0.7095 |
| 0.1151 | 0.9051 | 0.1387 | 0.7087 |
| 0.1152 | 0.9046 | 0.1390 | 0.7079 |
| 0.1154 | 0.9042 | 0.1393 | 0.7071 |
| 0.1155 | 0.9037 | 0.1395 | 0.7062 |
| 0.1157 | 0.9032 | 0.1398 | 0.7054 |
| 0.1158 | 0.9028 | 0.1401 | 0.7046 |
| 0.1160 | 0.9023 | 0.1403 | 0.7038 |
| 0.1161 | 0.9019 | 0.1406 | 0.7030 |
| 0.1163 | 0.9014 | 0.1409 | 0.7022 |
| 0.1165 | 0.9010 | 0.1412 | 0.7014 |
| 0.1166 | 0.9005 | 0.1414 | 0.7005 |
| 0.1168 | 0.9000 | 0.1417 | 0.6997 |
| 0.1169 | 0.8996 | 0.1229 | 0.6930 |
| 0.1171 | 0.8991 | 0.1226 | 0.6939 |

| Column 3 | | Column 4 | |
|---|---|---|---|
| x | y | x | y |
| 0.1223 | 0.6948 | 0.0975 | 0.8947 |
| 0.1220 | 0.6957 | 0.0973 | 0.8951 |
| 0.1217 | 0.6966 | 0.0972 | 0.8955 |
| 0.1214 | 0.6974 | 0.0970 | 0.8960 |
| 0.1211 | 0.6983 | 0.0969 | 0.8964 |
| 0.1208 | 0.6992 | 0.0968 | 0.8968 |
| 0.1205 | 0.7001 | 0.0966 | 0.8972 |
| 0.1202 | 0.7010 | 0.0965 | 0.8976 |
| 0.1199 | 0.7019 | 0.0963 | 0.8981 |
| 0.1196 | 0.7027 | 0.0962 | 0.8985 |
| 0.1194 | 0.7036 | 0.0960 | 0.8989 |
| 0.1191 | 0.7045 | 0.0959 | 0.8993 |
| 0.1188 | 0.7054 | 0.0957 | 0.8997 |
| 0.1186 | 0.7063 | 0.0956 | 0.9001 |
| 0.1183 | 0.7072 | 0.0954 | 0.9006 |
| 0.1180 | 0.7081 | 0.0953 | 0.9010 |
| 0.1178 | 0.7090 | 0.0951 | 0.9014 |
| 0.1175 | 0.7099 | 0.0950 | 0.9018 |
| 0.1173 | 0.7108 | 0.0948 | 0.9022 |
| 0.1170 | 0.7116 | 0.0947 | 0.9026 |
| 0.1168 | 0.7125 | 0.0945 | 0.9031 |
| 0.1165 | 0.7134 | 0.0944 | 0.9035 |
| 0.1163 | 0.7143 | 0.0942 | 0.9039 |
| 0.1161 | 0.7152 | 0.0941 | 0.9043 |
| 0.1158 | 0.7161 | 0.0939 | 0.9047 |
| 0.1156 | 0.7170 | 0.0937 | 0.9051 |
| 0.1154 | 0.7179 | 0.0936 | 0.9055 |
| 0.1152 | 0.7188 | 0.0934 | 0.9059 |
| 0.1149 | 0.7197 | 0.0933 | 0.9063 |
| 0.1147 | 0.7206 | 0.0931 | 0.9068 |
| 0.1145 | 0.7215 | 0.0929 | 0.9072 |
| 0.1143 | 0.7225 | 0.0928 | 0.9076 |
| 0.1141 | 0.7234 | 0.0926 | 0.9080 |
| 0.1139 | 0.7243 | 0.0925 | 0.9084 |
| 0.1137 | 0.7252 | 0.0923 | 0.9088 |
| 0.1135 | 0.7261 | 0.0921 | 0.9092 |
| 0.1133 | 0.7270 | 0.0920 | 0.9096 |
| 0.1131 | 0.7279 | 0.0918 | 0.9100 |
| 0.1129 | 0.7288 | 0.0916 | 0.9104 |
| 0.1127 | 0.7297 | 0.0915 | 0.9108 |
| 0.1125 | 0.7306 | 0.0913 | 0.9112 |
| 0.1124 | 0.7315 | 0.0911 | 0.9116 |
| 0.1122 | 0.7324 | 0.0909 | 0.9120 |
| 0.1120 | 0.7334 | 0.0908 | 0.9125 |

-continued

| x | y | x | y |
|---|---|---|---|
| 0.1119 | 0.7343 | 0.0906 | 0.9129 |
| 0.1117 | 0.7352 | 0.0904 | 0.9133 |
| 0.1115 | 0.7361 | 0.0903 | 0.9137 |
| 0.1114 | 0.7370 | 0.0901 | 0.9141 |
| 0.1112 | 0.7379 | 0.0899 | 0.9145 |
| 0.1111 | 0.7388 | 0.0897 | 0.9149 |
| 0.1109 | 0.7398 | 0.0896 | 0.9153 |
| 0.1108 | 0.7407 | 0.0894 | 0.9157 |
| 0.1106 | 0.7416 | 0.0892 | 0.9161 |
| 0.1105 | 0.7425 | 0.0890 | 0.9165 |
| 0.1103 | 0.7434 | 0.0889 | 0.9169 |
| 0.1102 | 0.7444 | 0.0887 | 0.9173 |
| 0.1101 | 0.7453 | 0.0885 | 0.9177 |
| 0.1099 | 0.7462 | 0.0883 | 0.9181 |
| 0.1098 | 0.7471 | 0.0881 | 0.9184 |
| 0.1097 | 0.7480 | 0.0879 | 0.9188 |
| 0.1096 | 0.7490 | 0.0878 | 0.9192 |
| 0.1095 | 0.7499 | 0.0876 | 0.9196 |
| 0.1093 | 0.7508 | 0.0874 | 0.9200 |
| 0.1092 | 0.7517 | 0.0872 | 0.9204 |
| 0.1091 | 0.7526 | 0.0870 | 0.9208 |
| 0.1090 | 0.7536 | 0.0868 | 0.9212 |
| 0.1089 | 0.7545 | 0.0867 | 0.9216 |
| 0.1088 | 0.7554 | 0.0865 | 0.9220 |
| 0.1087 | 0.7563 | 0.0863 | 0.9224 |
| 0.1087 | 0.7573 | 0.0861 | 0.9228 |
| 0.1086 | 0.7582 | 0.0859 | 0.9232 |
| 0.1085 | 0.7591 | 0.0857 | 0.9236 |
| 0.1084 | 0.7600 | 0.0855 | 0.9239 |
| 0.1083 | 0.7610 | 0.0853 | 0.9243 |
| 0.1083 | 0.7619 | 0.0851 | 0.9247 |
| 0.1082 | 0.7628 | 0.0849 | 0.9251 |
| 0.1081 | 0.7637 | 0.0847 | 0.9255 |
| 0.1081 | 0.7647 | 0.0846 | 0.9259 |
| 0.1080 | 0.7656 | 0.0844 | 0.9263 |
| 0.1079 | 0.7665 | 0.0842 | 0.9267 |
| 0.1079 | 0.7674 | 0.0840 | 0.9270 |
| 0.1078 | 0.7684 | 0.0838 | 0.9274 |
| 0.1078 | 0.7693 | 0.0836 | 0.9278 |
| 0.1077 | 0.7702 | 0.0834 | 0.9282 |
| 0.1077 | 0.7712 | 0.0832 | 0.9286 |
| 0.1077 | 0.7721 | 0.0830 | 0.9290 |
| 0.1076 | 0.7730 | 0.0828 | 0.9293 |
| 0.1076 | 0.7739 | 0.0826 | 0.9297 |
| 0.1076 | 0.7749 | 0.0824 | 0.9301 |
| 0.1075 | 0.7758 | 0.0822 | 0.9305 |
| 0.1075 | 0.7767 | 0.0820 | 0.9309 |
| 0.1075 | 0.7777 | 0.0818 | 0.9313 |
| 0.1075 | 0.7786 | 0.0816 | 0.9316 |
| 0.1075 | 0.7795 | 0.0814 | 0.9320 |
| 0.1075 | 0.7804 | 0.0811 | 0.9324 |
| 0.1074 | 0.7814 | 0.0809 | 0.9328 |
| 0.1074 | 0.7823 | 0.0807 | 0.9331 |
| 0.1074 | 0.7832 | 0.0805 | 0.9335 |
| 0.1074 | 0.7842 | 0.0803 | 0.9339 |
| 0.1075 | 0.7851 | 0.0801 | 0.9343 |
| 0.1075 | 0.7860 | 0.0799 | 0.9346 |
| 0.1075 | 0.7869 | 0.0797 | 0.9350 |
| 0.1075 | 0.7879 | 0.0795 | 0.9354 |
| 0.1075 | 0.7888 | 0.0793 | 0.9358 |
| 0.1075 | 0.7897 | 0.0791 | 0.9361 |
| 0.1076 | 0.7907 | 0.0788 | 0.9365 |
| 0.1076 | 0.7916 | 0.0786 | 0.9369 |
| 0.1076 | 0.7925 | 0.0784 | 0.9373 |
| 0.1077 | 0.7934 | 0.0782 | 0.9376 |
| 0.1077 | 0.7944 | 0.0780 | 0.9380 |
| 0.1077 | 0.7953 | 0.0778 | 0.9384 |
| 0.1078 | 0.7962 | 0.0776 | 0.9387 |
| 0.1078 | 0.7971 | 0.0773 | 0.9391 |
| 0.1079 | 0.7981 | 0.0771 | 0.9395 |
| 0.1079 | 0.7990 | 0.0769 | 0.9398 |
| 0.1080 | 0.7999 | 0.0767 | 0.9402 |
| 0.1081 | 0.8009 | 0.0765 | 0.9406 |
| 0.1081 | 0.8018 | 0.0762 | 0.9409 |
| 0.1082 | 0.8027 | 0.0760 | 0.9413 |
| 0.1083 | 0.8036 | 0.0758 | 0.9417 |
| 0.1083 | 0.8045 | 0.0756 | 0.9420 |
| 0.1084 | 0.8054 | 0.0754 | 0.9424 |
| 0.1085 | 0.8063 | 0.0751 | 0.9428 |

-continued

| | | | |
|---|---|---|---|
| 0.1085 | 0.8071 | 0.0749 | 0.9431 |
| 0.1086 | 0.8080 | 0.0747 | 0.9435 |
| 0.1087 | 0.8088 | 0.0745 | 0.9438 |
| 0.1087 | 0.8097 | 0.0742 | 0.9442 |
| 0.1088 | 0.8106 | 0.0740 | 0.9446 |
| 0.1088 | 0.8114 | 0.0738 | 0.9449 |
| 0.1088 | 0.8123 | 0.0735 | 0.9453 |
| 0.1089 | 0.8131 | 0.0733 | 0.9456 |
| 0.1089 | 0.8140 | 0.0731 | 0.9460 |
| 0.1089 | 0.8148 | 0.0729 | 0.9464 |
| 0.1090 | 0.8157 | 0.0726 | 0.9467 |
| 0.1090 | 0.8166 | 0.0724 | 0.9471 |
| 0.1090 | 0.8174 | 0.0722 | 0.9474 |
| 0.1090 | 0.8183 | 0.0719 | 0.9478 |
| 0.1091 | 0.8191 | 0.0717 | 0.9481 |
| 0.1091 | 0.8200 | 0.0715 | 0.9485 |
| 0.1091 | 0.8208 | 0.0712 | 0.9488 |
| 0.1091 | 0.8217 | 0.0710 | 0.9492 |
| 0.1091 | 0.8226 | 0.0708 | 0.9496 |
| 0.1091 | 0.8234 | 0.0705 | 0.9499 |
| 0.1091 | 0.8243 | 0.0703 | 0.9503 |
| 0.1091 | 0.8251 | 0.0701 | 0.9506 |
| 0.1091 | 0.8260 | 0.0698 | 0.9510 |
| 0.1091 | 0.8268 | 0.0696 | 0.9513 |
| 0.1090 | 0.8277 | 0.0693 | 0.9517 |
| 0.1090 | 0.8286 | 0.0691 | 0.9520 |
| 0.1090 | 0.8294 | 0.0689 | 0.9523 |
| 0.1090 | 0.8303 | 0.0686 | 0.9527 |
| 0.1089 | 0.8311 | 0.0684 | 0.9530 |
| 0.1089 | 0.8320 | 0.0681 | 0.9534 |
| 0.1089 | 0.8329 | 0.0679 | 0.9537 |
| 0.1088 | 0.8337 | 0.0677 | 0.9541 |
| 0.1088 | 0.8346 | 0.0674 | 0.9544 |
| 0.1088 | 0.8354 | 0.0672 | 0.9548 |
| 0.1087 | 0.8363 | 0.0669 | 0.9551 |
| 0.1087 | 0.8371 | 0.0667 | 0.9555 |
| 0.1086 | 0.8380 | 0.0664 | 0.9558 |
| 0.1085 | 0.8388 | 0.0662 | 0.9561 |
| 0.1085 | 0.8397 | 0.0659 | 0.9565 |
| 0.1084 | 0.8406 | 0.0657 | 0.9568 |
| 0.1083 | 0.8414 | 0.0655 | 0.9572 |
| 0.1083 | 0.8423 | 0.0652 | 0.9575 |
| 0.1082 | 0.8431 | 0.0650 | 0.9578 |
| 0.1081 | 0.8440 | 0.0647 | 0.9582 |
| 0.1080 | 0.8448 | 0.0645 | 0.9585 |
| 0.1079 | 0.8457 | 0.0642 | 0.9588 |
| 0.1079 | 0.8465 | 0.0640 | 0.9592 |
| 0.1078 | 0.8474 | 0.0637 | 0.9595 |
| 0.1077 | 0.8482 | 0.0635 | 0.9598 |
| 0.1076 | 0.8491 | 0.0632 | 0.9602 |
| 0.1075 | 0.8500 | 0.0629 | 0.9605 |
| 0.1074 | 0.8508 | 0.0627 | 0.9608 |
| 0.1073 | 0.8517 | 0.0624 | 0.9612 |
| 0.1072 | 0.8525 | 0.0622 | 0.9615 |
| 0.1070 | 0.8534 | 0.0619 | 0.9618 |
| 0.1069 | 0.8542 | 0.0617 | 0.9622 |
| 0.1068 | 0.8551 | 0.0614 | 0.9625 |
| 0.1067 | 0.8559 | 0.0612 | 0.9628 |
| 0.1066 | 0.8568 | 0.0609 | 0.9632 |
| 0.1064 | 0.8576 | 0.0606 | 0.9635 |
| 0.1063 | 0.8585 | 0.0604 | 0.9638 |
| 0.1062 | 0.8593 | 0.0601 | 0.9641 |
| 0.1060 | 0.8601 | 0.0599 | 0.9645 |
| 0.1059 | 0.8610 | 0.0596 | 0.9648 |
| 0.1057 | 0.8618 | 0.0593 | 0.9651 |
| 0.1056 | 0.8627 | 0.0591 | 0.9654 |
| 0.1054 | 0.8635 | 0.0588 | 0.9658 |
| 0.1053 | 0.8644 | 0.0586 | 0.9661 |
| 0.1051 | 0.8652 | 0.0583 | 0.9664 |
| 0.1049 | 0.8661 | 0.0580 | 0.9667 |
| 0.1048 | 0.8669 | 0.0578 | 0.9670 |
| 0.1046 | 0.8677 | 0.0575 | 0.9674 |
| 0.1045 | 0.8684 | 0.0572 | 0.9677 |
| 0.1043 | 0.8691 | 0.0570 | 0.9680 |
| 0.1042 | 0.8695 | 0.0567 | 0.9683 |
| 0.1041 | 0.8700 | 0.0564 | 0.9686 |
| 0.1040 | 0.8704 | 0.0562 | 0.9690 |
| 0.1039 | 0.8709 | 0.0559 | 0.9693 |
| 0.1039 | 0.8713 | 0.0556 | 0.9696 |

-continued

| | | | |
|---|---|---|---|
| 0.1038 | 0.8718 | 0.0554 | 0.9699 |
| 0.1037 | 0.8722 | 0.0551 | 0.9702 |
| 0.1036 | 0.8726 | 0.0548 | 0.9705 |
| 0.1035 | 0.8731 | 0.0546 | 0.9709 |
| 0.1034 | 0.8735 | 0.0543 | 0.9712 |
| 0.1033 | 0.8740 | 0.0540 | 0.9715 |
| 0.1032 | 0.8744 | 0.0538 | 0.9718 |
| 0.1031 | 0.8748 | 0.0535 | 0.9721 |
| 0.1029 | 0.8753 | 0.0532 | 0.9724 |
| 0.1028 | 0.8757 | 0.0529 | 0.9727 |
| 0.1027 | 0.8762 | 0.0527 | 0.9730 |
| 0.1026 | 0.8766 | 0.0524 | 0.9733 |
| 0.1025 | 0.8770 | 0.0521 | 0.9736 |
| 0.1024 | 0.8775 | 0.0518 | 0.9740 |
| 0.1023 | 0.8779 | 0.0516 | 0.9743 |
| 0.1022 | 0.8784 | 0.0513 | 0.9746 |
| 0.1021 | 0.8788 | 0.0510 | 0.9749 |
| 0.1020 | 0.8792 | 0.0507 | 0.9752 |
| 0.1019 | 0.8797 | 0.0505 | 0.9755 |
| 0.1018 | 0.8801 | 0.0502 | 0.9758 |
| 0.1016 | 0.8805 | 0.0499 | 0.9761 |
| 0.1015 | 0.8810 | 0.0496 | 0.9764 |
| 0.1014 | 0.8814 | 0.0493 | 0.9767 |
| 0.1013 | 0.8818 | 0.0491 | 0.9770 |
| 0.1012 | 0.8823 | 0.0488 | 0.9773 |
| 0.1011 | 0.8827 | 0.0485 | 0.9776 |
| 0.1009 | 0.8831 | 0.0482 | 0.9779 |
| 0.1008 | 0.8836 | 0.0479 | 0.9782 |
| 0.1007 | 0.8840 | 0.0477 | 0.9785 |
| 0.1006 | 0.8844 | 0.0474 | 0.9788 |
| 0.1005 | 0.8849 | 0.0471 | 0.9791 |
| 0.1003 | 0.8853 | 0.0468 | 0.9794 |
| 0.1002 | 0.8857 | 0.0465 | 0.9797 |
| 0.1001 | 0.8862 | 0.0462 | 0.9800 |
| 0.1000 | 0.8866 | 0.0460 | 0.9803 |
| 0.0998 | 0.8870 | 0.0457 | 0.9805 |
| 0.0997 | 0.8875 | 0.0454 | 0.9808 |
| 0.0996 | 0.8879 | 0.0451 | 0.9811 |
| 0.0995 | 0.8883 | 0.0448 | 0.9814 |
| 0.0993 | 0.8887 | 0.0445 | 0.9817 |
| 0.0992 | 0.8892 | 0.0442 | 0.9820 |
| 0.0991 | 0.8896 | 0.0440 | 0.9823 |
| 0.0989 | 0.8900 | 0.0437 | 0.9826 |
| 0.0988 | 0.8904 | 0.0434 | 0.9829 |
| 0.0987 | 0.8909 | 0.0431 | 0.9831 |
| 0.0986 | 0.8913 | 0.0428 | 0.9834 |
| 0.0984 | 0.8917 | 0.0425 | 0.9837 |
| 0.0983 | 0.8921 | 0.0422 | 0.9840 |
| 0.0981 | 0.8926 | 0.0422 | 0.9841 |
| 0.0980 | 0.8930 | 0.0561 | 0.9984 |
| 0.0979 | 0.8934 | — | — |
| 0.0977 | 0.8938 | — | — |
| 0.0976 | 0.8943 | — | —. |

2. The headstock gear according to claim 1, characterized in that the plurality of teeth comprises 11 teeth.

3. The headstock gear according to claim 1, characterized in that one of the S-shaped profiles has an envelope including all of the following non-dimensional x-y-coordinates in all following columns:

| Column 1 | | Column 2 | | Column 3 | | Column 4 | |
|---|---|---|---|---|---|---|---|
| x | y | x | y | x | y | x | y |
| 0.1404 | 0.6794 | 0.1190 | 0.8288 | 0.1144 | 0.8696 | 0.1070 | 0.8978 |
| 0.1361 | 0.6873 | 0.1189 | 0.8315 | 0.1144 | 0.8696 | 0.1048 | 0.9039 |
| 0.1326 | 0.6955 | 0.1188 | 0.8351 | 0.1144 | 0.8696 | 0.1024 | 0.9104 |
| 0.1287 | 0.7074 | 0.1186 | 0.8378 | 0.1144 | 0.8696 | 0.0998 | 0.9168 |
| 0.1255 | 0.7186 | 0.1184 | 0.8413 | 0.1144 | 0.8696 | 0.0972 | 0.9226 |
| 0.1227 | 0.7308 | 0.1182 | 0.8440 | 0.1143 | 0.8705 | 0.0943 | 0.9288 |
| 0.1205 | 0.7431 | 0.1178 | 0.8476 | 0.1143 | 0.8705 | 0.0912 | 0.9348 |
| 0.1190 | 0.7547 | 0.1175 | 0.8503 | 0.1143 | 0.8705 | 0.0882 | 0.9403 |
| 0.1179 | 0.7671 | 0.1171 | 0.8538 | 0.1143 | 0.8705 | 0.0848 | 0.9461 |
| 0.1175 | 0.7796 | 0.1167 | 0.8565 | 0.1143 | 0.8705 | 0.0813 | 0.9518 |
| 0.1176 | 0.7912 | 0.1162 | 0.8600 | 0.1143 | 0.8705 | 0.0778 | 0.9569 |
| 0.1183 | 0.8037 | 0.1157 | 0.8627 | 0.1143 | 0.8705 | 0.0740 | 0.9623 |
| 0.1185 | 0.8064 | 0.1151 | 0.8662 | 0.1141 | 0.8711 | 0.0701 | 0.9676 |
| 0.1187 | 0.8100 | 0.1146 | 0.8688 | 0.1141 | 0.8711 | 0.0663 | 0.9724 |
| 0.1189 | 0.8127 | 0.1146 | 0.8688 | 0.1141 | 0.8711 | 0.0621 | 0.9774 |
| 0.1190 | 0.8163 | 0.1146 | 0.8688 | 0.1141 | 0.8711 | 0.0578 | 0.9822 |
| 0.1191 | 0.8190 | 0.1146 | 0.8688 | 0.1126 | 0.8780 | 0.0537 | 0.9866 |
| 0.1191 | 0.8225 | 0.1144 | 0.8696 | 0.1110 | 0.8844 | | |
| 0.1191 | 0.8252 | 0.1144 | 0.8696 | 0.1090 | 0.8912 | | |

4. The headstock gear according to claim 1, characterized in that one of the S-shaped profiles has an envelope comprising all of the following non-dimensional x-y-coordinates in all of the following columns:

| Column 1 | | Column 2 | | Column 3 | | Column 4 | |
|---|---|---|---|---|---|---|---|
| x | y | x | y | x | y | x | y |
| 0.1887 | 0.6427 | 0.1191 | 0.8252 | 0.1143 | 0.8705 | 0.0740 | 0.9623 |
| 0.1802 | 0.6456 | 0.1190 | 0.8288 | 0.1143 | 0.8705 | 0.0701 | 0.9676 |
| 0.1721 | 0.6495 | 0.1189 | 0.8315 | 0.1143 | 0.8705 | 0.0663 | 0.9724 |
| 0.1645 | 0.6542 | 0.1188 | 0.8351 | 0.1143 | 0.8705 | 0.0621 | 0.9774 |
| 0.1573 | 0.6597 | 0.1186 | 0.8378 | 0.1143 | 0.8705 | 0.0578 | 0.9822 |
| 0.1514 | 0.6652 | 0.1184 | 0.8413 | 0.1143 | 0.8705 | 0.0537 | 0.9866 |
| 0.1456 | 0.6720 | 0.1182 | 0.8440 | 0.1143 | 0.8705 | 0.0492 | 0.9912 |
| 0.1404 | 0.6794 | 0.1178 | 0.8476 | 0.1141 | 0.8711 | 0.0482 | 0.9921 |
| 0.1361 | 0.6873 | 0.1175 | 0.8503 | 0.1141 | 0.8711 | 0.0471 | 0.9929 |
| 0.1326 | 0.6955 | 0.1171 | 0.8538 | 0.1141 | 0.8711 | 0.0459 | 0.9937 |
| 0.1287 | 0.7074 | 0.1167 | 0.8565 | 0.1141 | 0.8711 | 0.0447 | 0.9943 |
| 0.1255 | 0.7186 | 0.1162 | 0.8600 | 0.1126 | 0.8780 | 0.0435 | 0.9948 |
| 0.1227 | 0.7308 | 0.1157 | 0.8627 | 0.1110 | 0.8844 | 0.0422 | 0.9953 |
| 0.1205 | 0.7431 | 0.1151 | 0.8662 | 0.1090 | 0.8912 | 0.0409 | 0.9956 |
| 0.1190 | 0.7547 | 0.1146 | 0.8688 | 0.1070 | 0.8978 | 0.0395 | 0.9958 |
| 0.1179 | 0.7671 | 0.1146 | 0.8688 | 0.1048 | 0.9039 | 0.0382 | 0.9959 |
| 0.1175 | 0.7796 | 0.1146 | 0.8688 | 0.1024 | 0.9104 | 0.0340 | 0.9961 |
| 0.1176 | 0.7912 | 0.1146 | 0.8688 | 0.0998 | 0.9168 | 0.0296 | 0.9962 |
| 0.1183 | 0.8037 | 0.1144 | 0.8696 | 0.0972 | 0.9226 | 0.0254 | 0.9963 |
| 0.1185 | 0.8064 | 0.1144 | 0.8696 | 0.0943 | 0.9288 | 0.0213 | 0.9964 |
| 0.1187 | 0.8100 | 0.1144 | 0.8696 | 0.0912 | 0.9348 | 0.0169 | 0.9965 |
| 0.1189 | 0.8127 | 0.1144 | 0.8696 | 0.0882 | 0.9403 | 0.0127 | 0.9966 |
| 0.1190 | 0.8163 | 0.1144 | 0.8696 | 0.0848 | 0.9461 | 0.0086 | 0.9966 |
| 0.1191 | 0.8190 | 0.1144 | 0.8696 | 0.0813 | 0.9518 | 0.0042 | 0.9967 |
| 0.1191 | 0.8225 | 0.1144 | 0.8696 | 0.0778 | 0.9569 | 0.0000 | 0.9967 |

5. The headstock gear according to claim 1, wherein one of the S-shaped profiles comprises an envelope fitting into a frame with the non-dimensional outer limitations defined by x-y coordinates, the x-y coordinates are multiplied by a dimension to obtain a dimensioned tooth geometry, and the headstock gear extends over the entire height of each tooth wherein the S-shaped profile has the length of about 70 mm.

6. The headstock gear according to claim 1, characterized in that each of the gear rack segments comprises several rack teeth, wherein the gear rack teeth have a substantially trapezoid cross-section.

7. The headstock gear according to claim 1, characterized in that the headstock gear comprises 11 teeth, wherein the gear rack comprises a nominal gear rack pitch of 147 mm.

8. The headstock gear according to claim 1, characterized in that the headstock tooth geometry is designed such that root stresses of each tooth are minimized.

9. The headstock gear according to claim 1, characterized in that the headstock gear tooth geometry is designed such that a product of Hertzian stress and a relative slip component is minimized when engaged with the gear rack.

10. A method for dimensioning a tooth geometry of a headstock gear for a shearer loader, comprising a plurality of teeth, the method comprising the steps of:
  identifying engagement conditions during operation of the headstock gear together with the gear rack; and
  selecting a tooth geometry on the basis of the identified relevant engagement conditions by minimizing a tooth root tension and wherein the tooth geometry is configured to engage with at least two different gear rack pitches, and the teeth are selectively hardened at the root while remaining unhardened at the tip to accommodate variations in the at least two different gear rack pitches during engagement, and one of the S-shaped profiles comprises an envelope fitting into a frame with the non-dimensional outer limitations defined by x-y coordinates set forth in all of the following columns:

| Column 1 | | Column 2 | | Column 3 | | Column 4 | |
|---|---|---|---|---|---|---|---|
| x | y | x | y | x | y | x | y |
| 0.0561 | 0.9984 | 0.1172 | 0.8987 | 0.1223 | 0.6948 | 0.0975 | 0.8947 |
| 0.0562 | 0.9983 | 0.1173 | 0.8982 | 0.1220 | 0.6957 | 0.0973 | 0.8951 |
| 0.0565 | 0.9980 | 0.1175 | 0.8977 | 0.1217 | 0.6966 | 0.0972 | 0.8955 |
| 0.0568 | 0.9977 | 0.1176 | 0.8973 | 0.1214 | 0.6974 | 0.0970 | 0.8960 |
| 0.0572 | 0.9974 | 0.1178 | 0.8968 | 0.1211 | 0.6983 | 0.0969 | 0.8964 |
| 0.0575 | 0.9970 | 0.1179 | 0.8963 | 0.1208 | 0.6992 | 0.0968 | 0.8968 |
| 0.0578 | 0.9967 | 0.1181 | 0.8959 | 0.1205 | 0.7001 | 0.0966 | 0.8972 |
| 0.0581 | 0.9964 | 0.1182 | 0.8954 | 0.1202 | 0.7010 | 0.0965 | 0.8976 |
| 0.0584 | 0.9961 | 0.1184 | 0.8950 | 0.1199 | 0.7019 | 0.0963 | 0.8981 |
| 0.0587 | 0.9958 | 0.1185 | 0.8945 | 0.1196 | 0.7027 | 0.0962 | 0.8985 |
| 0.0590 | 0.9955 | 0.1186 | 0.8940 | 0.1194 | 0.7036 | 0.0960 | 0.8989 |
| 0.0594 | 0.9952 | 0.1188 | 0.8936 | 0.1191 | 0.7045 | 0.0959 | 0.8993 |
| 0.0597 | 0.9948 | 0.1189 | 0.8931 | 0.1188 | 0.7054 | 0.0957 | 0.8997 |
| 0.0600 | 0.9945 | 0.1190 | 0.8926 | 0.1186 | 0.7063 | 0.0956 | 0.9001 |
| 0.0603 | 0.9942 | 0.1192 | 0.8922 | 0.1183 | 0.7072 | 0.0954 | 0.9006 |
| 0.0606 | 0.9939 | 0.1193 | 0.8917 | 0.1180 | 0.7081 | 0.0953 | 0.9010 |
| 0.0609 | 0.9935 | 0.1194 | 0.8912 | 0.1178 | 0.7090 | 0.0951 | 0.9014 |
| 0.0612 | 0.9932 | 0.1196 | 0.8908 | 0.1175 | 0.7099 | 0.0950 | 0.9018 |
| 0.0615 | 0.9929 | 0.1197 | 0.8903 | 0.1173 | 0.7108 | 0.0948 | 0.9022 |
| 0.0619 | 0.9926 | 0.1198 | 0.8898 | 0.1170 | 0.7116 | 0.0947 | 0.9026 |
| 0.0622 | 0.9923 | 0.1200 | 0.8894 | 0.1168 | 0.7125 | 0.0945 | 0.9031 |
| 0.0625 | 0.9919 | 0.1201 | 0.8889 | 0.1165 | 0.7134 | 0.0944 | 0.9035 |
| 0.0628 | 0.9916 | 0.1202 | 0.8884 | 0.1163 | 0.7143 | 0.0942 | 0.9039 |
| 0.0631 | 0.9913 | 0.1204 | 0.8879 | 0.1161 | 0.7152 | 0.0941 | 0.9043 |
| 0.0634 | 0.9910 | 0.1205 | 0.8875 | 0.1158 | 0.7161 | 0.0939 | 0.9047 |
| 0.0637 | 0.9906 | 0.1206 | 0.8870 | 0.1156 | 0.7170 | 0.0937 | 0.9051 |
| 0.0640 | 0.9903 | 0.1207 | 0.8865 | 0.1154 | 0.7179 | 0.0936 | 0.9055 |
| 0.0643 | 0.9900 | 0.1209 | 0.8861 | 0.1152 | 0.7188 | 0.0934 | 0.9059 |
| 0.0646 | 0.9896 | 0.1210 | 0.8856 | 0.1149 | 0.7197 | 0.0933 | 0.9063 |
| 0.0649 | 0.9893 | 0.1211 | 0.8851 | 0.1147 | 0.7206 | 0.0931 | 0.9068 |
| 0.0652 | 0.9890 | 0.1212 | 0.8846 | 0.1145 | 0.7215 | 0.0929 | 0.9072 |
| 0.0655 | 0.9886 | 0.1214 | 0.8842 | 0.1143 | 0.7225 | 0.0928 | 0.9076 |
| 0.0658 | 0.9883 | 0.1215 | 0.8837 | 0.1141 | 0.7234 | 0.0926 | 0.9080 |
| 0.0661 | 0.9880 | 0.1216 | 0.8832 | 0.1139 | 0.7243 | 0.0925 | 0.9084 |
| 0.0664 | 0.9876 | 0.1217 | 0.8827 | 0.1137 | 0.7252 | 0.0923 | 0.9088 |
| 0.0667 | 0.9873 | 0.1218 | 0.8823 | 0.1135 | 0.7261 | 0.0921 | 0.9092 |
| 0.0670 | 0.9870 | 0.1220 | 0.8818 | 0.1133 | 0.7270 | 0.0920 | 0.9096 |
| 0.0673 | 0.9866 | 0.1221 | 0.8813 | 0.1131 | 0.7279 | 0.0918 | 0.9100 |
| 0.0676 | 0.9863 | 0.1222 | 0.8808 | 0.1129 | 0.7288 | 0.0916 | 0.9104 |
| 0.0679 | 0.9860 | 0.1223 | 0.8804 | 0.1127 | 0.7297 | 0.0915 | 0.9108 |
| 0.0682 | 0.9856 | 0.1224 | 0.8799 | 0.1125 | 0.7306 | 0.0913 | 0.9112 |
| 0.0685 | 0.9853 | 0.1225 | 0.8794 | 0.1124 | 0.7315 | 0.0911 | 0.9116 |
| 0.0688 | 0.9849 | 0.1226 | 0.8789 | 0.1122 | 0.7324 | 0.0909 | 0.9120 |
| 0.0691 | 0.9846 | 0.1227 | 0.8785 | 0.1120 | 0.7334 | 0.0908 | 0.9125 |
| 0.0694 | 0.9843 | 0.1229 | 0.8780 | 0.1119 | 0.7343 | 0.0906 | 0.9129 |
| 0.0697 | 0.9839 | 0.1230 | 0.8775 | 0.1117 | 0.7352 | 0.0904 | 0.9133 |
| 0.0700 | 0.9836 | 0.1231 | 0.8770 | 0.1115 | 0.7361 | 0.0903 | 0.9137 |
| 0.0703 | 0.9832 | 0.1232 | 0.8765 | 0.1114 | 0.7370 | 0.0901 | 0.9141 |
| 0.0706 | 0.9829 | 0.1233 | 0.8761 | 0.1112 | 0.7379 | 0.0899 | 0.9145 |
| 0.0709 | 0.9825 | 0.1234 | 0.8756 | 0.1111 | 0.7388 | 0.0897 | 0.9149 |
| 0.0712 | 0.9822 | 0.1235 | 0.8751 | 0.1109 | 0.7398 | 0.0896 | 0.9153 |
| 0.0715 | 0.9819 | 0.1236 | 0.8746 | 0.1108 | 0.7407 | 0.0894 | 0.9157 |
| 0.0718 | 0.9815 | 0.1237 | 0.8741 | 0.1106 | 0.7416 | 0.0892 | 0.9161 |
| 0.0721 | 0.9812 | 0.1238 | 0.8737 | 0.1105 | 0.7425 | 0.0890 | 0.9165 |
| 0.0723 | 0.9808 | 0.1239 | 0.8732 | 0.1103 | 0.7434 | 0.0889 | 0.9169 |
| 0.0726 | 0.9805 | 0.1241 | 0.8725 | 0.1102 | 0.7444 | 0.0887 | 0.9173 |
| 0.0729 | 0.9801 | 0.1242 | 0.8716 | 0.1101 | 0.7453 | 0.0885 | 0.9177 |
| 0.0732 | 0.9798 | 0.1244 | 0.8708 | 0.1099 | 0.7462 | 0.0883 | 0.9181 |
| 0.0735 | 0.9794 | 0.1246 | 0.8699 | 0.1098 | 0.7471 | 0.0881 | 0.9184 |
| 0.0738 | 0.9791 | 0.1247 | 0.8690 | 0.1097 | 0.7480 | 0.0879 | 0.9188 |
| 0.0741 | 0.9787 | 0.1249 | 0.8680 | 0.1096 | 0.7490 | 0.0878 | 0.9192 |
| 0.0744 | 0.9784 | 0.1251 | 0.8671 | 0.1095 | 0.7499 | 0.0876 | 0.9196 |
| 0.0746 | 0.9780 | 0.1253 | 0.8662 | 0.1093 | 0.7508 | 0.0874 | 0.9200 |
| 0.0749 | 0.9776 | 0.1254 | 0.8653 | 0.1092 | 0.7517 | 0.0872 | 0.9204 |
| 0.0752 | 0.9773 | 0.1256 | 0.8644 | 0.1091 | 0.7526 | 0.0870 | 0.9208 |

-continued

| Column 1 | | Column 2 | | Column 3 | | Column 4 | |
|---|---|---|---|---|---|---|---|
| x | y | x | y | x | y | x | y |
| 0.0755 | 0.9769 | 0.1257 | 0.8634 | 0.1090 | 0.7536 | 0.0868 | 0.9212 |
| 0.0758 | 0.9766 | 0.1259 | 0.8625 | 0.1089 | 0.7545 | 0.0867 | 0.9216 |
| 0.0761 | 0.9762 | 0.1260 | 0.8616 | 0.1088 | 0.7554 | 0.0865 | 0.9220 |
| 0.0763 | 0.9759 | 0.1262 | 0.8607 | 0.1087 | 0.7563 | 0.0863 | 0.9224 |
| 0.0766 | 0.9755 | 0.1263 | 0.8598 | 0.1087 | 0.7573 | 0.0861 | 0.9228 |
| 0.0769 | 0.9752 | 0.1265 | 0.8588 | 0.1086 | 0.7582 | 0.0859 | 0.9232 |
| 0.0772 | 0.9748 | 0.1266 | 0.8579 | 0.1085 | 0.7591 | 0.0857 | 0.9236 |
| 0.0775 | 0.9744 | 0.1267 | 0.8570 | 0.1084 | 0.7600 | 0.0855 | 0.9239 |
| 0.0778 | 0.9741 | 0.1269 | 0.8561 | 0.1083 | 0.7610 | 0.0853 | 0.9243 |
| 0.0780 | 0.9737 | 0.1270 | 0.8551 | 0.1083 | 0.7619 | 0.0851 | 0.9247 |
| 0.0783 | 0.9733 | 0.1271 | 0.8542 | 0.1082 | 0.7628 | 0.0849 | 0.9251 |
| 0.0786 | 0.9730 | 0.1272 | 0.8533 | 0.1081 | 0.7637 | 0.0847 | 0.9255 |
| 0.0789 | 0.9726 | 0.1273 | 0.8523 | 0.1081 | 0.7647 | 0.0846 | 0.9259 |
| 0.0791 | 0.9723 | 0.1274 | 0.8514 | 0.1080 | 0.7656 | 0.0844 | 0.9263 |
| 0.0794 | 0.9719 | 0.1275 | 0.8505 | 0.1079 | 0.7665 | 0.0842 | 0.9267 |
| 0.0797 | 0.9715 | 0.1277 | 0.8496 | 0.1079 | 0.7674 | 0.0840 | 0.9270 |
| 0.0800 | 0.9712 | 0.1278 | 0.8486 | 0.1078 | 0.7684 | 0.0838 | 0.9274 |
| 0.0802 | 0.9708 | 0.1278 | 0.8477 | 0.1078 | 0.7693 | 0.0836 | 0.9278 |
| 0.0805 | 0.9704 | 0.1279 | 0.8468 | 0.1077 | 0.7702 | 0.0834 | 0.9282 |
| 0.0808 | 0.9701 | 0.1280 | 0.8458 | 0.1077 | 0.7712 | 0.0832 | 0.9286 |
| 0.0811 | 0.9697 | 0.1281 | 0.8449 | 0.1077 | 0.7721 | 0.0830 | 0.9290 |
| 0.0813 | 0.9693 | 0.1282 | 0.8440 | 0.1076 | 0.7730 | 0.0828 | 0.9293 |
| 0.0816 | 0.9690 | 0.1283 | 0.8431 | 0.1076 | 0.7739 | 0.0826 | 0.9297 |
| 0.0819 | 0.9686 | 0.1283 | 0.8421 | 0.1076 | 0.7749 | 0.0824 | 0.9301 |
| 0.0821 | 0.9682 | 0.1284 | 0.8412 | 0.1075 | 0.7758 | 0.0822 | 0.9305 |
| 0.0824 | 0.9678 | 0.1285 | 0.8403 | 0.1075 | 0.7767 | 0.0820 | 0.9309 |
| 0.0827 | 0.9675 | 0.1286 | 0.8393 | 0.1075 | 0.7777 | 0.0818 | 0.9313 |
| 0.0829 | 0.9671 | 0.1286 | 0.8384 | 0.1075 | 0.7786 | 0.0816 | 0.9316 |
| 0.0832 | 0.9674 | 0.1287 | 0.8375 | 0.1075 | 0.7795 | 0.0814 | 0.9320 |
| 0.0835 | 0.9664 | 0.1287 | 0.8365 | 0.1075 | 0.7804 | 0.0811 | 0.9324 |
| 0.0837 | 0.9660 | 0.1288 | 0.8356 | 0.1074 | 0.7814 | 0.0809 | 0.9328 |
| 0.0840 | 0.9656 | 0.1288 | 0.8347 | 0.1074 | 0.7823 | 0.0807 | 0.9331 |
| 0.0843 | 0.9652 | 0.1289 | 0.8337 | 0.1074 | 0.7832 | 0.0805 | 0.9335 |
| 0.0845 | 0.9648 | 0.1289 | 0.8328 | 0.1074 | 0.7842 | 0.0803 | 0.9339 |
| 0.0848 | 0.9645 | 0.1289 | 0.8319 | 0.1075 | 0.7851 | 0.0801 | 0.9343 |
| 0.0851 | 0.9641 | 0.1290 | 0.8309 | 0.1075 | 0.7860 | 0.0799 | 0.9346 |
| 0.0853 | 0.9637 | 0.1290 | 0.8300 | 0.1075 | 0.7869 | 0.0797 | 0.9350 |
| 0.0856 | 0.9633 | 0.1290 | 0.8291 | 0.1075 | 0.7879 | 0.0795 | 0.9354 |
| 0.0858 | 0.9630 | 0.1290 | 0.8281 | 0.1075 | 0.7888 | 0.0793 | 0.9358 |
| 0.0861 | 0.9626 | 0.1291 | 0.8272 | 0.1075 | 0.7897 | 0.0791 | 0.9361 |
| 0.0864 | 0.9622 | 0.1291 | 0.8263 | 0.1076 | 0.7907 | 0.0788 | 0.9365 |
| 0.0866 | 0.9618 | 0.1291 | 0.8253 | 0.1076 | 0.7916 | 0.0786 | 0.9369 |
| 0.0869 | 0.9614 | 0.1291 | 0.8244 | 0.1076 | 0.7925 | 0.0784 | 0.9373 |
| 0.0871 | 0.9610 | 0.1291 | 0.8235 | 0.1077 | 0.7934 | 0.0782 | 0.9376 |
| 0.0874 | 0.9607 | 0.1291 | 0.8225 | 0.1077 | 0.7944 | 0.0780 | 0.9380 |
| 0.0877 | 0.9603 | 0.1291 | 0.8216 | 0.1077 | 0.7953 | 0.0778 | 0.9384 |
| 0.0879 | 0.9599 | 0.1291 | 0.8207 | 0.1078 | 0.7962 | 0.0776 | 0.9387 |
| 0.0882 | 0.9595 | 0.1291 | 0.8197 | 0.1078 | 0.7971 | 0.0773 | 0.9391 |
| 0.0884 | 0.9591 | 0.1291 | 0.8188 | 0.1079 | 0.7981 | 0.0771 | 0.9395 |
| 0.0887 | 0.9587 | 0.1290 | 0.8179 | 0.1079 | 0.7990 | 0.0769 | 0.9398 |
| 0.0889 | 0.9584 | 0.1290 | 0.8169 | 0.1080 | 0.7999 | 0.0767 | 0.9402 |
| 0.0892 | 0.9580 | 0.1290 | 0.8160 | 0.1081 | 0.8009 | 0.0765 | 0.9406 |
| 0.0894 | 0.9576 | 0.1290 | 0.8151 | 0.1081 | 0.8018 | 0.0762 | 0.9409 |
| 0.0897 | 0.9572 | 0.1289 | 0.8141 | 0.1082 | 0.8027 | 0.0760 | 0.9413 |
| 0.0899 | 0.9568 | 0.1289 | 0.8132 | 0.1083 | 0.8036 | 0.0758 | 0.9417 |
| 0.0902 | 0.9564 | 0.1289 | 0.8122 | 0.1083 | 0.8045 | 0.0756 | 0.9420 |
| 0.0904 | 0.9560 | 0.1288 | 0.8113 | 0.1084 | 0.8054 | 0.0754 | 0.9424 |
| 0.0907 | 0.9556 | 0.1288 | 0.8104 | 0.1085 | 0.8063 | 0.0751 | 0.9428 |
| 0.0909 | 0.9552 | 0.1287 | 0.8095 | 0.1085 | 0.8071 | 0.0749 | 0.9431 |
| 0.0912 | 0.9548 | 0.1287 | 0.8085 | 0.1086 | 0.8080 | 0.0747 | 0.9435 |
| 0.0914 | 0.9544 | 0.1286 | 0.8076 | 0.1087 | 0.8088 | 0.0745 | 0.9438 |
| 0.0917 | 0.9541 | 0.1286 | 0.8067 | 0.1087 | 0.8097 | 0.0742 | 0.9442 |
| 0.0919 | 0.9537 | 0.1285 | 0.8057 | 0.1088 | 0.8106 | 0.0740 | 0.9446 |
| 0.0921 | 0.9533 | 0.1284 | 0.8048 | 0.1088 | 0.8114 | 0.0738 | 0.9449 |
| 0.0924 | 0.9529 | 0.1283 | 0.8039 | 0.1088 | 0.8123 | 0.0735 | 0.9453 |
| 0.0926 | 0.9525 | 0.1283 | 0.8029 | 0.1089 | 0.8131 | 0.0733 | 0.9456 |
| 0.0929 | 0.9521 | 0.1282 | 0.8021 | 0.1089 | 0.8140 | 0.0731 | 0.9460 |
| 0.0931 | 0.9517 | 0.1281 | 0.8012 | 0.1089 | 0.8148 | 0.0729 | 0.9464 |
| 0.0934 | 0.9513 | 0.1281 | 0.8004 | 0.1090 | 0.8157 | 0.0726 | 0.9467 |
| 0.0936 | 0.9509 | 0.1280 | 0.7995 | 0.1090 | 0.8166 | 0.0724 | 0.9471 |
| 0.0938 | 0.9505 | 0.1280 | 0.7986 | 0.1090 | 0.8174 | 0.0722 | 0.9474 |
| 0.0941 | 0.9501 | 0.1279 | 0.7978 | 0.1090 | 0.8183 | 0.0719 | 0.9478 |
| 0.0943 | 0.9497 | 0.1279 | 0.7969 | 0.1091 | 0.8191 | 0.0717 | 0.9481 |
| 0.0946 | 0.9493 | 0.1278 | 0.7961 | 0.1091 | 0.8200 | 0.0715 | 0.9485 |
| 0.0948 | 0.9489 | 0.1278 | 0.7952 | 0.1091 | 0.8208 | 0.0712 | 0.9488 |

-continued

| Column 1 | | Column 2 | | Column 3 | | Column 4 | |
| --- | --- | --- | --- | --- | --- | --- | --- |
| x | y | x | y | x | y | x | y |
| 0.0950 | 0.9485 | 0.1277 | 0.7944 | 0.1091 | 0.8217 | 0.0710 | 0.9492 |
| 0.0953 | 0.9481 | 0.1277 | 0.7935 | 0.1091 | 0.8226 | 0.0708 | 0.9496 |
| 0.0955 | 0.9477 | 0.1276 | 0.7926 | 0.1091 | 0.8234 | 0.0705 | 0.9499 |
| 0.0957 | 0.9473 | 0.1276 | 0.7918 | 0.1091 | 0.8243 | 0.0703 | 0.9503 |
| 0.0960 | 0.9469 | 0.1276 | 0.7909 | 0.1091 | 0.8251 | 0.0701 | 0.9506 |
| 0.0962 | 0.9465 | 0.1276 | 0.7901 | 0.1091 | 0.8260 | 0.0698 | 0.9510 |
| 0.0964 | 0.9460 | 0.1275 | 0.7892 | 0.1091 | 0.8268 | 0.0696 | 0.9513 |
| 0.0967 | 0.9456 | 0.1275 | 0.7883 | 0.1090 | 0.8277 | 0.0693 | 0.9517 |
| 0.0969 | 0.9452 | 0.1275 | 0.7875 | 0.1090 | 0.8286 | 0.0691 | 0.9520 |
| 0.0971 | 0.9448 | 0.1275 | 0.7866 | 0.1090 | 0.8294 | 0.0689 | 0.9523 |
| 0.0973 | 0.9444 | 0.1275 | 0.7858 | 0.1090 | 0.8303 | 0.0686 | 0.9527 |
| 0.0976 | 0.9440 | 0.1275 | 0.7849 | 0.1089 | 0.8311 | 0.0684 | 0.9530 |
| 0.0978 | 0.9436 | 0.1274 | 0.7840 | 0.1089 | 0.8320 | 0.0681 | 0.9534 |
| 0.0980 | 0.9432 | 0.1274 | 0.7832 | 0.1089 | 0.8329 | 0.0679 | 0.9537 |
| 0.0983 | 0.9428 | 0.1274 | 0.7823 | 0.1088 | 0.8337 | 0.0677 | 0.9541 |
| 0.0985 | 0.9424 | 0.1274 | 0.7815 | 0.1088 | 0.8346 | 0.0674 | 0.9544 |
| 0.0987 | 0.9420 | 0.1275 | 0.7806 | 0.1088 | 0.8354 | 0.0672 | 0.9548 |
| 0.0989 | 0.9415 | 0.1275 | 0.7797 | 0.1087 | 0.8363 | 0.0669 | 0.9551 |
| 0.0992 | 0.9411 | 0.1275 | 0.7789 | 0.1087 | 0.8371 | 0.0667 | 0.9555 |
| 0.0994 | 0.9407 | 0.1275 | 0.7780 | 0.1086 | 0.8380 | 0.0664 | 0.9558 |
| 0.0996 | 0.9403 | 0.1275 | 0.7772 | 0.1085 | 0.8388 | 0.0662 | 0.9561 |
| 0.0998 | 0.9399 | 0.1275 | 0.7763 | 0.1085 | 0.8397 | 0.0659 | 0.9565 |
| 0.1000 | 0.9395 | 0.1276 | 0.7755 | 0.1084 | 0.8406 | 0.0657 | 0.9568 |
| 0.1003 | 0.9391 | 0.1276 | 0.7746 | 0.1083 | 0.8414 | 0.0655 | 0.9572 |
| 0.1005 | 0.9387 | 0.1276 | 0.7737 | 0.1083 | 0.8423 | 0.0652 | 0.9575 |
| 0.1007 | 0.9382 | 0.1276 | 0.7729 | 0.1082 | 0.8431 | 0.0650 | 0.9578 |
| 0.1009 | 0.9378 | 0.1277 | 0.7720 | 0.1081 | 0.8440 | 0.0647 | 0.9582 |
| 0.1011 | 0.9374 | 0.1277 | 0.7712 | 0.1080 | 0.8448 | 0.0645 | 0.9585 |
| 0.1013 | 0.9370 | 0.1278 | 0.7703 | 0.1079 | 0.8457 | 0.0642 | 0.9588 |
| 0.1016 | 0.9366 | 0.1278 | 0.7694 | 0.1079 | 0.8465 | 0.0640 | 0.9592 |
| 0.1018 | 0.9361 | 0.1278 | 0.7686 | 0.1078 | 0.8474 | 0.0637 | 0.9595 |
| 0.1020 | 0.9357 | 0.1279 | 0.7677 | 0.1077 | 0.8482 | 0.0635 | 0.9598 |
| 0.1022 | 0.9353 | 0.1279 | 0.7669 | 0.1076 | 0.8491 | 0.0632 | 0.9602 |
| 0.1024 | 0.9349 | 0.1280 | 0.7660 | 0.1075 | 0.8500 | 0.0629 | 0.9605 |
| 0.1026 | 0.9345 | 0.1281 | 0.7652 | 0.1074 | 0.8508 | 0.0627 | 0.9608 |
| 0.1028 | 0.9340 | 0.1281 | 0.7643 | 0.1073 | 0.8517 | 0.0624 | 0.9612 |
| 0.1030 | 0.9336 | 0.1282 | 0.7634 | 0.1072 | 0.8525 | 0.0622 | 0.9615 |
| 0.1033 | 0.9332 | 0.1283 | 0.7626 | 0.1070 | 0.8534 | 0.0619 | 0.9618 |
| 0.1035 | 0.9328 | 0.1283 | 0.7617 | 0.1069 | 0.8542 | 0.0617 | 0.9622 |
| 0.1037 | 0.9323 | 0.1284 | 0.7609 | 0.1068 | 0.8551 | 0.0614 | 0.9625 |
| 0.1039 | 0.9319 | 0.1285 | 0.7600 | 0.1067 | 0.8559 | 0.0612 | 0.9628 |
| 0.1041 | 0.9315 | 0.1286 | 0.7592 | 0.1066 | 0.8568 | 0.0609 | 0.9632 |
| 0.1043 | 0.9311 | 0.1286 | 0.7583 | 0.1064 | 0.8576 | 0.0606 | 0.9635 |
| 0.1045 | 0.9306 | 0.1287 | 0.7574 | 0.1063 | 0.8585 | 0.0604 | 0.9638 |
| 0.1047 | 0.9302 | 0.1288 | 0.7566 | 0.1062 | 0.8593 | 0.0601 | 0.9641 |
| 0.1049 | 0.9298 | 0.1289 | 0.7557 | 0.1060 | 0.8601 | 0.0599 | 0.9645 |
| 0.1051 | 0.9294 | 0.1290 | 0.7549 | 0.1059 | 0.8610 | 0.0596 | 0.9648 |
| 0.1053 | 0.9289 | 0.1291 | 0.7540 | 0.1057 | 0.8618 | 0.0593 | 0.9651 |
| 0.1055 | 0.9285 | 0.1292 | 0.7532 | 0.1056 | 0.8627 | 0.0591 | 0.9654 |
| 0.1057 | 0.9281 | 0.1293 | 0.7523 | 0.1054 | 0.8635 | 0.0581 | 0.9658 |
| 0.1059 | 0.9276 | 0.1294 | 0.7515 | 0.1053 | 0.8644 | 0.0586 | 0.9661 |
| 0.1061 | 0.9272 | 0.1295 | 0.7506 | 0.1051 | 0.8652 | 0.0583 | 0.9664 |
| 0.1063 | 0.9268 | 0.1296 | 0.7498 | 0.1049 | 0.8661 | 0.0580 | 0.9667 |
| 0.1065 | 0.9264 | 0.1298 | 0.7489 | 0.1048 | 0.8669 | 0.0578 | 0.9670 |
| 0.1067 | 0.9259 | 0.1299 | 0.7481 | 0.1046 | 0.8677 | 0.0575 | 0.9674 |
| 0.1069 | 0.9255 | 0.1300 | 0.7472 | 0.1045 | 0.8684 | 0.0572 | 0.9677 |
| 0.1071 | 0.9251 | 0.1301 | 0.7464 | 0.1043 | 0.8691 | 0.0570 | 0.9680 |
| 0.1073 | 0.9246 | 0.1302 | 0.7455 | 0.1042 | 0.8695 | 0.0567 | 0.9683 |
| 0.1075 | 0.9242 | 0.1304 | 0.7447 | 0.1041 | 0.8700 | 0.0564 | 0.9686 |
| 0.1077 | 0.9238 | 0.1305 | 0.7438 | 0.1040 | 0.8704 | 0.0562 | 0.9690 |
| 0.1079 | 0.9233 | 0.1306 | 0.7430 | 0.1039 | 0.8709 | 0.0559 | 0.9693 |
| 0.1081 | 0.9229 | 0.1308 | 0.7421 | 0.1039 | 0.8713 | 0.0556 | 0.9696 |
| 0.1082 | 0.9225 | 0.1309 | 0.7413 | 0.1038 | 0.8718 | 0.0554 | 0.9699 |
| 0.1084 | 0.9220 | 0.1311 | 0.7404 | 0.1037 | 0.8722 | 0.0551 | 0.9702 |
| 0.1086 | 0.9216 | 0.1312 | 0.7396 | 0.1036 | 0.8726 | 0.0548 | 0.9705 |
| 0.1088 | 0.9211 | 0.1314 | 0.7387 | 0.1035 | 0.8731 | 0.0546 | 0.9709 |
| 0.1090 | 0.9207 | 0.1315 | 0.7379 | 0.1034 | 0.8735 | 0.0543 | 0.9712 |
| 0.1092 | 0.9203 | 0.1317 | 0.7370 | 0.1033 | 0.8740 | 0.0540 | 0.9715 |
| 0.1094 | 0.9198 | 0.1318 | 0.7362 | 0.1032 | 0.8744 | 0.0538 | 0.9718 |
| 0.1096 | 0.9194 | 0.1320 | 0.7354 | 0.1031 | 0.8748 | 0.0535 | 0.9721 |
| 0.1097 | 0.9189 | 0.1322 | 0.7345 | 0.1029 | 0.8753 | 0.0532 | 0.9724 |
| 0.1099 | 0.9185 | 0.1323 | 0.7337 | 0.1028 | 0.8757 | 0.0529 | 0.9727 |
| 0.1101 | 0.9181 | 0.1325 | 0.7328 | 0.1027 | 0.8762 | 0.0527 | 0.9730 |
| 0.1103 | 0.9176 | 0.1327 | 0.7320 | 0.1026 | 0.8766 | 0.0524 | 0.9733 |
| 0.1105 | 0.9172 | 0.1329 | 0.7311 | 0.1025 | 0.8770 | 0.0521 | 0.9736 |

-continued

| Column 1 | | Column 2 | | Column 3 | | Column 4 | |
|---|---|---|---|---|---|---|---|
| x | y | x | y | x | y | x | y |
| 0.1107 | 0.9167 | 0.1330 | 0.7303 | 0.1024 | 0.8775 | 0.0518 | 0.9740 |
| 0.1108 | 0.9163 | 0.1332 | 0.7295 | 0.1023 | 0.8779 | 0.0516 | 0.9743 |
| 0.1110 | 0.9159 | 0.1334 | 0.7286 | 0.1022 | 0.8784 | 0.0513 | 0.9746 |
| 0.1112 | 0.9154 | 0.1336 | 0.7278 | 0.1021 | 0.8788 | 0.0510 | 0.9749 |
| 0.1114 | 0.9150 | 0.1338 | 0.7269 | 0.1020 | 0.8792 | 0.0507 | 0.9752 |
| 0.1115 | 0.9145 | 0.1340 | 0.7261 | 0.1019 | 0.8797 | 0.0505 | 0.9755 |
| 0.1117 | 0.9141 | 0.1342 | 0.7253 | 0.1018 | 0.8801 | 0.0502 | 0.9758 |
| 0.1119 | 0.9136 | 0.1344 | 0.7244 | 0.1016 | 0.8805 | 0.0499 | 0.9761 |
| 0.1121 | 0.9132 | 0.1346 | 0.7236 | 0.1015 | 0.8810 | 0.0496 | 0.9764 |
| 0.1122 | 0.9127 | 0.1348 | 0.7228 | 0.1014 | 0.8814 | 0.0493 | 0.9767 |
| 0.1124 | 0.9123 | 0.1350 | 0.7219 | 0.1013 | 0.8818 | 0.0491 | 0.9770 |
| 0.1126 | 0.9118 | 0.1352 | 0.7211 | 0.1012 | 0.8823 | 0.0488 | 0.9773 |
| 0.1128 | 0.9114 | 0.1354 | 0.7203 | 0.1011 | 0.8827 | 0.0485 | 0.9776 |
| 0.1129 | 0.9109 | 0.1356 | 0.7194 | 0.1009 | 0.8831 | 0.0482 | 0.9779 |
| 0.1131 | 0.9105 | 0.1359 | 0.7186 | 0.1008 | 0.8836 | 0.0479 | 0.9782 |
| 0.1133 | 0.9100 | 0.1361 | 0.7178 | 0.1007 | 0.8840 | 0.0477 | 0.9785 |
| 0.1134 | 0.9096 | 0.1363 | 0.7169 | 0.1006 | 0.8844 | 0.0474 | 0.9788 |
| 0.1136 | 0.9091 | 0.1365 | 0.7161 | 0.1005 | 0.8849 | 0.0471 | 0.9791 |
| 0.1138 | 0.9087 | 0.1368 | 0.7153 | 0.1003 | 0.8853 | 0.0468 | 0.9794 |
| 0.1139 | 0.9082 | 0.1370 | 0.7145 | 0.1002 | 0.8857 | 0.0463 | 0.9797 |
| 0.1141 | 0.9078 | 0.1372 | 0.7136 | 0.1001 | 0.8862 | 0.0462 | 0.9800 |
| 0.1143 | 0.9073 | 0.1375 | 0.7128 | 0.1000 | 0.8866 | 0.0460 | 0.9803 |
| 0.1144 | 0.9069 | 0.1377 | 0.7120 | 0.0998 | 0.8870 | 0.0457 | 0.9805 |
| 0.1146 | 0.9064 | 0.1380 | 0.7112 | 0.0997 | 0.8875 | 0.0454 | 0.9808 |
| 0.1147 | 0.9060 | 0.1382 | 0.7103 | 0.0996 | 0.8879 | 0.0451 | 0.9811 |
| 0.1149 | 0.9055 | 0.1385 | 0.7095 | 0.0995 | 0.8883 | 0.0448 | 0.9814 |
| 0.1151 | 0.9051 | 0.1387 | 0.7087 | 0.0993 | 0.8887 | 0.0445 | 0.9817 |
| 0.1152 | 0.9046 | 0.1390 | 0.7079 | 0.0992 | 0.8892 | 0.0442 | 0.9820 |
| 0.1154 | 0.9042 | 0.1393 | 0.7071 | 0.0991 | 0.8896 | 0.0440 | 0.9823 |
| 0.1155 | 0.9037 | 0.1395 | 0.7062 | 0.0989 | 0.8900 | 0.0437 | 0.9826 |
| 0.1157 | 0.9032 | 0.1398 | 0.7054 | 0.0988 | 0.8904 | 0.0434 | 0.9829 |
| 0.1158 | 0.9028 | 0.1401 | 0.7046 | 0.0987 | 0.8909 | 0.0431 | 0.9831 |
| 0.1160 | 0.9023 | 0.1403 | 0.7038 | 0.0986 | 0.8913 | 0.0428 | 0.9834 |
| 0.1161 | 0.9019 | 0.1406 | 0.7030 | 0.0984 | 0.8917 | 0.0425 | 0.9837 |
| 0.1163 | 0.9014 | 0.1409 | 0.7022 | 0.0983 | 0.8921 | 0.0422 | 0.9840 |
| 0.1165 | 0.9010 | 0.1412 | 0.7014 | 0.0981 | 0.8926 | 0.0422 | 0.9841 |
| 0.1166 | 0.9005 | 0.1414 | 0.7005 | 0.0980 | 0.8930 | 0.0561 | 0.9984 |
| 0.1168 | 0.9000 | 0.1417 | 0.6997 | 0.0979 | 0.8934 | — | — |
| 0.1169 | 0.8996 | 0.1229 | 0.6930 | 0.0977 | 0.8938 | — | — |
| 0.1171 | 0.8991 | 0.1226 | 0.6939 | 0.0976 | 0.8943 | — | — |

11. The method according to claim 10, further comprising the step of maximizing a tooth root strength by exploiting an available distance between the outline of the gear rack teeth and the headstock gear.

12. The method according to claim 10, further comprising the step of minimizing an occurrence of gear jumps.

13. The method according to claim 10, further comprising the step of minimizing a Hertzian stress and a relative slip component when engaged with the gear rack.

14. The method according to claim 8, further characterized in that one of the S-shaped profiles has an envelope including all of the following non-dimensional x-y-coordinates in all following columns:

| Column 1 | | Column 2 | | Column 3 | | Column 4 | |
|---|---|---|---|---|---|---|---|
| x | y | x | y | x | y | x | y |
| 0.1404 | 0.6794 | 0.1190 | 0.8288 | 0.1144 | 0.8696 | 0.1070 | 0.8978 |
| 0.1361 | 0.6873 | 0.1189 | 0.8315 | 0.1144 | 0.8696 | 0.1048 | 0.9039 |
| 0.1326 | 0.6955 | 0.1188 | 0.8351 | 0.1144 | 0.8696 | 0.1024 | 0.9104 |
| 0.1287 | 0.7074 | 0.1186 | 0.8378 | 0.1144 | 0.8696 | 0.0998 | 0.9168 |
| 0.1255 | 0.7186 | 0.1184 | 0.8413 | 0.1144 | 0.8696 | 0.0972 | 0.9226 |
| 0.1227 | 0.7308 | 0.1182 | 0.8440 | 0.1143 | 0.8705 | 0.0943 | 0.9288 |
| 0.1205 | 0.7431 | 0.1178 | 0.8476 | 0.1143 | 0.8705 | 0.0912 | 0.9348 |
| 0.1190 | 0.7547 | 0.1175 | 0.8503 | 0.1143 | 0.8705 | 0.0882 | 0.9403 |
| 0.1179 | 0.7671 | 0.1171 | 0.8538 | 0.1143 | 0.8705 | 0.0848 | 0.9461 |
| 0.1175 | 0.7796 | 0.1167 | 0.8565 | 0.1143 | 0.8705 | 0.0813 | 0.9518 |
| 0.1176 | 0.7912 | 0.1162 | 0.8600 | 0.1143 | 0.8705 | 0.0778 | 0.9569 |

-continued

| Column 1 | | Column 2 | | Column 3 | | Column 4 | |
|---|---|---|---|---|---|---|---|
| x | y | x | y | x | y | x | y |
| 0.1183 | 0.8037 | 0.1157 | 0.8627 | 0.1143 | 0.8705 | 0.0740 | 0.9623 |
| 0.1185 | 0.8064 | 0.1151 | 0.8662 | 0.1141 | 0.8711 | 0.0701 | 0.9676 |
| 0.1187 | 0.8100 | 0.1146 | 0.8688 | 0.1141 | 0.8711 | 0.0663 | 0.9724 |
| 0.1189 | 0.8127 | 0.1146 | 0.8688 | 0.1141 | 0.8711 | 0.0621 | 0.9774 |
| 0.1190 | 0.8163 | 0.1146 | 0.8688 | 0.1141 | 0.8711 | 0.0578 | 0.9822 |
| 0.1191 | 0.8190 | 0.1146 | 0.8688 | 0.1126 | 0.8780 | 0.0537 | 0.9866 |
| 0.1191 | 0.8225 | 0.1144 | 0.8696 | 0.1110 | 0.8844 | | |
| 0.1191 | 0.8252 | 0.1144 | 0.8696 | 0.1090 | 0.8912 | | |

15. The method according to claim 10, further characterized in that one of the S-shaped profiles has an envelope comprising all of the following non-dimensional x-y-coordinates in all of the following columns:

| Column 1 | | Column 2 | | Column 3 | | Column 4 | |
|---|---|---|---|---|---|---|---|
| x | y | x | y | x | y | x | y |
| 0.1887 | 0.6427 | 0.1191 | 0.8252 | 0.1143 | 0.8705 | 0.0740 | 0.9623 |
| 0.1802 | 0.6456 | 0.1190 | 0.8288 | 0.1143 | 0.8705 | 0.0701 | 0.9676 |
| 0.1721 | 0.6495 | 0.1189 | 0.8315 | 0.1143 | 0.8705 | 0.0663 | 0.9724 |
| 0.1645 | 0.6542 | 0.1188 | 0.8351 | 0.1143 | 0.8705 | 0.0621 | 0.9774 |
| 0.1573 | 0.6597 | 0.1186 | 0.8378 | 0.1143 | 0.8705 | 0.0578 | 0.9822 |
| 0.1514 | 0.6652 | 0.1184 | 0.8413 | 0.1143 | 0.8705 | 0.0537 | 0.9866 |
| 0.1456 | 0.6720 | 0.1182 | 0.8440 | 0.1143 | 0.8705 | 0.0492 | 0.9912 |
| 0.1404 | 0.6794 | 0.1178 | 0.8476 | 0.1141 | 0.8711 | 0.0482 | 0.9921 |
| 0.1361 | 0.6873 | 0.1175 | 0.8503 | 0.1141 | 0.8711 | 0.0471 | 0.9929 |
| 0.1326 | 0.6955 | 0.1171 | 0.8538 | 0.1141 | 0.8711 | 0.0459 | 0.9937 |
| 0.1287 | 0.7074 | 0.1167 | 0.8565 | 0.1141 | 0.8711 | 0.0447 | 0.9943 |
| 0.1255 | 0.7186 | 0.1162 | 0.8600 | 0.1126 | 0.8780 | 0.0435 | 0.9948 |
| 0.1227 | 0.7308 | 0.1157 | 0.8627 | 0.1110 | 0.8844 | 0.0422 | 0.9953 |
| 0.1205 | 0.7431 | 0.1151 | 0.8662 | 0.1090 | 0.8912 | 0.0409 | 0.9956 |
| 0.1190 | 0.7547 | 0.1146 | 0.8688 | 0.1070 | 0.8978 | 0.0395 | 0.9958 |
| 0.1179 | 0.7671 | 0.1146 | 0.8688 | 0.1048 | 0.9039 | 0.0382 | 0.9959 |
| 0.1175 | 0.7796 | 0.1146 | 0.8688 | 0.1024 | 0.9104 | 0.0340 | 0.9961 |
| 0.1176 | 0.7912 | 0.1146 | 0.8688 | 0.0998 | 0.9168 | 0.0296 | 0.9962 |
| 0.1183 | 0.8037 | 0.1144 | 0.8696 | 0.0972 | 0.9226 | 0.0254 | 0.9963 |
| 0.1185 | 0.8064 | 0.1144 | 0.8696 | 0.0943 | 0.9288 | 0.0213 | 0.9964 |
| 0.1187 | 0.8100 | 0.1144 | 0.8696 | 0.0912 | 0.9348 | 0.0169 | 0.9965 |
| 0.1189 | 0.8127 | 0.1144 | 0.8696 | 0.0882 | 0.9403 | 0.0127 | 0.9966 |
| 0.1190 | 0.8163 | 0.1144 | 0.8696 | 0.0848 | 0.9461 | 0.0086 | 0.9966 |
| 0.1191 | 0.8190 | 0.1144 | 0.8696 | 0.0813 | 0.9518 | 0.0042 | 0.9967 |
| 0.1191 | 0.8225 | 0.1144 | 0.8696 | 0.0778 | 0.9569 | 0.0000 | 0.9967 |

16. A Headstock gear for a feed system of a shearer loader, comprising a plurality of teeth, each tooth having a tooth geometry
characterized in that for each tooth, the tooth geometry
consists of two symmetric S-shaped tooth profiles which are arranged line symmetrically regarding a radius line, as seen from a view along an axis of rotation; and
wherein the tooth geometry is configured to engage with at least two different gear rack pitches, and the teeth are selectively hardened at the root while remaining unhardened at the tip to accommodate variations in the at least two different gear rack pitches during engagement, and one of the S-shaped profiles has an envelope including all of the following non-dimensional x-y-coordinates in all following columns:

| Column 1 | | Column 2 | | Column 3 | | Column 4 | |
|---|---|---|---|---|---|---|---|
| x | y | x | y | x | y | x | y |
| 0.1404 | 0.6794 | 0.1190 | 0.8288 | 0.1144 | 0.8696 | 0.1070 | 0.8978 |
| 0.1361 | 0.6873 | 0.1189 | 0.8315 | 0.1144 | 0.8696 | 0.1048 | 0.9039 |
| 0.1326 | 0.6955 | 0.1188 | 0.8351 | 0.1144 | 0.8696 | 0.1024 | 0.9104 |
| 0.1287 | 0.7074 | 0.1186 | 0.8378 | 0.1144 | 0.8696 | 0.0998 | 0.9168 |
| 0.1255 | 0.7186 | 0.1184 | 0.8413 | 0.1144 | 0.8696 | 0.0972 | 0.9226 |
| 0.1227 | 0.7308 | 0.1182 | 0.8440 | 0.1143 | 0.8705 | 0.0943 | 0.9288 |
| 0.1205 | 0.7431 | 0.1178 | 0.8476 | 0.1143 | 0.8705 | 0.0912 | 0.9348 |
| 0.1190 | 0.7547 | 0.1175 | 0.8503 | 0.1143 | 0.8705 | 0.0882 | 0.9403 |
| 0.1179 | 0.7671 | 0.1171 | 0.8538 | 0.1143 | 0.8705 | 0.0848 | 0.9461 |
| 0.1175 | 0.7796 | 0.1167 | 0.8565 | 0.1143 | 0.8705 | 0.0813 | 0.9518 |

-continued

| Column 1 | | Column 2 | | Column 3 | | Column 4 | |
|---|---|---|---|---|---|---|---|
| x | y | x | y | x | y | x | y |
| 0.1176 | 0.7912 | 0.1162 | 0.8600 | 0.1143 | 0.8705 | 0.0778 | 0.9569 |
| 0.1183 | 0.8037 | 0.1157 | 0.8627 | 0.1143 | 0.8705 | 0.0740 | 0.9623 |
| 0.1185 | 0.8064 | 0.1151 | 0.8662 | 0.1141 | 0.8711 | 0.0701 | 0.9676 |
| 0.1187 | 0.8100 | 0.1146 | 0.8688 | 0.1141 | 0.8711 | 0.0663 | 0.9724 |
| 0.1189 | 0.8127 | 0.1146 | 0.8688 | 0.1141 | 0.8711 | 0.0621 | 0.9774 |
| 0.1190 | 0.8163 | 0.1146 | 0.8688 | 0.1141 | 0.8711 | 0.0578 | 0.9822 |
| 0.1191 | 0.8190 | 0.1146 | 0.8688 | 0.1126 | 0.8780 | 0.0537 | 0.9866 |
| 0.1191 | 0.8225 | 0.1144 | 0.8696 | 0.1110 | 0.8844 | | |
| 0.1191 | 0.8252 | 0.1144 | 0.8696 | 0.1090 | 0.8912 | | |

17. The headstock gear according to claim 16, characterized in that the plurality of teeth comprises 11 teeth.

18. The headstock gear according to claim 16, wherein one of the S-shaped profiles comprises an envelope fitting into a frame with the non-dimensional outer limitations defined by x-y coordinates, the x-y coordinates are multiplied by a dimension to obtain a dimensioned tooth geometry, and the headstock gear extends over the entire height of each tooth wherein the S-shaped profile has the length of about 70 mm.

19. The headstock gear according to claim 16, characterized in that each of the gear rack segments comprises several rack teeth, wherein the gear rack teeth have a substantially trapezoid cross-section.

20. The headstock gear according to claim 16, characterized in that the headstock gear tooth geometry is designed such that a product of Hertzian stress and a relative slip component is minimized when engaged with the gear rack.

\* \* \* \* \*